United States Patent
Sasaki et al.

(10) Patent No.: US 12,146,524 B2
(45) Date of Patent: Nov. 19, 2024

(54) BALL BEARING

(71) Applicant: NTN CORPORATION, Osaka (JP)

(72) Inventors: Katsuaki Sasaki, Shizuoka (JP); Susumu Miyairi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 23 days.

(21) Appl. No.: 18/021,098

(22) PCT Filed: Aug. 6, 2021

(86) PCT No.: PCT/JP2021/029377
§ 371 (c)(1),
(2) Date: Feb. 13, 2023

(87) PCT Pub. No.: WO2022/039057
PCT Pub. Date: Feb. 24, 2022

(65) Prior Publication Data
US 2023/0296132 A1  Sep. 21, 2023

(30) Foreign Application Priority Data

Aug. 19, 2020 (JP) ................................ 2020-138672
Aug. 19, 2020 (JP) ................................ 2020-138674
(Continued)

(51) Int. Cl.
*F16C 33/41* (2006.01)
*F16C 19/06* (2006.01)
(Continued)

(52) U.S. Cl.
CPC .......... *F16C 19/06* (2013.01); *F16C 33/3806* (2013.01); *F16C 33/3887* (2013.01);
(Continued)

(58) Field of Classification Search
CPC .. F16C 19/06; F16C 33/3806; F16C 33/3887; F16C 33/41; F16C 33/414; F16C 33/416;
(Continued)

(56) References Cited

U.S. PATENT DOCUMENTS 2,038,010 A * 4/1936 Smith ................... F16C 33/414
384/481
4,702,627 A * 10/1987 Pollastro ............... F16C 33/416
384/531
(Continued)

FOREIGN PATENT DOCUMENTS

DE  102013013622 A1 * 2/2014 ............ F16C 33/416
JP  11-210757  8/1999
(Continued)

*Primary Examiner* — Phillip A Johnson
(74) *Attorney, Agent, or Firm* — Wenderoth, Lind & Ponack, L.L.P.

(57) ABSTRACT

A ball bearing is provided which includes a cage circular annular portion and a seal member. The cage circular annular portion has a cage-side sliding contact surface axially opposed to the seal member and configured to come into sliding contact with the seal member. The seal member has a seal-side sliding contact surface configured to come into sliding contact with the cage-side sliding contact surface. A plurality of axial protrusions each having an axially convex circular arc shape in cross sections along a circumferential direction are formed on one of the cage-side sliding contact surface and the seal-side sliding contact surface at constant pitches in the circumferential direction.

20 Claims, 42 Drawing Sheets

(30) Foreign Application Priority Data

Aug. 19, 2020 (JP) .................................. 2020-138678
Jul. 20, 2021 (JP) .................................. 2021-119580

(51) Int. Cl.
| | |
|---|---|
| F16C 33/38 | (2006.01) |
| F16C 33/66 | (2006.01) |
| F16C 33/76 | (2006.01) |
| F16C 33/78 | (2006.01) |

(52) U.S. Cl.
CPC .......... *F16C 33/416* (2013.01); *F16C 33/418* (2013.01); *F16C 33/6607* (2013.01); *F16C 33/664* (2013.01); *F16C 33/76* (2013.01); *F16C 33/7856* (2013.01); *F16C 2380/26* (2013.01)

(58) Field of Classification Search
CPC .. F16C 33/418; F16C 33/6607; F16C 33/664; F16C 33/76; F16C 33/7853; F16C 33/7856

See application file for complete search history.

(56) References Cited

U.S. PATENT DOCUMENTS

| | | |
|---|---|---|
| 5,539,844 A | 7/1996 | Tazumi et al. |
| 10,422,382 B2 * | 9/2019 | Kamamoto ........... F16C 33/416 |
| 2018/0045247 A1 | 2/2018 | Inamasu et al. |
| 2018/0274590 A1 | 9/2018 | Ishii et al. |
| 2022/0099142 A1 | 3/2022 | Kawaguchi et al. |

FOREIGN PATENT DOCUMENTS

| | | | |
|---|---|---|---|
| JP | 3035766 | 2/2000 | |
| JP | 2002-130292 | 5/2002 | |
| JP | 2004-92682 | 3/2004 | |
| JP | 2005133818 A * | 5/2005 | .......... F16C 33/3806 |
| JP | 2005-214259 | 8/2005 | |
| JP | 2007-303600 | 11/2007 | |
| JP | 2008-175257 | 7/2008 | |
| JP | 2008-249108 | 10/2008 | |
| JP | 2009-008170 | 1/2009 | |
| JP | 2018-159392 | 10/2018 | |
| WO | 2016/143786 | 9/2016 | |
| WO | 2020/158564 | 8/2020 | |

* cited by examiner

BALL BEARING

TECHNICAL FIELD

The present invention relates to a ball bearing.

BACKGROUND ART

Ball bearings are often used as bearings supporting rotary shafts of automobiles, industrial machines, etc. Generally, ball bearings include an inner ring; an outer ring arranged radially outwardly of, and coaxially with, the inner ring: a plurality of balls disposed in the annular space between the inner ring and the outer ring; and a cage retaining the balls.

As such a cage, for example, a so-called "crown-shaped" resin cage as disclosed in Japanese Patent No. 3035766 is known. Such a cage includes a cage circular annular portion extending circumferentially and adjacent to the space through which the balls pass; and cage claw portions having a cantilevered structure axially extending from the cage circular annular portion each between the corresponding circumferentially adjacent balls. Each cage claw portion has a ball guiding surface opposed to the surface of one of the balls. The ball guiding surface is a concave spherical surface extending along the surface of the ball to hold the ball.

Also, for example, a sealed ball bearing as disclosed in PCT International Publication No. WO2016/143786 is sometimes used. In this ball bearing, the axial end openings of the annular space between the inner ring and the outer ring are closed by annular seal members to prevent foreign matter from entering the ball bearing from the outside of the ball bearing, or to prevent a lubricant (such as lubricating oil or grease) from leaking from the interior of the ball bearing to the exterior.

Nowadays, in the field of electric vehicles such as battery electric vehicles (EV) and hybrid electric vehicles (HEV), electric motors are rotated at a higher speed for a reduction in size and weight. A ball bearing supporting a rotary shaft to which rotation of such an electric motor is input is sometime used under the conditions that the dmn (ball pitch circle diameter dm(mm)×the number of rotations n (min$^{-1}$)) value exceeds 2 million.

The inventors of the present application considered using a crown-shaped cage in a ball bearing supporting a rotary shaft of, e.g., an EV or a HEV that rotates at a high speed.

However, it turned out that if a crown-shaped cage is used in a ball bearing that rotates at a high speed, the centrifugal forces applied to its cantilevered cage claw portions cause (i) torsional deformation of its cage circular annular portion in the direction in which the cage claw portions are inclined toward the radially outer side, and (ii) flexural deformation of the cage claw portions per se toward the radially outer side, and, due to these deformations, the cage claw portions may interfere with the balls. The interference of the cage claw portions with the balls causes heat generation in the ball bearing.

Especially if the bearing using a crown-shaped cage is a sealed ball bearing with a seal member, since, if the cage circular annular portion of the crown-shaped cage comes into contact with the seal member, the sliding resistance of the contact portions thereof may cause abnormal heat generation, the axial width dimension of the cage circular annular portion needs to be reduced to prevent the cage circular annular portion from coming into contact with the seal member. Therefore, it is difficult to increase the rigidity of the cage circular annular portion. As a result, torsional deformation of the cage circular annular portion is likely to occur due to the centrifugal forces applied to the cage claw portions, and thus the cage claw portions are likely to interfere with the balls.

As described above, if a crown-shaped cage is used in a sealed ball bearing, it is difficult to use the sealed ball bearing for a component that rotates at a high speed. Also, if the space for installing the bearing is small and thus the width dimension of the bearing needs to be reduced, it is difficult to prevent the crown-shaped cage from coming into contact with the seal member. Therefore, instead of the sealed ball bearing, an open-type ball bearing including no seal members and having open ends on both axial sides needs to be used in some cases.

It is an object of the present invention to provide a ball bearing in which deformation of a cage made of resin due to a centrifugal force is less likely to occur during high-speed rotation.

SUMMARY OF THE INVENTION

In order to achieve the above object, the present invention provides a ball bearing comprising: an inner ring; an outer ring arranged radially outwardly of, and coaxially with, the inner ring; a plurality of balls disposed in an annular space between the inner ring and the outer ring; and a cage made of resin and retaining the balls. The cage comprises: a cage circular annular portion extending circumferentially adjacent to a space through which the balls pass; and cage claw portions having a cantilevered structure axially extending from the cage circular annular portion, each between a corresponding pair of the balls circumferentially adjacent to each other. Each of the cage claw portions has: an outer-diameter-side axial groove formed in a radially outer surface of the cage claw portion, and axially extending from a distal end of the cage claw portion toward the cage circular annular portion; and an inner-diameter-side axial groove formed in a radially inner surface of the cage claw portion, and axially extending from the distal end of the cage claw portion toward the cage circular annular portion. Due to the outer-diameter-side axial groove and the inner-diameter-side axial groove of each of the cage claw portions, a cross section of the cage claw portions perpendicular to an axial direction has an H shape of which the openings of the letter H face radially outward and radially inward, respectively.

With this arrangement, since each cage claw portion has an H-shaped cross section due to the outer-diameter-side axial groove in the radially outer surface of the cage claw portion and the inner-diameter-side axial groove in the radially inner surface of the cage claw portion, it is possible to reduce the mass of the cage claw portions while ensuring the moment of inertia of area of the cage claw portions (while making the cage claw portions less likely to deform against the bending moment). Therefore, even during high-speed rotation, it is possible to reduce torsional deformation of the cage circular annular portion, and flexural deformation of the cage claw portions per se toward the radially outer side due to the centrifugal forces which the cage claw portions receive.

It is preferable that each of the cage claw portions has an axial length larger than a radius of each of the balls, and each of the cage claw portions has circumferentially opposed surfaces which are circumferentially opposed to the corresponding pair of the balls, respectively, and of which portions configured to circumferentially support the corresponding pair of the balls are flat surfaces extending such that when the cage claw portion is moved radially outwardly by a centrifugal force, the circumferentially opposed surfaces do not interfere with the corresponding pair of the balls.

With this arrangement, since the circumferentially opposed surfaces of each cage claw portion are flat surfaces, when the cage claw portion is moved radially outwardly by the centrifugal force applied to the cage claw portion, the circumferentially opposed surfaces of the cage claw portion do not interfere with the balls. Also, since the shear resistance of lubricating oil generated between the circumferentially opposed surfaces of the cage claw portion and the balls can be reduced, the heat generation in the ball bearing can also be reduced.

It is preferable that the cage circular annular portion has axially opposed surfaces axially opposed to the respective balls, and each of the circumferentially opposed surfaces of the cage claw portions is connected to a corresponding one of the axially opposed surfaces via a curved surface having a concave circular arc-shaped cross section.

With this arrangement, since the circumferentially opposed surfaces of each cage claw portion are connected to the respective axially opposed surfaces via curved surfaces having a concave circular arc-shaped cross section, it is possible to ensure the cross-sectional area of the axial root portion of the cage claw portion while keeping a small mass of the axial distal end portion of the cage claw portion. Therefore, it is possible to effectively reduce deflection of the cage claw portion due to the centrifugal force applied to the cage claw portion.

An axial end of the outer-diameter-side axial groove of each of the cage claw portions closer to the cage circular annular portion preferably rises to an outer periphery of the cage circular annular portion to form a concave circular arc-shaped cross section.

With this arrangement, since the axial end of the outer-diameter-side axial groove of each cage claw portion closer to the cage circular annular portion rises to form a concave circular arc-shaped cross section, it is possible to ensure the cross-sectional area of the axial root portion of the cage claw portion while keeping a small mass of the axial distal end portion of the cage claw portion. Therefore, it is possible to effectively reduce deflection of the cage claw portion due to the centrifugal force applied to the cage claw portion.

The cage circular annular portion preferably has, on an inner periphery of the cage circular annular portion, a cage guided surface configured to be guided while coming into sliding contact with an outer periphery of the inner ring.

With this arrangement, the cage made of resin can be radially positioned by the sliding contact between the cage guided surface of the cage circular annular portion on its inner periphery and the outer periphery of the inner ring.

It is preferable that the ball bearing further comprises an annular seal member closing one axial end opening of the annular space, the cage circular annular portion has a cage-side sliding contact surface axially opposed to the seal member and configured to come into sliding contact with the seal member, the seal member has a seal-side sliding contact surface configured to come into sliding contact with the cage-side sliding contact surface, and a plurality of axial protrusions each having an axially convex circular arc shape in cross sections along a circumferential direction are formed on one of the cage-side sliding contact surface and the seal-side sliding contact surface so as to be disposed at constant pitches in the circumferential direction.

With this arrangement, since a plurality of axial protrusions whose cross sections along the circumferential direction have an axially convex circular arc shape are formed on one of the cage-side sliding contact surface and the seal-side sliding contact surface at constant pitches in the circumferential direction, oil films due to the wedge film effect are formed between the sliding contact surface and the respective axial protrusions. Due to the oil films, the lubrication condition between the sliding contact surface and the axial protrusions becomes fluid lubrication condition, thus making it possible to markedly reduce the contact resistance between the cage and the seal member. Therefore, it is possible to prevent abnormal heat generation due to the sliding resistance of the contact portions of the cage and the seal member. Also, since the cage circular annular portion is disposed to come into sliding contact with the seal member, it is possible to increase the axial thickness of the cage circular annular portion, and thus increase the rigidity of the cage circular annular portion. Therefore, even during high-speed rotation, it is possible to reduce torsional deformation of the cage circular annular portion due to the centrifugal forces that the cage claw portions receive, and reduce inclination of the cage claw portions toward radially outer side.

Each of the axial protrusions preferably includes: a parallel apex portion having an axially convex circular arc-shape in cross sections along the circumferential direction whose apex height is radially uniform; and an inclined apex portion having an axially convex circular-arc shape in cross sections along the circumferential direction whose apex height gradually decreases radially outward from a radially outer end of the parallel apex portion.

With this arrangement, while the bearing is rotating at a low speed and the centrifugal forces which the cage claw portions receive are relatively small, oil films due to the wedge film effect can be formed between the sliding contact surface and the parallel apex portions of the respective axial protrusions. Also, while the bearing is rotating at a high speed and the centrifugal forces which the cage claw portions receive are relatively large, an oil film due to the wedge film effect can be formed between the sliding contact surface, and the parallel apex portion and the inclined apex portion of each axial protrusion with torsional deformation of the cage circular annular portion relatively large. As described above, regardless of the rotation speed of the bearing, oil films due to the wedge film effect can be stably formed between the cage and the seal member.

A cross section of the inclined apex portion of each of the axial protrusions perpendicular to the circumferential direction preferably has a rounded shape smoothly connected to the parallel apex portion.

If such a rounded shape is used, since the inclined apex portion and the parallel apex portion are smoothly connected to each other, when, with torsional deformation of the cage circular annular portion relatively large, an oil film due to the wedge film effect is formed between the sliding contact surface, and the parallel apex portion and the inclined apex portion, the oil film can be formed stably.

The axial protrusions are preferably disposed at positions where the axial protrusions overlap with a pitch circle of the balls, or disposed radially outwardly of the pitch circle.

With this arrangement, when the centrifugal forces applied to the cage claw portions cause torsional deformation of the cage circular annular portion in the direction in which the cage claw portions are inclined radially outward, it is possible to prevent, due to the torsional deformation, the cage-side sliding contact surface and the seal-side sliding contact surface from coming into contact with each other at a position displaced radially outwardly of the axial protrusions.

The outer-diameter-side axial groove of each of the cage claw portions is preferably shaped such that, from the distal end of the cage claw portion toward the cage circular annular portion, a position of a bottom of the outer-diameter-side axial groove gradually changes radially outwardly.

If such a shape is used, since the position of the bottom of the outer-diameter-side axial groove of each cage claw portion gradually changes radially outwardly from the distal end of the cage claw portion toward the cage circular annular portion, lubricating oil supplied into the outer-diameter-side axial groove is moved from the distal end of the cage claw portion toward the cage circular annular portion by the pumping action, and is introduced into the space between the cage circular annular portion and the seal member. Therefore, it is possible to sufficiently lubricate the portions of the bearing between one of the cage-side sliding contact surface and the seal-side sliding contact surface and the axial protrusions, and effectively form oil films due to wedge films.

The inner-diameter-side axial groove of each of the cage claw portions is preferably shaped such that, from the distal end of the cage claw portion toward the cage circular annular portion, a position of a bottom of the inner-diameter-side axial groove gradually changes radially inwardly.

It is preferable that an axial end of the annular space opposite from an axial end of the annular space closed by the seal member is not provided with an additional seal member, and is open so that lubricating oil supplied from outside enters the annular space through this opening.

With this arrangement, it is possible to sufficiently lubricate the portions of the bearing between one of the cage-side sliding contact surface and the seal-side sliding contact surface and the axial protrusions, and reliably form oil films due to wedge films.

If each of the cage claw portions has an axial length larger than a radius of each of the balls, and has circumferentially opposed surfaces circumferentially opposed to the corresponding pair of the balls, respectively, portions of the circumferentially opposed surfaces configured to circumferentially support the corresponding pair of the balls are preferably straight portions having no circumferential inclination, and extending straight in the axial direction so that when supporting the corresponding pair of the balls, no axial component forces are generated.

With this arrangement, when each ball is supported by the cage claw portion, no axial component force is generated at the cage claw portion. Therefore, it is possible to prevent the cage from being axially pressed hard against the seal member, and thus effectively reduce the sliding resistance of the contact portions of the cage and the seal member.

If the axial protrusions are formed on the seal-side sliding contact surface, it is preferable that the seal member comprises an annular metal core, and a rubber part bonded to a surface of the metal core by vulcanization, and the axial protrusions are formed of the same material as the rubber part.

With this arrangement, the axial protrusions having high dimensional accuracy can be formed at a low lost.

It is preferable that the inner-diameter-side axial groove of each of the cage claw portions axially extends through the radially inner surface of the cage claw portion and the cage guided surface.

With this arrangement, lubricating oil supplied into the space radially inside of the cage claw portions is introduced, through the inner-diameter-side axial grooves, into the space between the cage circular annular portion and the seal member. Therefore, it is possible to sufficiently lubricate the portions of the bearing between one of the cage-side sliding contact surface and the seal-side sliding contact surface and the axial protrusions, and effectively form oil films due to wedge films.

If the cage circular annular portion has, on an inner periphery of the cage circular annular portion, a cage guided surface configured to be guided while coming into sliding contact with an outer periphery of the inner ring, the cage circular annular portion preferably has a chamfer obliquely extending in a cross section perpendicular to the circumferential direction, to connect the cage-side sliding contact surface and the cage guided surface to each other.

With this arrangement, lubricating oil introduced into the space between the cage circular annular portion and the seal member through the inner-diameter-side axial grooves from the radially inner areas of the cage claw portions can be smoothly fed along the chamfer and led onto the cage-side sliding contact surface by a centrifugal force.

The ball bearing may be a ball bearing wherein the outer ring has, on an inner periphery of the outer ring, an outer ring raceway groove with which the balls come into rolling contact, and a pair of outer ring groove shoulders located on both axial sides of the outer ring raceway groove. Each of the cage claw portions has an axial length larger than an axial width of the outer ring raceway groove, the cage circular annular portion has, on a radially outer surface of the cage circular annular portion, root-side guided surfaces configured to come into sliding contact with one of the outer ring groove shoulders. The cage claw portions have, respectively, distal-end-side guided surfaces each formed on a radially outer surface of an axial end portion of the cage claw portion on a distal end side thereof, and are configured to come into sliding contact with the other of the outer ring groove shoulders. each of the root-side guided surfaces and the distal-end-side guided surfaces has a radially outwardly protruding circular arc shape in cross sections along the circumferential direction.

With this arrangement, since each of the root-side guided surfaces has, in cross sections along the circumferential direction, a radially outwardly protruding circular arc shape, oil films due to the wedge film effect are formed between the one outer ring groove shoulder and the root-side guided surfaces. Due to the oil films, the lubrication condition between the one outer ring groove shoulder and the root-side guided surfaces becomes the fluid lubrication condition, thus making it possible to markedly reduce the contact resistance between the cage and the outer ring. Since, as with the root-side guided surfaces, each of the distal-end-side guided surfaces also has a radially outwardly protruding circular arc shape in cross sections along the circumferential direction, oil films due to the wedge film effect are formed between the other outer ring groove shoulder and the distal-end-side guided surfaces. Due to the oil films, the lubrication condition between the other outer ring groove shoulder and the distal-end-side guided surfaces becomes the fluid lubrication condition, thus making it possible to markedly reduce the contact resistance between the cage and the outer ring. Therefore, it is possible to prevent abnormal heat generation due to the sliding resistance of the contact portions of the cage and the outer ring. Also, since the one outer ring groove shoulder supports the cage circular annular portion from the radially outer side, and the other outer ring groove shoulder supports the axial ends of the cage claw portions on their distal end sides from the radially outer side, flexural deformation of the cage claw portions toward the radially outer side is less likely to occur. Therefore, even during high-speed rotation, it is possible to reduce torsional deformation of the cage circular annular portion, and flexural deformation of the cage claw portions per se toward the radially outer side due to the centrifugal forces which the cage claw portions receive.

It is preferable that each of the root-side guided surfaces has, on a side thereof remoter from a corresponding one of the cage claw portions, an axial end edge chamfered into a rounded shape, and each of the distal-end-side guided surfaces has, on a side thereof remoter from the cage circular annular portion, an axial end edge chamfered into a rounded shape.

If chamfered into a rounded shape, oil films due to the wedge film effect can be effectively formed between the one outer ring groove shoulder and the root-side guided surfaces, and oil films due to the wedge film effect can be effectively formed between the other outer ring groove shoulder and the distal-end-side guided surfaces, too.

Each of the cage claw portions preferably has a relief recess in a portion of the radially outer surface of the cage claw portion between a corresponding one of the root-side guided surfaces and the distal-end-side guided surface of the cage claw portion, the relief recess having an axial width larger than the axial width of the outer ring raceway groove, and extending in the circumferential direction.

If such relief recesses are formed, it is possible to prevent each of the boundaries between the outer ring raceway groove and the respective outer ring groove shoulders from coming into sliding contact with the radially outer surface of the cage circular annular portion or the radially outer surfaces of the cage claw portions. Therefore, it is possible to prevent the radially outer surface of the cage circular annular portion and the radially outer surfaces of the cage claw portions from becoming worn locally at the positions corresponding to the boundaries between the outer ring raceway groove and the outer ring groove shoulders.

In order to achieve the above object, the present invention also provides a ball bearing comprising: an inner ring; an outer ring arranged radially outwardly of, and coaxially with, the inner ring; a plurality of balls disposed in an annular space between the inner ring and the outer ring; an annular seal member closing one axial end opening of the annular space; and a cage made of resin and retaining the balls. The cage comprises a cage circular annular portion extending circumferentially through a space axially sandwiched between the seal member and the space through which the balls pass; and cage claw portions having a cantilevered structure extending from the cage circular annular portion, and each located between a corresponding pair of the balls circumferentially adjacent to each other. The cage circular annular portion has a cage-side sliding contact surface axially opposed to the seal member and configured to come into sliding contact with the seal member, wherein the seal member has a seal-side sliding contact surface configured to come into sliding contact with the cage-side sliding contact surface. A plurality of axial protrusions each having an axially convex circular arc shape in cross sections along a circumferential direction are formed on one of the cage-side sliding contact surface and the seal-side sliding contact surface at constant pitches in the circumferential direction.

With this arrangement, since a plurality of axial protrusions whose cross sections along the circumferential direction have an axially convex circular arc shape are formed on one of the cage-side sliding contact surface and the seal-side sliding contact surface at constant pitches in the circumferential direction, oil films due to the wedge film effect are formed between the sliding contact surface and the respective axial protrusions. Due to the oil films, the lubrication condition between the sliding contact surface and the axial protrusions becomes fluid lubrication condition, thus making it possible to markedly reduce the contact resistance between the cage and the seal member. Therefore, it is possible to prevent abnormal heat generation due to the sliding resistance of the contact portions of the cage and the seal member. Also, since the cage circular annular portion is disposed to come into sliding contact with the seal member, it is possible to increase the axial thickness of the cage circular annular portion, and thus increase the rigidity of the cage circular annular portion. Therefore, even during high-speed rotation, it is possible to reduce torsional deformation of the cage circular annular portion due to the centrifugal forces that the cage claw portions receive, and reduce inclination of the cage claw portions toward radially outer side.

It is preferable that each of the cage claw portions has an axial length larger than a radius of each of the balls, and each of the cage claw portions has circumferentially opposed surfaces which are circumferentially opposed to the corresponding pair of the balls, respectively, and of which portions configured to circumferentially support the corresponding pair of the balls are straight portions having no circumferential inclination, and extending straight in an axial direction in order that when supporting the corresponding pair of the balls, no axial component forces are generated.

With this arrangement, when each ball is supported by the cage claw portion, no axial component force is generated at the cage claw portion. Therefore, it is possible to prevent the cage from being axially pressed hard against the seal member, and thus effectively reduce the sliding resistance of the contact portions of the cage and the seal member.

Of the circumferentially opposed surfaces of each of the cage claw portions, the portions configured to circumferentially support the corresponding pair of the balls, preferably extend parallel to an imaginary straight line connecting a center of the cage circular annular portion and a center of the cage claw portion to each other in order that when the cage claw portion is moved radially outwardly by a centrifugal force, the circumferentially opposed surfaces do not interfere with the corresponding pair of the balls.

With this arrangement, when the cage circular annular portion and the cage claw portions are deformed by the centrifugal forces applied to the cage claw portions and the cage claw portions are thus moved radially outwardly, it is possible to prevent the circumferentially opposed surfaces of the cage claw portions from interfering with the balls.

Each of the axial protrusions preferably includes: a parallel apex portion having an axially convex circular arc convex shape in cross sections along the circumferential direction whose apex height is radially uniform; and an inclined apex portion having an axially circular arc convex shape in cross sections along the circumferential direction whose apex height gradually decreases radially outward from a radially outer end of the parallel apex portion.

With this arrangement, while the bearing is rotating at a low speed and the centrifugal forces which the cage claw portions receive are relatively small, oil films due to the wedge film effect can be formed between the sliding contact surface and the parallel apex portions of the respective axial protrusions. Also, while the bearing is rotating at a high speed and the centrifugal forces which the cage claw portions receive are relatively large, an oil film due to the wedge film effect can be formed between the sliding contact surface, and the parallel apex portion and the inclined apex portion of each axial protrusion with torsional deformation of the cage circular annular portion relatively large. As described above, regardless of the rotation speed of the bearing, oil films due to the wedge film effect can be stably formed between the cage and the seal member.

A cross section of the inclined apex portion of each of the axial protrusions perpendicular to the circumferential direction preferably has a rounded shape smoothly connected to the parallel apex portion.

If such a rounded shape is used, since the inclined apex portion and the parallel apex portion are smoothly connected to each other, when, with torsional deformation of the cage circular annular portion relatively large, an oil film due to the wedge film effect is formed between the sliding contact surface, and the parallel apex portion and the inclined apex portion, the oil film can be formed stably.

The axial protrusions are preferably disposed at positions where the axial protrusions overlap with a pitch circle of the balls, or disposed radially outwardly of the pitch circle.

With this arrangement, when the centrifugal forces applied to the cage claw portions cause torsional deformation of the cage circular annular portion in the direction in which the cage claw portions are inclined radially outward, it is possible to prevent, due to the torsional deformation, the cage-side sliding contact surface and the seal-side sliding contact surface from coming into contact with each other at a position displaced radially outwardly of the axial protrusions.

If the axial protrusions are formed on the seal-side sliding contact surface, it is preferable that the seal member comprises an annular metal core, and a rubber part bonded to a surface of the metal core by vulcanization, and the axial protrusions are formed of the same material as the rubber part.

With this arrangement, the axial protrusions having high dimensional accuracy can be formed at a low lost.

The cage circular annular portion preferably has, on an inner periphery of the cage circular annular portion, a cage guided surface configured to be guided while coming into sliding contact with an outer periphery of the inner ring.

With this arrangement, the cage made of resin can be radially positioned by the sliding contact between the cage guided surface of the cage circular annular portion on its inner periphery and the outer periphery of the inner ring.

The cage, which is made of resin, preferably has, in an inner periphery of the cage, inner-diameter-side axial grooves axially extending through radially inner surfaces of the respective cage claw portions and the cage guided surface.

With this arrangement, lubricating oil supplied into the space radially inside of the cage claw portions is introduced, through the inner-diameter-side axial grooves, into the space between the cage circular annular portion and the seal member. Therefore, it is possible to sufficiently lubricate the portions of the bearing between one of the cage-side sliding contact surface and the seal-side sliding contact surface and the axial protrusions, and effectively form oil films due to wedge films.

The cage circular annular portion preferably has a chamfer obliquely extending in a cross section perpendicular to the circumferential direction, to connect the cage-side sliding contact surface and the cage guided surface to each other.

With this arrangement, lubricating oil introduced into the space between the cage circular annular portion and the seal member through the inner-diameter-side axial grooves from the radially inner areas of the cage claw portions can be smoothly fed along the chamfer and led onto the cage-side sliding contact surface by a centrifugal force.

Each of the cage claw portions preferably has, in a radially outer surface of the cage claw portion, an outer-diameter-side axial groove axially extending from a distal end of the cage claw portion toward the cage circular annular portion, and shaped such that, from the distal end of the cage claw portion toward the cage circular annular portion, a position of a bottom of the outer-diameter-side axial groove gradually changes radially outwardly.

With this arrangement, since the position of the bottom of the outer-diameter-side axial groove of each cage claw portion gradually changes radially outwardly from the distal end of the cage claw portion toward the cage circular annular portion, lubricating oil supplied into the outer-diameter-side axial groove is moved from the distal end of the cage claw portion toward the cage circular annular portion by the pumping action, and is introduced into the space between the cage circular annular portion and the seal member. Therefore, it is possible to sufficiently lubricate the portions of the bearing between one of the cage-side sliding contact surface and the seal-side sliding contact surface and the axial protrusions, and effectively form oil films due to wedge films.

It is preferable that an axial end of the annular space opposite from an axial end of the annular space closed by the seal member is not provided with an additional seal member, and is open so that lubricating oil supplied from outside enters the annular space through this opening.

With this arrangement, it is possible to sufficiently lubricate the portions of the bearing between one of the cage-side sliding contact surface and the seal-side sliding contact surface and the axial protrusions, and reliably form oil films due to wedge films.

In order to achieve the above object, the present invention also provides a ball bearing comprising: an inner ring; an outer ring arranged radially outwardly of, and coaxially with, the inner ring; a plurality of balls disposed in an annular space between the inner ring and the outer ring; and a cage made of resin and retaining the balls. The outer ring has, on an inner periphery of the outer ring, an outer ring raceway groove with which the balls come into rolling contact, and a pair of outer ring groove shoulders located on both axial sides of the outer ring raceway groove. The cage comprises: a cage circular annular portion adjacent to a space through which the balls pass, and extending in a circumferential direction; and cage claw portions having a cantilevered structure axially extending from the cage circular annular portion, and each located between a corresponding pair of the balls circumferentially adjacent to each other. Each of the cage claw portions has an axial length larger than an axial width of the outer ring raceway groove, and the cage circular annular portion has, on a radially outer surface of the cage circular annular portion, root-side guided surfaces configured to come into sliding contact with one of the outer ring groove shoulders. The cage claw portions have, respectively, distal-end-side guided surfaces each formed on a radially outer surface of an axial end portion of the cage claw portion on a distal end side thereof, and configured to come into sliding contact with the other of the outer ring groove shoulders. Each of the root-side guided surfaces and the distal-end-side guided surfaces has a radially outwardly protruding circular arc shape in cross sections along the circumferential direction.

With this arrangement, since each of the root-side guided surfaces has, in cross sections along the circumferential direction, a radially outwardly protruding circular arc shape, oil films due to the wedge film effect are formed between the one outer ring groove shoulder and the root-side guided surfaces. Due to the oil films, the lubrication condition between the one outer ring groove shoulder and the root-side guided surfaces becomes the fluid lubrication condition, thus making it possible to markedly reduce the contact resistance between the cage and the outer ring. Since, as with the root-side guided surfaces, each of the distal-end-side guided surfaces also has a radially outwardly protruding circular arc shape in cross section along the circumferential direction, oil films due to the wedge film effect are formed between the other outer ring groove shoulder and the distal-end-side guided surfaces. Due to the oil films, the lubrication condition between the other outer ring groove shoulder and the distal-end-side guided surfaces becomes the fluid lubrication condition, thus making it possible to markedly reduce the contact resistance between the cage and the outer ring. Therefore, it is possible to prevent abnormal heat generation due to the sliding resistance of the contact portions of the cage and the outer ring. Also, since the one outer ring groove shoulder supports the cage circular annular portion from the radially outer side, and the other outer ring groove shoulder supports the axial ends of the cage claw portions on their distal end sides from the radially outer side, flexural deformation of the cage claw portion toward the radially outer side is less likely to occur. Therefore, even during high-speed rotation, it is possible to reduce torsional deformation of the cage circular annular portion, and flexural deformation of the cage claw portions per se toward the radially outer side due to the centrifugal forces which the cage claw portions receive.

Each of the cage claw portions preferably has circumferentially opposed surfaces which are circumferentially opposed to the corresponding pair of the balls, respectively, and of which portions configured to circumferentially support the corresponding pair of the balls are flat surfaces extending parallel to an imaginary straight line connecting a center of the cage circular annular portion and a center of the cage claw portion to each other in order that when the cage claw portion is moved radially outwardly by a centrifugal force, the circumferentially opposed surfaces do not interfere with the corresponding pair of the balls.

With this arrangement, since the circumferentially opposed surfaces of each cage claw portion are flat surfaces, when the cage claw portion is moved radially outwardly by the centrifugal force applied to the cage claw portion, the circumferentially opposed surfaces of the cage claw portion do not interfere with the balls. Also, since the shear resistance of lubricating oil generated between the circumferentially opposed surfaces of the cage claw portion and the balls can be reduced, the heat generation in the ball bearing can also be reduced.

It is preferable that each of the root-side guided surfaces has, on a side thereof most remote from a corresponding one of the cage claw portions, an axial end edge chamfered into a rounded shape, and each of the distal-end-side guided surfaces has, on a side thereof remoter from the cage circular annular portion, an axial end edge chamfered into a rounded shape.

If chamfered into a rounded shape, oil films due to the wedge film effect can be effectively formed between the one outer ring groove shoulder and the root-side guided surfaces, and oil films due to the wedge film effect can be effectively formed between the other outer ring groove shoulder and the distal-end-side guided surfaces, too.

Each of the cage claw portions preferably has a relief recess in a portion of a radially outer surface of the cage claw portion between a corresponding one of the root-side guided surfaces and the distal-end-side guided surface of the cage claw portion, the relief recess having an axial width larger than the axial width of the outer ring raceway groove, and extending in the circumferential direction.

If such relief recesses are formed, it is possible to prevent each of the boundaries between the outer ring raceway groove and the respective outer ring groove shoulders from coming into sliding contact with the radially outer surface of the cage circular annular portion or the radially outer surfaces of the cage claw portions. Therefore, it is possible to prevent the radially outer surface of the cage circular annular portion and the radially outer surfaces of the cage claw portions from becoming worn locally at the positions corresponding to the boundaries between the outer ring raceway groove and the outer ring groove shoulders.

Each of the cage claw portions preferably has, in the radially inner surface of the cage claw portion, an oil reservoir groove axially extending from a distal end of the cage claw portion toward the cage circular annular portion.

If such oil reservoir grooves are formed, lubricating oil scattered radially outwardly by a centrifugal force can be stored in the oil reservoir grooves, and supplied to the inner ring.

It is preferable that the ball bearing further comprises an annular seal member closing one axial end opening of the annular space. The cage circular annular portion has a cage-side sliding contact surface axially opposed to the seal member and configured to come into sliding contact with the seal member. The seal member has a seal-side sliding contact surface configured to come into sliding contact with the cage-side sliding contact surface, and a plurality of axial protrusions each of which has, in cross sections along the circumferential direction, an axially convex circular arc shape formed on one of the cage-side sliding contact surface and the seal-side sliding contact surface at constant pitches in the circumferential direction.

With this arrangement, since a plurality of axial protrusions whose cross sections along the circumferential direction have an axially convex circular arc shape formed on one of the cage-side sliding contact surface and the seal-side sliding contact surface at constant pitches in the circumferential direction, oil films due to the wedge film effect are formed between the sliding contact surface and the respective axial protrusions. Due to the oil films, the lubrication condition between the sliding contact surface and the axial protrusions becomes fluid lubrication condition, thus making it possible to markedly reduce the contact resistance between the cage and the seal member. Therefore, it is possible to prevent abnormal heat generation due to the sliding resistance of the contact portions of the cage and the seal member. Also, since the cage circular annular portion is disposed to come into sliding contact with the seal member, it is possible to increase the axial thickness of the cage circular annular portion, and thus increase the rigidity of the cage circular annular portion. Therefore, even during high-speed rotation, it is possible to reduce torsional deformation of the cage circular annular portion due to the centrifugal forces that the cage claw portions receive.

Each of the axial protrusions preferably comprises: a parallel apex portion having an axially convex circular arc shape in cross sections along the circumferential direction whose apex height is radially uniform; and an inclined apex portion having an axially convex circular arc shape in cross sections along the circumferential direction whose apex height gradually decreases radially outward from a radially outer end of the parallel apex portion.

With this arrangement, while the bearing is rotating at a low speed and the centrifugal forces which the cage claw portions receive are relatively small, oil films due to the wedge film effect can be formed between the sliding contact surface and the parallel apex portions of the respective axial protrusions. Also, while the bearing is rotating at a high speed and the centrifugal forces which the cage claw portions receive are relatively large, an oil film due to the wedge film effect can be formed between the sliding contact surface, and the parallel apex portion and the inclined apex portion of each axial protrusion with torsional deformation of the cage circular annular portion relatively large. As described above, regardless of the rotation speed of the bearing, oil films due to the wedge film effect can be stably formed between the cage and the seal member.

A cross section of the inclined apex portion of each of the axial protrusions perpendicular to the circumferential direction preferably has a rounded shape smoothly connected to the parallel apex portion.

If such a rounded shape is used, since the inclined apex portion and the parallel apex portion are smoothly connected to each other, when, with torsional deformation of the cage circular annular portion relatively large, an oil film due to the wedge film effect is formed between the sliding contact surface, and the parallel apex portion and the inclined apex portion, the oil film can be formed stably.

The axial protrusions are preferably disposed at positions where the axial protrusions overlap with a pitch circle of the balls, or disposed radially outwardly of the pitch circle.

With this arrangement, when the centrifugal forces applied to the cage claw portions cause torsional deformation of the cage circular annular portion in the direction in which the cage claw portions are inclined radially outward, it is possible to prevent, due to the torsional deformation, the cage-side sliding contact surface and the seal-side sliding contact surface from coming into contact with each other at a position displaced radially outwardly of the axial protrusions.

It is preferable that an axial end of the annular space opposite from an axial end of the annular space closed by the seal member is not provided with an additional seal member, and is open so that lubricating oil supplied from outside enters the annular space through this opening.

With this arrangement, it is possible to sufficiently lubricate the root-side guided surfaces and the distal-end-side guided surfaces, and reliably form oil films due to wedge films.

Each of the above ball bearings is particularly suitably used as a bearing of an electric motor of an electric vehicle, or a bearing of an electric vehicle transmission for reducing rotation of the electric motor.

In the ball bearing of the present invention, deformation of the cage made of resin due to a centrifugal force is less likely occur during high-speed rotation.

DETAILED DESCRIPTION OF THE INVENTION

Figure 1:
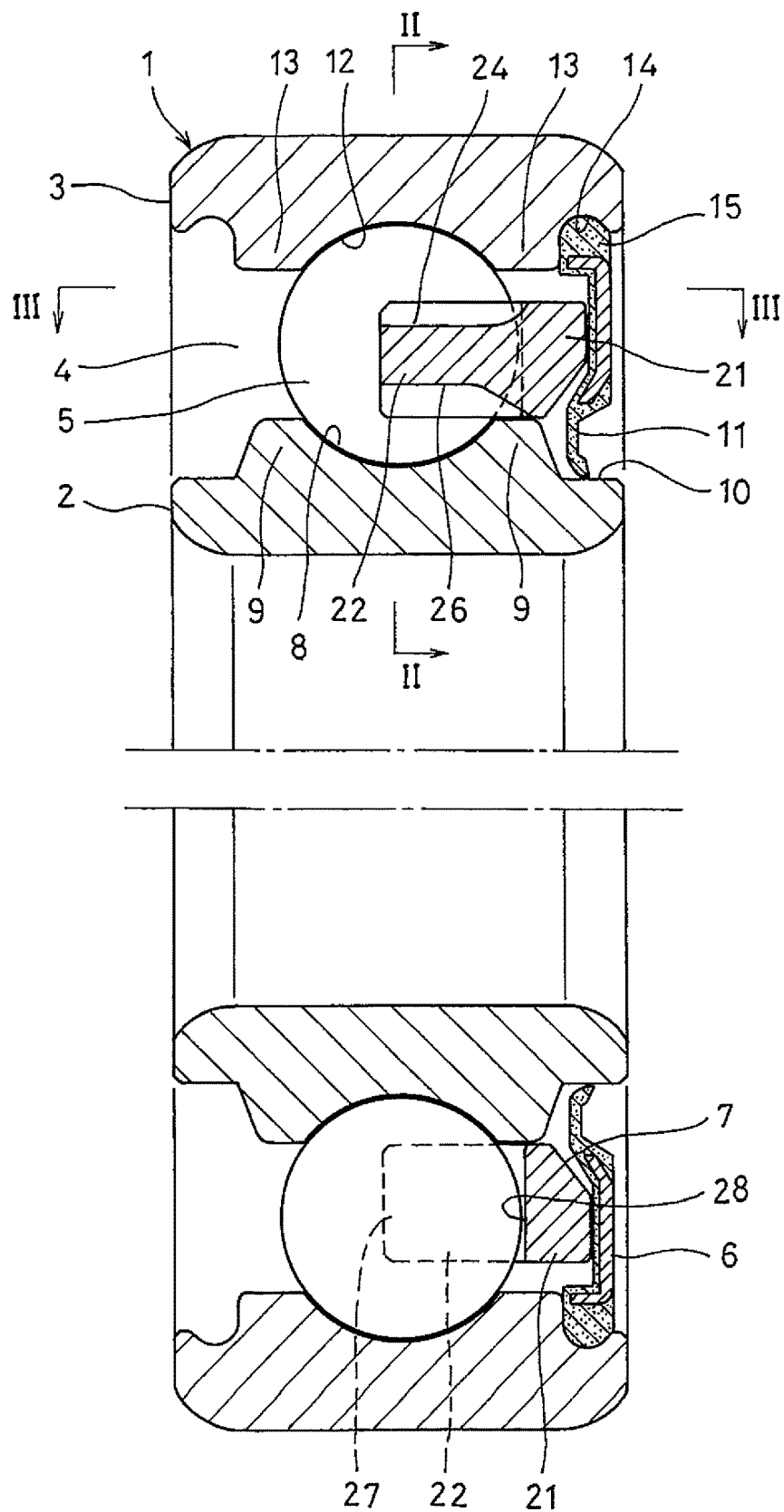
FIG. 1 is a sectional view of a ball bearing according to a first embodiment of the present invention.

FIG. 1 illustrates a ball bearing 1 according to the first embodiment of the present invention. The ball bearing 1 includes an inner ring 2; an outer ring 3 arranged radially outwardly of, and coaxially with, the inner ring 2; a plurality of balls 5 disposed in an annular space 4 between the inner ring 2 and the outer ring 3 so as to be circumferentially spaced apart from each other; an annular seal member 6 closing one of the end openings of the annular space 4 on both axial sides thereof; and a resin cage 7 made of resin (hereinafter simply referred to as the "cage 7") that keeps the circumferential distances between the balls 5. The ball bearing 1 is a sealed ball bearing including the seal member 6.

Formed on the outer periphery of the inner ring 2 are an inner ring raceway groove 8 with which the balls 5 come into rolling contact; a pair of inner ring groove shoulders 9 located axially outwardly of the inner ring raceway groove 8; and a sliding recess 10 located axially outwardly of one of the inner ring groove shoulders 9. The inner ring raceway groove 8 is a circular arc groove having a concave circular arc-shaped cross section along the surfaces of the balls 5, and extends circumferentially at the axial central portion of the outer periphery of the inner ring 2. The pair of inner ring groove shoulders 9 are bank-shaped portions circumferentially extending on both axial sides of the inner ring raceway groove 8. The sliding recess 10 is a circumferentially extending recess adjacent to the axially outer side of the one inner ring groove shoulder 9. The seal member 6 has, at the radially inner end thereof, a seal lip 11 in sliding contact with the inner surface of the sliding recess 10. In the shown example, the portion of the inner surface of the sliding recess 10 with which the seal lip 11 is in sliding contact is a cylindrical surface portion having a uniform outer diameter along the axial direction.

Formed on the outer periphery of the outer ring 3 are an outer ring raceway groove 12 with which the balls 5 come into rolling contact; a pair of outer ring groove shoulders 13 located axially outwardly of the outer ring raceway groove 12; and a seal fixing groove 14 located axially outwardly of one of the outer ring groove shoulders 13. The outer ring raceway groove 12 is a circular arc groove having a concave circular arc-shaped cross section along the surfaces of the balls 5, and extends circumferentially at the axial central portion of the inner periphery of the outer ring 3. The pair of outer ring groove shoulders 13 are bank-shaped portions circumferentially extending on both axial sides of the outer ring raceway groove 12. The seal fixing groove 14 is a circumferentially extending groove adjacent to the axially outer side of the one outer ring groove shoulder 13. The seal member 6 has, on the radially outer edge thereof, a fitted portion 15 fitted in, and fixed to, the seal fixing groove 14.

The balls 5 are radially sandwiched between the outer ring raceway groove 12 and the inner ring raceway groove 8. The outer ring raceway groove 12 and the inner ring raceway groove 8 have an axial width dimension larger than half of the diameter of each ball 5. The balls 5 are steel balls. Instead, however, ceramic balls may be used as the balls 5.

Figure 4:
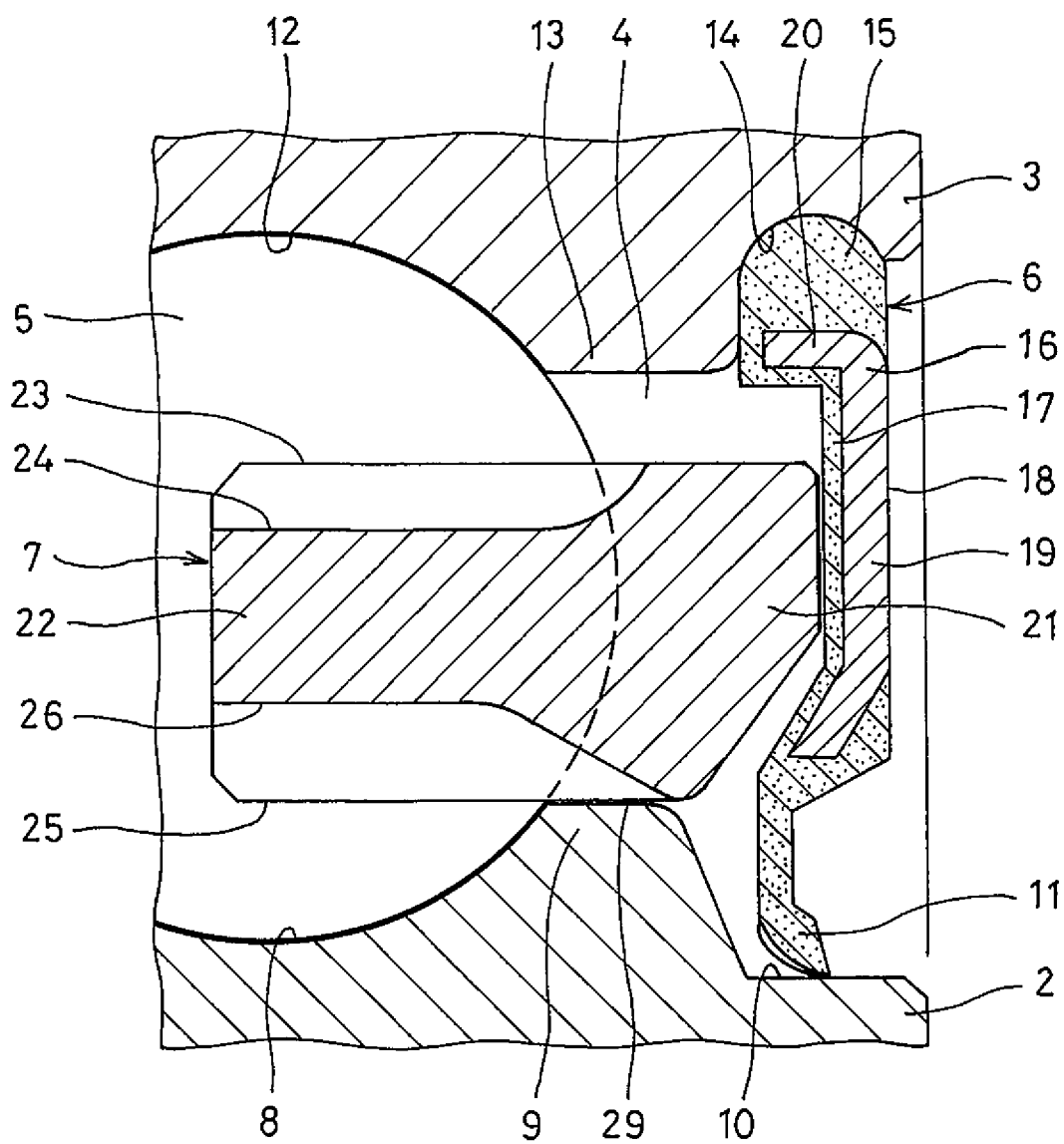
FIG. 4 is an enlarged sectional view illustrating a resin cage of the ball bearing of FIG. 1 and the vicinity of the cage.

As illustrated in FIG. 4, the seal member 6 is an annular member comprising an annular metal core 16, and a rubber part 17 bonded to the surface of the metal core 16 by vulcanization of a rubber material (such as nitrile rubber or acrylic rubber). The seal member 6 includes a fitted portion 15 fitted in the seal fixing groove 14; a circular annular plate portion 18 extending radially inwardly from the fitted portion 15; and a seal lip 11 kept in sliding contact with the inner surface of the sliding recess 10. The metal core 16 includes a circular annular plate-shaped flange portion 19; and a cylindrical portion 20 bent axially inwardly along the radially outer edge of the flange portion 19. The flange portion 19 is embedded in the circular annular plate portion 18 of the seal member 6. The cylindrical portion 20 is embedded in the fitted portion 15 of the seal member 6.

As illustrated in FIG. 1, the seal member 6 is disposed only in one of the end openings of the annular space 4 on both axial sides thereof. In other words, the axial end of the annular space 4 on the opposite side (left side in FIG. 1) from the axial end of the annular space 4 on its side closed by the seal member 6 (right side in FIG. 1) is not provided with an additional seal member 6, and is thus open so that lubricating oil supplied from outside enters the annular space 4 through this opening.

The cage 7 includes a cage circular annular portion 21 extending in the circumferential direction and adjacent to the area through which the balls 5 pass; and cage claw portions 22 axially extending from the cage circular annular portion 21 each between the corresponding circumferentially adjacent balls 5. The cage circular annular portion 21 and the cage claw portions 22 are seamlessly and integrally formed of a resin composition. The resin composition forming the cage circular annular portion 21 and the cage claw portions 22 may be composed of only a resin material, but, here, a resin composition comprising a resin material and a reinforcing fiber material added thereto is used. The cage 7 is preferably formed by injection molding. The cage circular annular portion 21 extends circumferentially through the space between the seal member 6 and the space through which the balls 5 pass.

The resin material as the base material of the resin composition may be a polyamide (PA) or a super engineering plastic. As the polyamide, for example, polyamide 46 (PA46), polyamide 66 (PA66) or polynonamethylene terephthalamide (PA9T) can be used. As the super engineering plastic, for example, polyether ether ketone (PEEK) or polyphenylene sulfide (PPS) can be used. As the reinforcing fiber material added to the resin material, for example, glass fiber, carbon fiber or aramid fiber can be used.

Each cage claw portion 22 has cantilevered structure of which one axial end is a fixed end fixed to the cage circular annular portion 21, and the other axial end is a free end. The cage claw portion 22 has an axial length larger than the radius of each ball 5. The cage claw portion 22 has a uniform radial thickness in the axial direction, that is, the radial thickness does not change in the axial direction.

Figure 2:
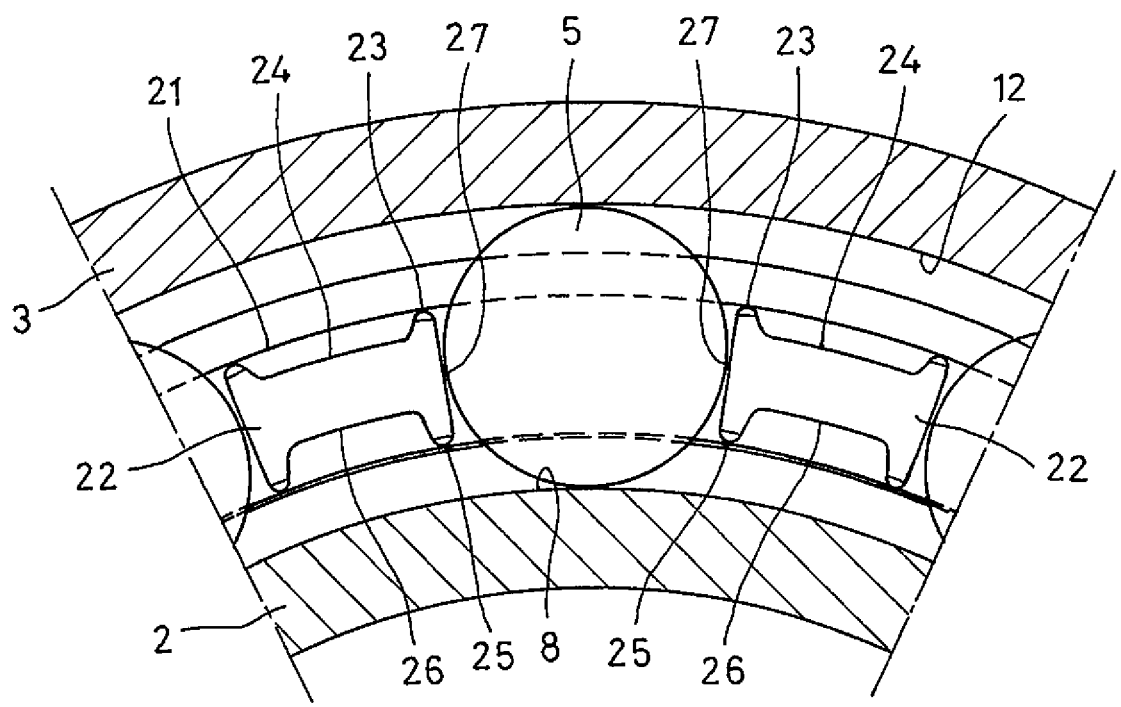
FIG. 2 is a sectional view taken along line II-II of FIG. 1.

As illustrated in FIGS. 2 and 4, the cage claw portion 22 has, in its radially outer surface 23, an outer-diameter-side axial groove 24 axially extending from the distal end of the cage claw portion 22 toward the cage circular annular portion 21. Also, the cage claw portion 22 has, in its radially inner surface 25, an inner-diameter-side axial groove 26 axially extending from the distal end of the cage claw portion 22 toward the cage circular annular portion 21. As illustrated in FIG. 2, the outer-diameter-side axial groove 24 and the inner-diameter-side axial groove 26 have a width equal to, or larger than, half of the circumferential width of the distal end of the cage claw portion 22. Due to the outer-diameter-side axial groove 24 and the inner-diameter-side axial groove 26, the cross section of the cage claw portion 22 perpendicular to the axial direction has an H shape of which the openings of the letter H face radially outward and radially inward, respectively. Also, in order that the cage claw portion 22 has the same H shape when the cage claw portion 22 is axially seen from its distal end side, the outer-diameter-side axial groove 24 and the inner-diameter-side axial groove 26 are open to the distal end of the cage claw portion 22.

The cage claw portion 22 has circumferentially opposed surfaces 27 circumferentially opposed to the corresponding balls 5, respectively. The portions of the circumferentially opposed surfaces 27 which circumferentially support the balls 5 are flat surfaces extending such that when the cage claw portion 22 is moved radially outwardly by a centrifugal force, the circumferentially opposed surfaces 27 do not interfere with the balls 5. In the shown example, the circumferentially opposed surfaces 27 are flat surfaces extending parallel to the imaginary straight line connecting the center of the cage circular annular portion 21 and the center of the cage claw portion 22 to each other (flat surfaces extending such that the cage claw portion 22 has a uniform circumferential width in the radial direction, i.e., a circumferential width that does not change in the radial direction), when seen in the axial direction. The center of the cage circular annular portion 21 is also the center of the inner ring 2 or the center of the outer ring 3. The center of the cage claw portion 22 is equally spaced apart from the circumferentially opposed surfaces 27 of the cage claw portion 22 on both circumferential sides thereof, when seen in the axial direction.

The distance between each circumferentially adjacent pair of cage claw portions 22 (i.e., the distance between the circumferentially opposed surfaces 27 of each circumferentially adjacent pair of cage claw portions 22 that are circumferentially opposed to each other via the ball) is preferably 1.02 to 1.11 times the diameter of the ball 5 on the pitch circle of the balls 5, because this reduces vibration of the cage 7.

Figure 3:
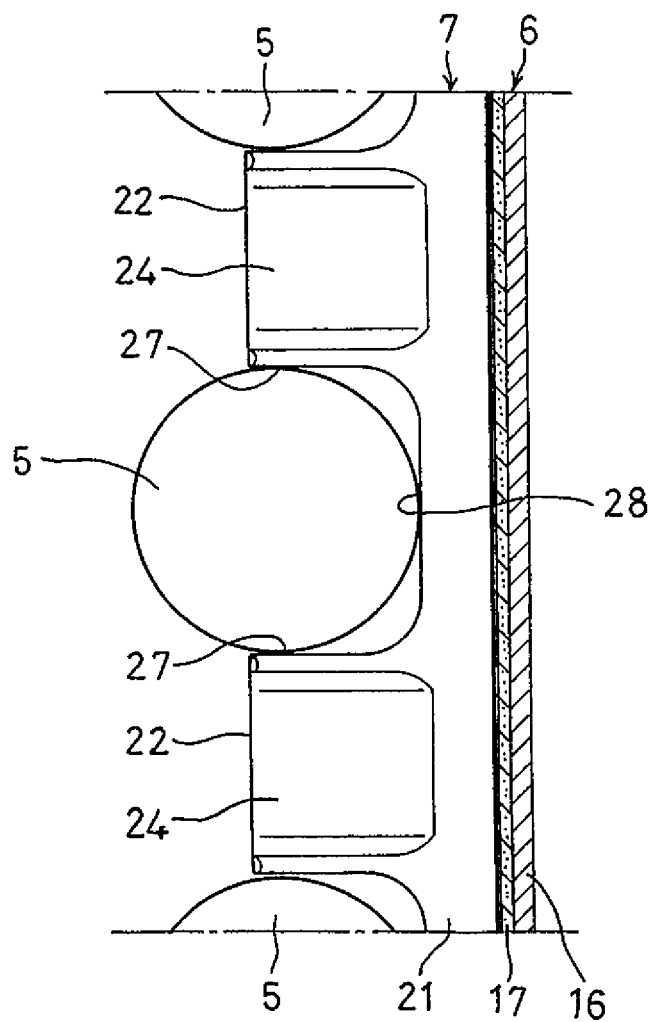
FIG. 3 is a sectional view taken along line III-III of FIG. 1.
Figure 5:
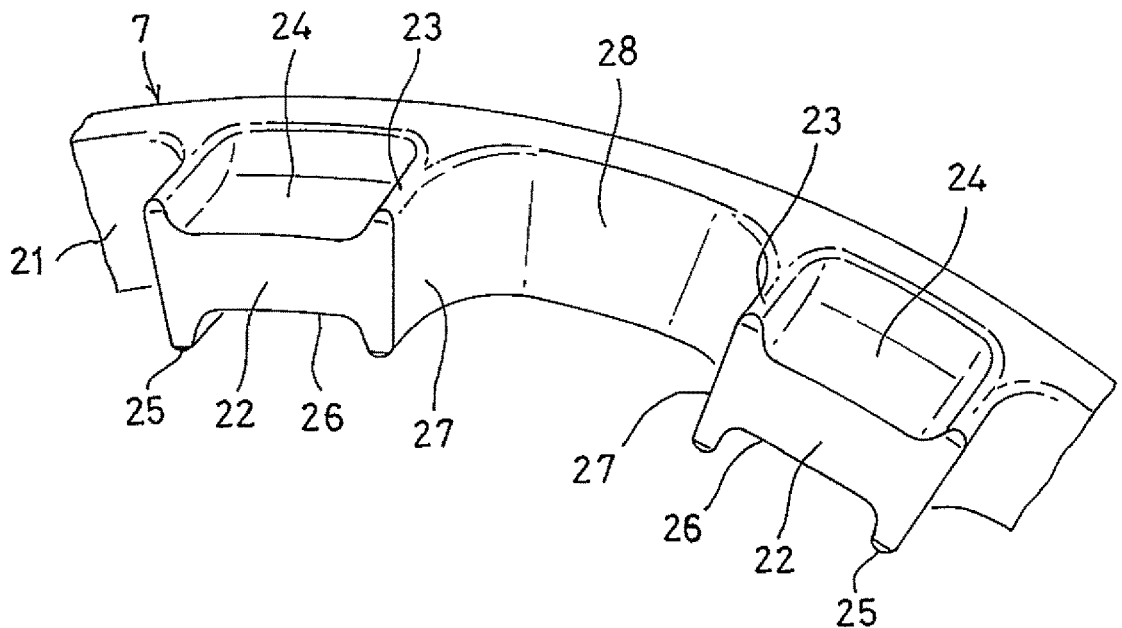
FIG. 5 is a perspective view of the cage of FIG. 1 when seen from the side of its cage claw portions.

As illustrated in FIGS. 3 and 5, the portion of each circumferentially opposed surface 27 that circumferentially supports the ball 5 extends straight in the axial direction with no circumferential inclination, when seen in the radial direction so that no axial component force is generated when supporting the ball 5. The cage circular annular portion 21 has axially opposed surfaces 28 axially opposed to the respective balls 5. Each circumferentially opposed surface 27 and the corresponding axially opposed surface 28 are connected together via a curved surface having a concave circular arc-shaped cross section. In the shown example, the curved surface connecting the circumferentially opposed surface 27 and the axially opposed surface 28 to each other is a single rounded curved surface (part-cylindrical surface having a constant radius of curvature).

As illustrated in FIG. 4, the axial end of the outer-diameter-side axial groove 24 of each cage claw portion 22 closer to the cage circular annular portion 21 rises to the outer periphery of the cage circular annular portion 21 to form a concave circular arc-shaped cross section, and the axial end of the inner-diameter-side axial groove 26 of the cage claw portion 22 closer to the cage circular annular portion 21 also rises to the inner periphery of the cage circular annular portion 21. The cage circular annular portion 21 has, on its inner periphery, a cage guided surface 29 configured to be guided by the one inner ring groove shoulder 9 of the inner ring 2 on its outer periphery while being in sliding contact therewith. The cage guided surface 29 is a circular annular surface configured to come into direct sliding contact with the one inner ring groove shoulder 9. By setting the sliding gap between the cage guided surface 29 and the one inner ring groove shoulder 9 to 0.22 mm or less, vibration of the cage 7 can be reduced. The portion of the inner-diameter-side axial groove 26 rising to the inner periphery of the cage circular annular portion 21 is open to the cage guided surface 29.

Figure 6:
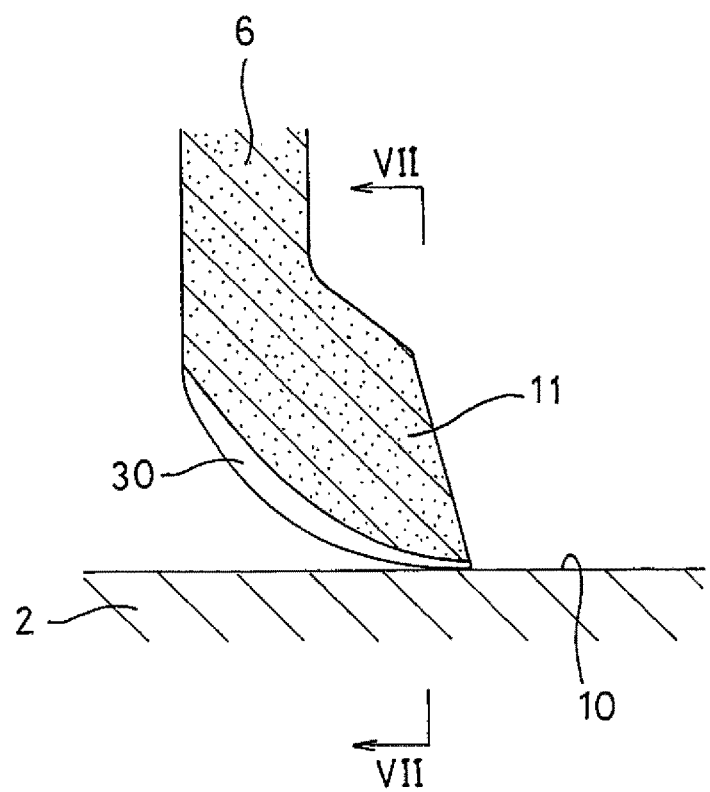
FIG. 6 is an enlarged view illustrating a seal lip of the seal member of FIG. 1 and the vicinity of the seal lip.
Figure 7:
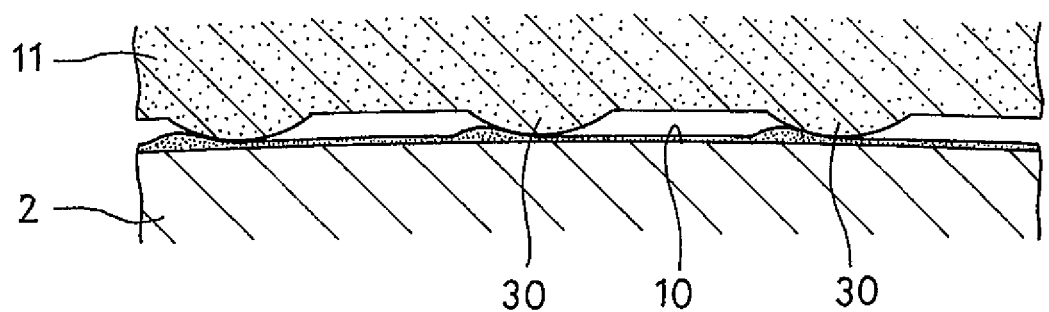
FIG. 7 is a sectional view taken along line VII-VII of FIG. 6.

As illustrated in FIGS. 6 and 7, the seal lip 11 includes, on its radially inner edge, a plurality of protrusions 30 kept in sliding contact with the sliding recess 10 of the inner ring 2 on its outer periphery, while being circumferentially spaced apart from each other. The protrusions 30 extend in the direction perpendicular to the circumferential direction. As illustrated in FIG. 7, the protrusions 30 have a convex circular arc-shaped cross section.

Figure 8:
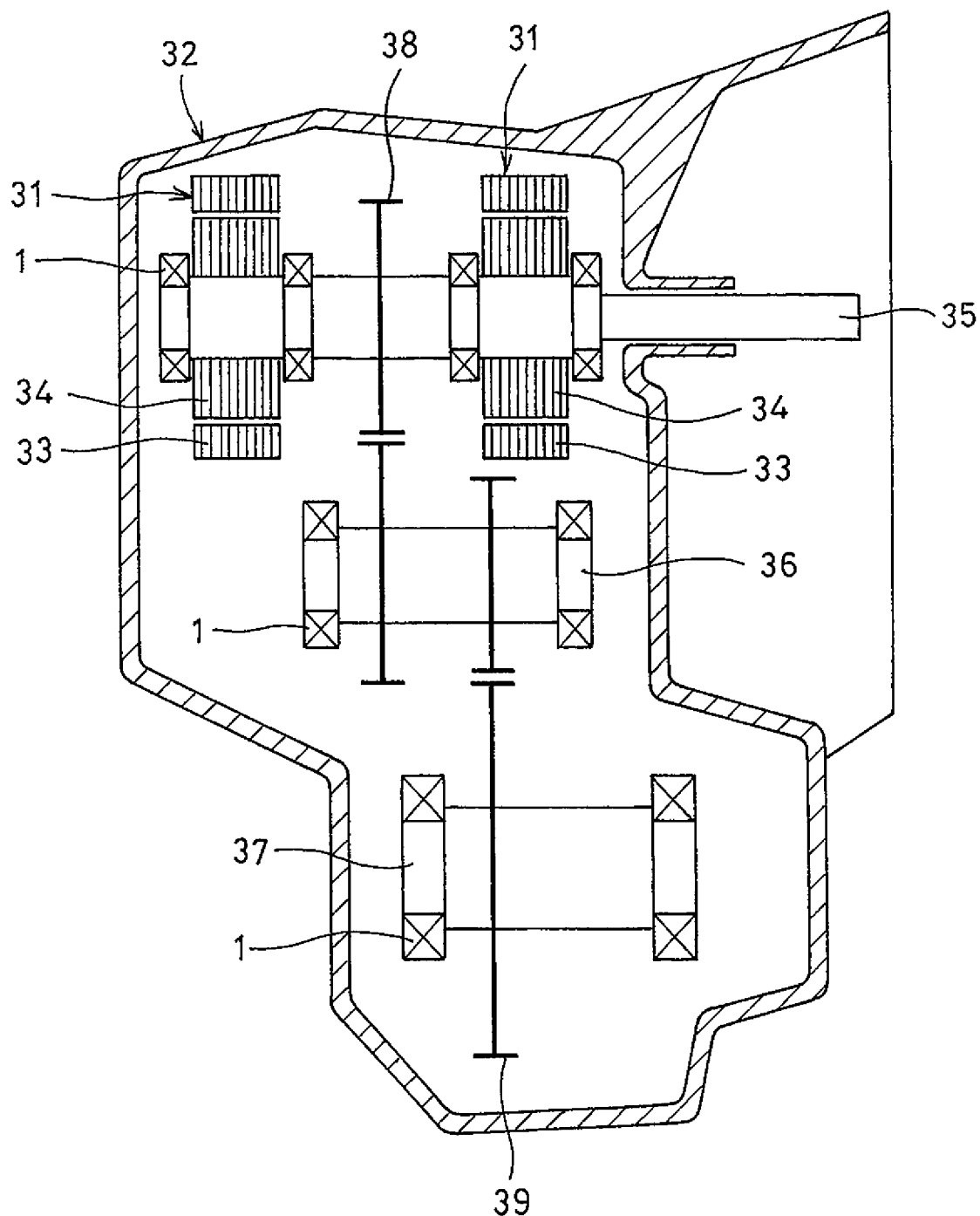
FIG. 8 is a schematic diagram of a transmission for an electric vehicle in which ball bearings as illustrated in FIG. 1 are used.
Figure 9:
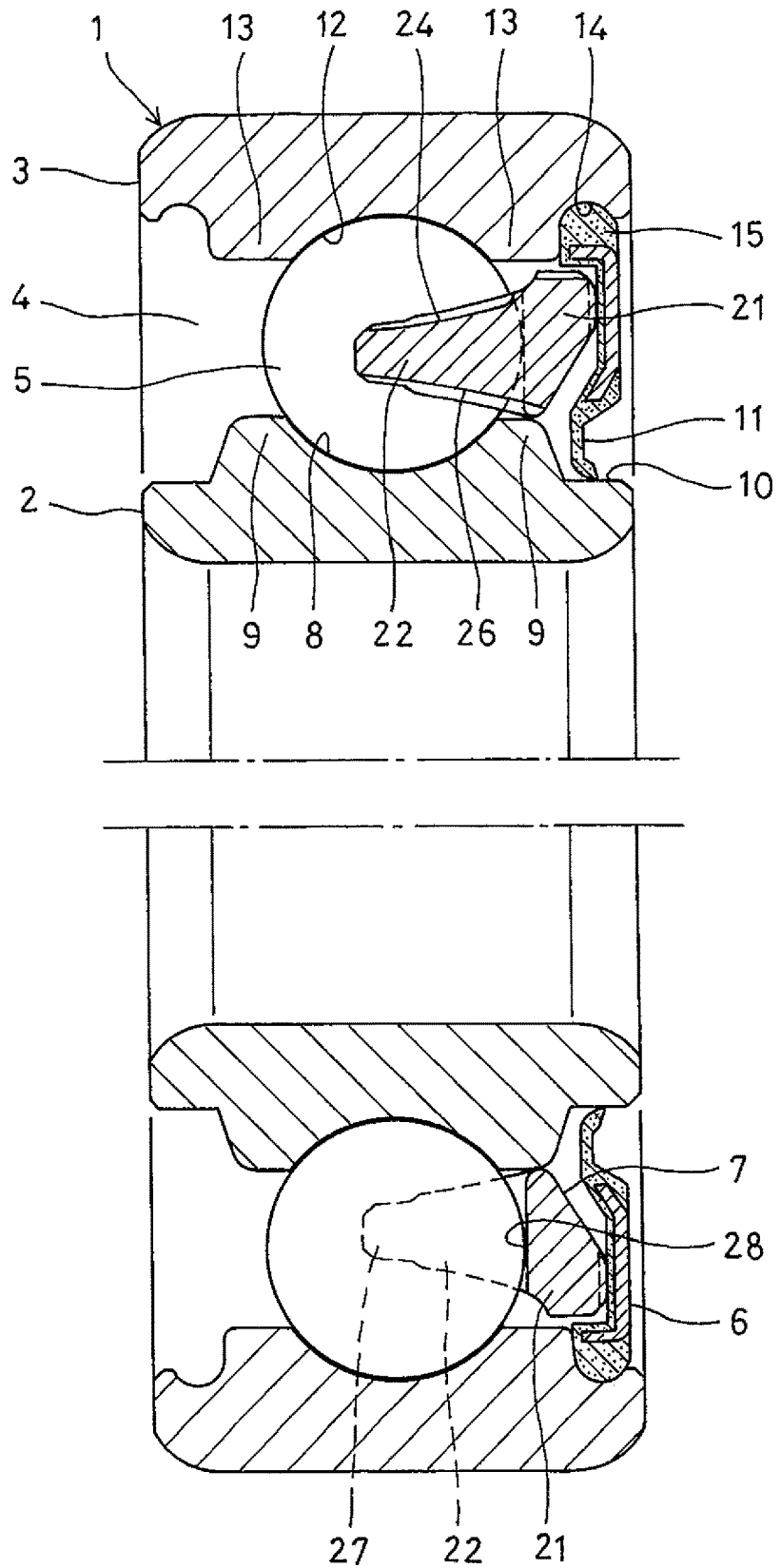
FIG. 9 is a sectional view of a ball bearing according to a second embodiment of the present invention.

As illustrated in FIG. 8, ball bearings 1 as described above are usable as bearings of an electric vehicle transmission 32 that reduces rotation of electric motors 31 of an electric vehicle such as a battery electric vehicle (EV) or a hybrid electric vehicle (HEV). The bearings of the electric vehicle transmission 32 rotate at the number of rotations in a low-speed to high-speed wide rotation range while the vehicle is travelling, and are used under the conditions that, while the bearings are rotating at the highest speed, the dmn (ball pitch circle diameter (mm)×the number of rotations ($min^{-1}$)) value exceeds 2 million.

The transmission of FIG. 8 includes stators 33 and rotors 34 of the electric motors 31; a rotary shaft 35 coupled to the rotors 34, ball bearings 1 rotatably supporting the rotary shaft 35; a second rotary shaft 36 and a third rotary shaft 37 both arranged parallel to the rotary shaft 35; a first gear train 38 that transmits rotation of the rotary shaft 35 to the second rotary shaft 36; and a second gear train 39 that transmits rotation of the second rotary shaft 36 to the third rotary shaft 37. The stators 33 are annular stationary members, and the rotors 34 as the rotary members are disposed inside the respective stators 33. When the stators 33 are energized, the rotors 34 rotate due to the electromagnetic forces acting between the stators 33 and the rotors 34, and the rotation of the rotors 34 is inputted/transmitted to the rotary shaft 35.

In this ball bearing 1, since, as illustrated in FIG. 5, each cage claw portion 22 has an H-shaped cross section due to the outer-diameter-side axial groove 24 in the radially outer surface 23 of the cage claw portion 22 and the inner-diameter-side axial groove 26 in the radially inner surface 25 of the cage claw portion 22, it is possible to reduce the mass of the cage claw portions 22 while ensuring the moment of inertia of area of the cage claw portions 22 (while making the cage claw portions 22 less likely to deform against the bending moment). Therefore, even during high-speed rotation, it is possible to reduce torsional deformation of the cage circular annular portion 21, and flexural deformation of the cage claw portions 22 per se toward the radially outer side due to the centrifugal forces which the cage claw portions 22 receive. It has become clear from data analysis by the inventors that the deformation amount by which the cage claw portions 22 formed with the outer-diameter-side axial grooves 24 and the inner-diameter-side axial grooves 26 are deformed by a centrifugal force can be reduced to at least 77% or less compared to the cage claw portions 22 that are not formed with the outer-diameter-side axial grooves 24 and the inner-diameter-side axial grooves 26.

Also, in this ball bearing 1, since, as illustrated in FIG. 2, the portions of the circumferentially opposed surfaces 27 of each cage claw portion 22 that circumferentially support the balls 5 are flat surfaces extending parallel to the imaginary straight line connecting the center of the cage circular annular portion 21 and the center of the cage claw portion 22 to each other, when the cage claw portion 22 is moved radially outwardly by the centrifugal force applied to the cage claw portion 22, it is possible to prevent the circumferentially opposed surfaces 27 of the cage claw portion 22 from interfering with the balls 5. Also, since the shear resistance of lubricating oil generated between the circumferentially opposed surfaces 27 of the cage claw portions 22 and the balls 5 decreases, it is also possible to reduce the heat generation in the ball bearing 1.

Also, in this ball bearing 1, since, as illustrated in FIG. 5, the circumferentially opposed surfaces 27 of each cage claw portion 22 are connected to the respective axially opposed surfaces 28 via curved surfaces having a concave circular arc-shaped cross section, it is possible to ensure the cross-sectional area of the axial root portion of the cage claw portion 22 while keeping a small mass of the axial distal end portion of the cage claw portion 22. Therefore, it is possible to effectively reduce deflection of the cage claw portion 22 due to the centrifugal force applied to the cage claw portion 22.

Also, in this ball bearing 1, since, as illustrated in FIG. 4, the axial end of the outer-diameter-side axial groove 24 of each cage claw portion 22 closer to the cage circular annular portion 21 rises to form a concave circular arc-shaped cross section, it is possible to ensure the cross-sectional area of the axial root portion of the cage claw portion 22 while keeping a small mass of the axial distal end portion of the cage claw portion 22. Also, since the axial end of the inner-diameter-side axial groove 26 of the cage claw portion 22 closer to the cage circular annular portion 21 also rises to the inner periphery of the cage circular annular portion 21, it is possible to more effectively ensure the cross-sectional area of the axial root portion of the cage claw portion 22. Therefore, it is possible to effectively reduce deflection of the cage claw portion 22 due to the centrifugal force applied to the cage claw portion 22.

Also, in this ball bearing 1, since, as illustrated in FIG. 4, the cage circular annular portion 21 has, on its inner periphery, a cage guided surface 29 configured to be guided while coming into sliding contact with the outer periphery of the inner ring 2, the cage 7 can be radially positioned by the sliding contact between the cage guided surface 29 of the cage circular annular portion 21 on its inner periphery and the outer periphery of the inner ring 2.

FIGS. 9 to 16 illustrate a ball bearing 1 according to the second embodiment of the present invention. The elements of the second embodiment corresponding to those of the first embodiment are denoted by the same reference numerals, and their description is omitted.

Figure 10:
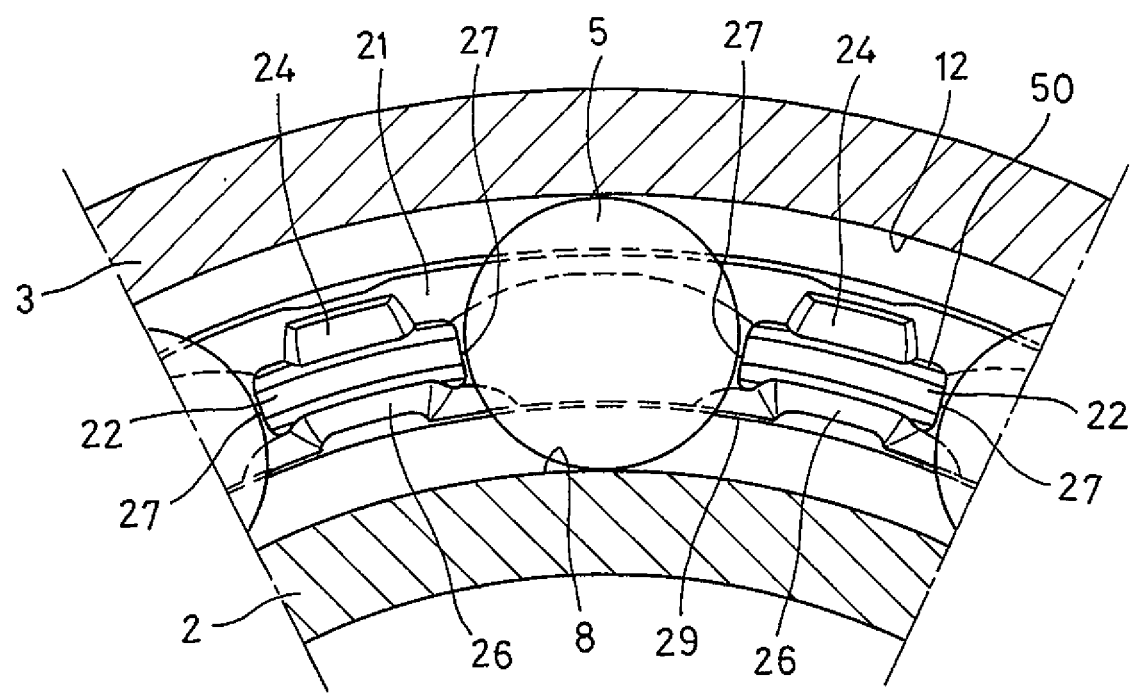
FIG. 10 is a view of the ball bearing of FIG. 9 corresponding to FIG. 2.

As illustrated in FIG. 10, the portions of the circumferentially opposed surfaces 27 of each cage claw portion 22 which circumferentially support the balls 5 are flat surfaces extending parallel to the imaginary straight line connecting the center of the cage circular annular portion 21 and the center of the cage claw portion 22 to each other when seen in the axial direction such that when the cage claw portion 22 is moved radially outwardly by a centrifugal force, the circumferentially opposed surfaces 27 do not interfere with the balls 5.

As illustrated in 11, the portions of the circumferentially opposed surfaces 27 that circumferentially support the balls 5 have no circumferential inclination, and extend straight in the axial direction when seen in the radial direction so that when supporting the balls 5, no axial component force is generated.

Figure 12:
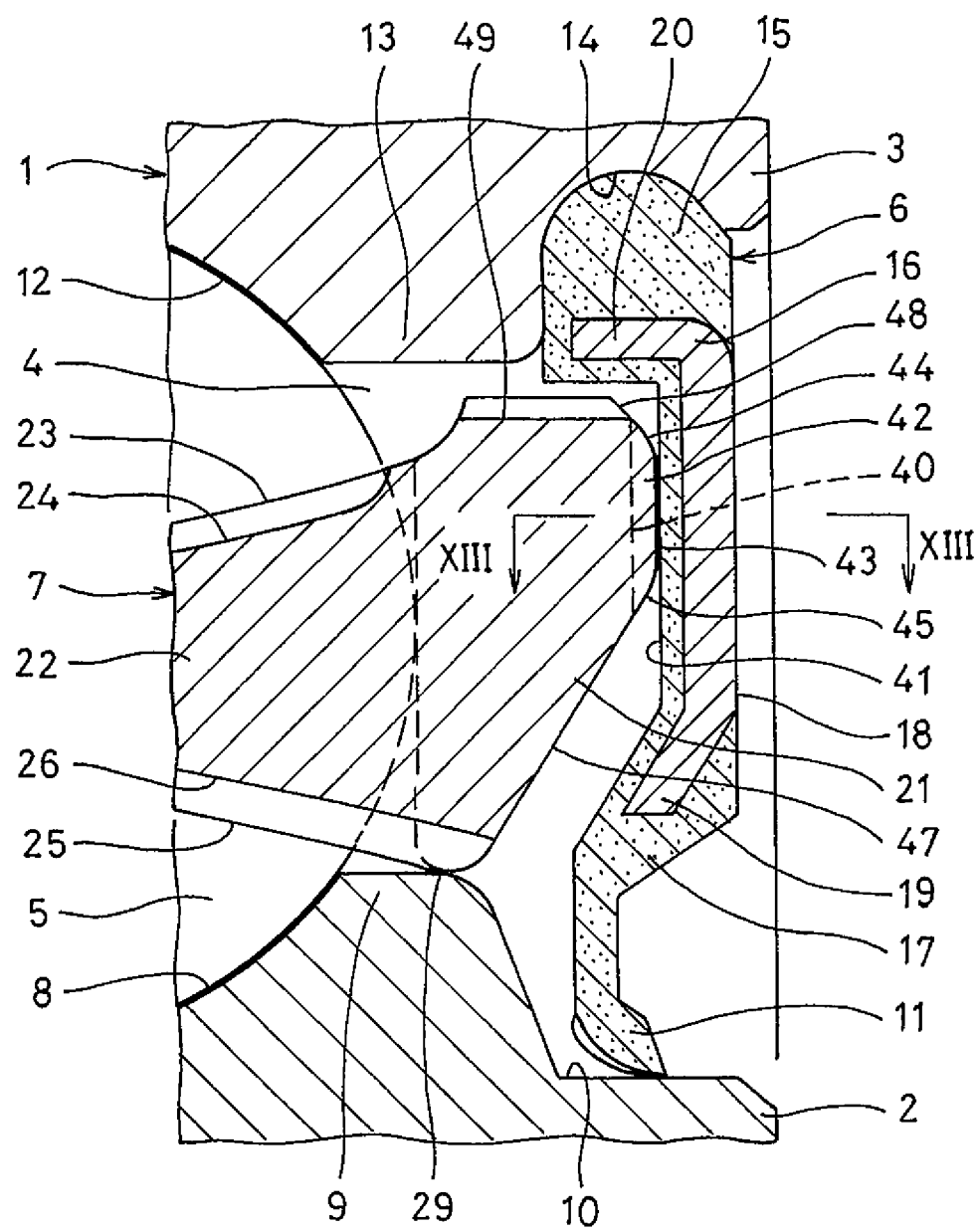
FIG. 12 is an enlarged sectional view illustrating a seal member of the ball bearing of FIG. 9 and the vicinity of the seal member.

As illustrated in FIG. 12, each cage claw portion 22 is tapered such that the radial thickness gradually decreases from its end closer to the cage circular annular portion 21 toward its end remoter from the cage circular annular portion 21 (i.e., from its root toward its distal end). The cage circular annular portion 21 has an axial thickness substantially equal to the axial distance between the balls 5 and the seal member 6 (specifically, 95% or more and less than 100% of the axial distance between the balls 5 and the seal member 6). The cage circular annular portion 21 has a cage-side sliding contact surface 40 that is axially opposed to the seal member 6 and comes into sliding contact with the seal member 6. The seal member 6 has a seal-side sliding contact surface 41 that comes into sliding contact with the cage-side sliding contact surface 40.

Figure 13:
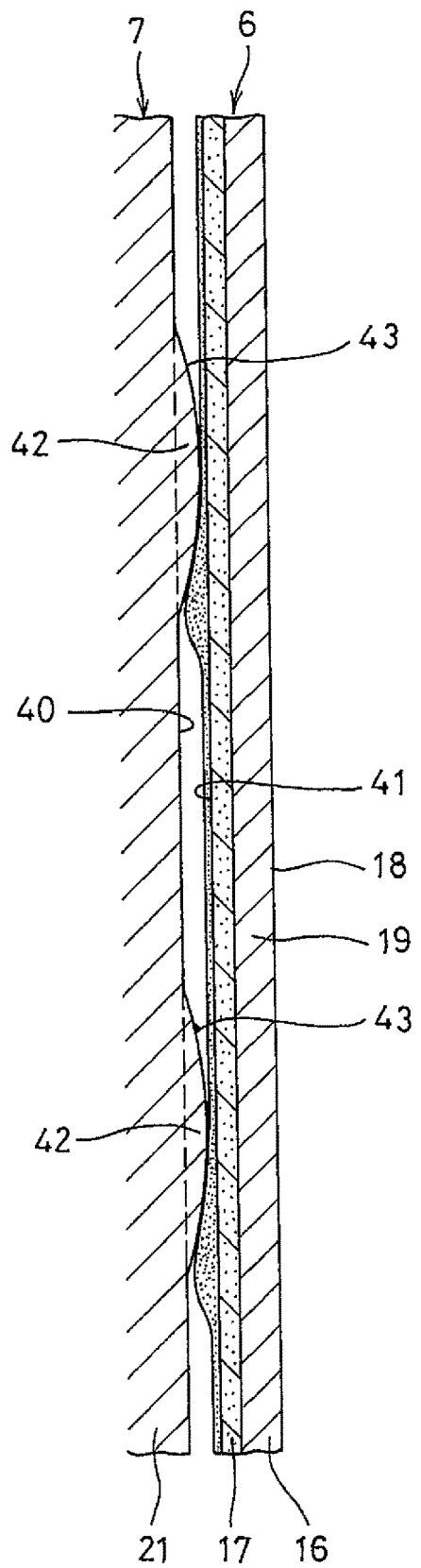
FIG. 13 is a sectional view taken along line XIII-XIII of FIG. 12.

As illustrated in FIG. 13, a plurality of axial protrusions 42 are formed on the cage-side sliding contact surface 40 at constant pitches in the circumferential direction. The cross section of each axial protrusion 42 along the circumferential direction has an axially convex circular arc shape. The axial protrusion 42 has an axial height set to 5% or less of the circumferential width dimension of the axial protrusion 42. In FIG. 13, the axial height of the axial protrusion 42 is exaggeratedly shown so that the axial protrusion 42 can be seen clearly. On the other hand, the seal-side sliding contact surface 41 is a circular annular flat surface extending in the direction perpendicular to the axial direction, and is formed with no axial protrusions 42.

As illustrated in FIG. 12, the axial protrusions 42 are disposed at positions where the axial protrusions 42 overlap with the pitch circle of the balls 5 (imaginary circle connecting the centers of the balls 5), or disposed radially outwardly of the pitch circle of the balls 5. The language "the axial protrusions 42 are disposed at positions where the axial protrusions 42 overlap with the pitch circle of the balls 5" refers to the positional relationship where the imaginary cylindrical surface passing through the pitch circle of the balls 5 passes through the axial protrusions 42. The language "the axial protrusions 42 are disposed radially outwardly of the pitch circle of the balls 5" refers to the positional relationship where the entire axial protrusions 42 are entirely located radially outwardly of the imaginary cylindrical surface passing through the pitch circle of the balls 5. In the shown example, the axial protrusions 42 are disposed radially outwardly of the pitch circle of the balls 5.

Figure 15:
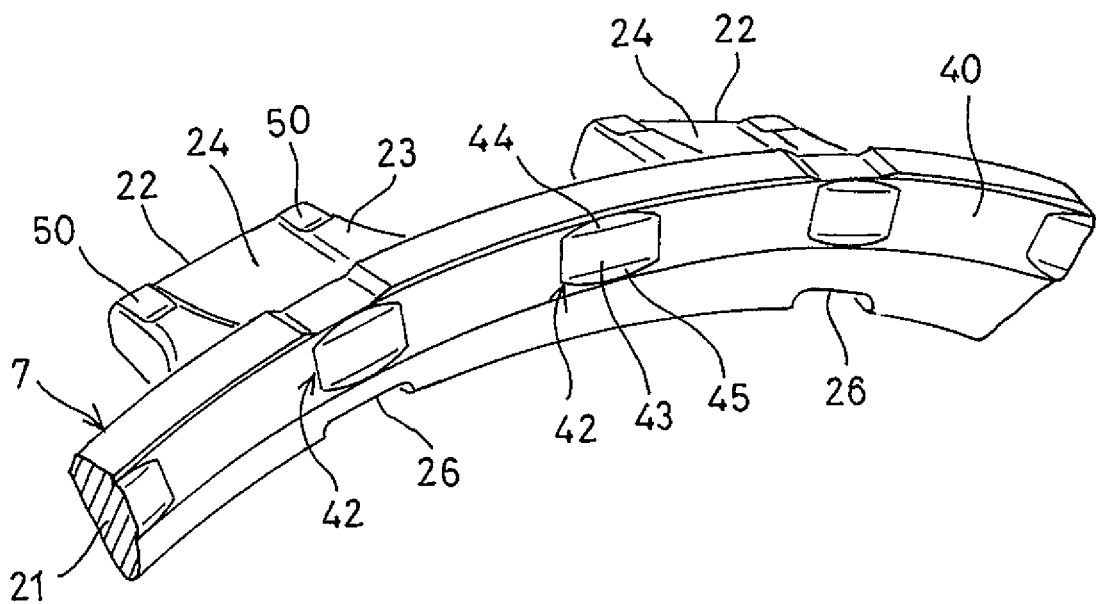
FIG. 15 is a perspective view of the cage of FIG. 9 when seen from the side of its cage circular annular portion.

As illustrated in FIGS. 12 and 15, the axial protrusions 42 each have a parallel apex portion 43, a first inclined apex portion 44 and a second inclined apex portion 45. The parallel apex portion 43 is a portion of the axial protrusion 42 having an axially circular arc convex shape in cross sections along the circumferential direction whose apex height is radially uniform. The first inclined apex portion 44 is a portion of the axial protrusion 42 having an axially convex circular arc shape in cross sections along the circumferential direction whose apex height gradually decreases radially outward from the radially outer end of the parallel apex portion 43. The second inclined apex portion 45 is a portion of the axial protrusion 42 having an axially convex circular arc shape in cross sections along the circumferential direction whose apex height gradually decreases radially inwardly from the radially inner end of the parallel apex portion 43. As illustrated in FIG. 12, the cross sections of the first and second inclined apex portions 44 and 45 perpendicular to the circumferential direction have a rounded shape smoothly connected to the parallel apex portion 43.

Figure 16:
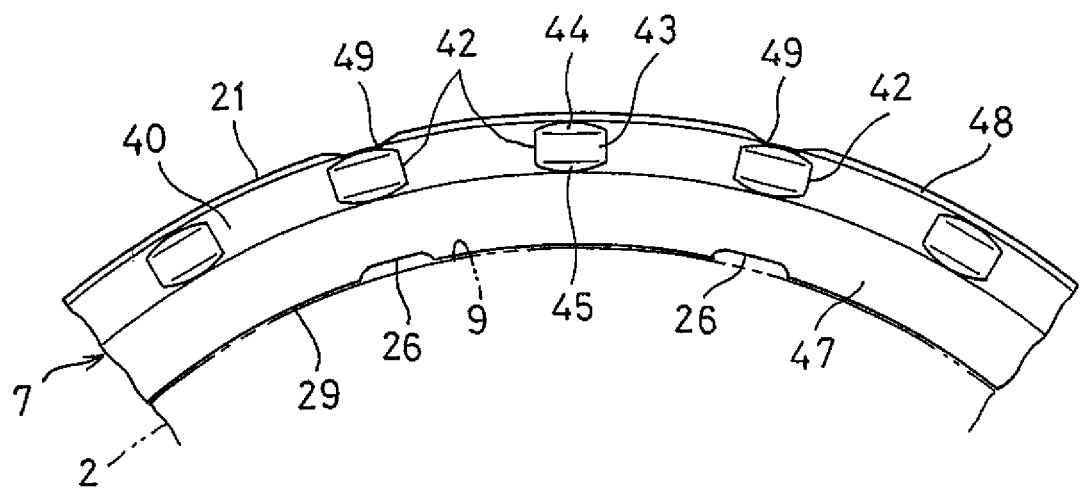
FIG. 16 is a side view of the cage of FIG. 9 when seen from the side of its cage circular annular portion.
Figure 17:
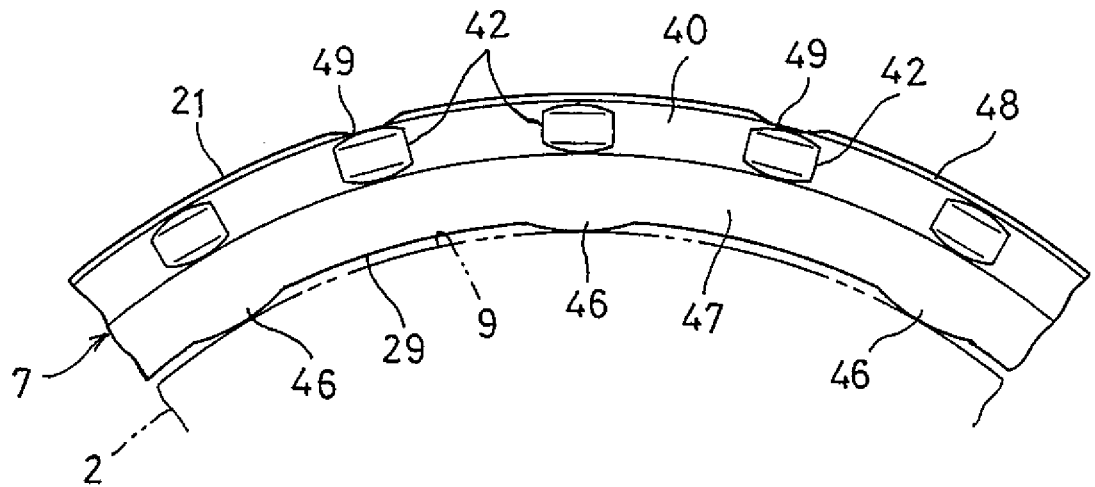
FIG. 17 is a side view illustrating a variation of the cage of FIG. 16.

As illustrated in FIG. 16, the cage guided surface 29 is a circular annular surface that comes into direct sliding contact with the one inner ring groove shoulder 9. As illustrated in FIG. 17, the cage guided surface 29 may be a circular annular surface formed with a plurality of radially inwardly protruding protrusions 46 having a convex circular arc shape, and circumferentially spaced apart from each other. In this case, by setting the sliding gap between the inner ring 2 and each protrusion 46 to 0.2 mm or less, vibration of the cage 7 can be reduced.

As illustrated in FIG. 12, the inner-diameter-side axial groove 26 of the radially inner surface 25 of each cage claw portion 22 axially extends through the radially inner surface 25 and the cage guided surface 29. As illustrated in FIG. 10, the inner-diameter-side axial groove 26 has a width equal to, or larger than, half of the circumferential width of the distal end of the cage claw portion 22.

As illustrated in FIG. 12, the cage circular annular portion 21 has a chamfer 47 which extends obliquely in a cross section perpendicular to the circumferential direction, to connect the cage-side sliding contact surface 40 and the cage guided surface 29 to each other. Due to the formation of the chamfer 47, the radially inner edge of the cage circular annular portion 21 has an axial width equal to, or smaller than, half of the axial width of the portion of the cage circular annular portion 21 having the largest axial width. Also, the cage circular annular portion 21 has a chamfer 48 obliquely extending in a cross section perpendicular to the circumferential direction, to connect the cage-side sliding contact surface 40 and the outer peripheral surface of the cage circular annular portion 21 to each other.

Figure 11:
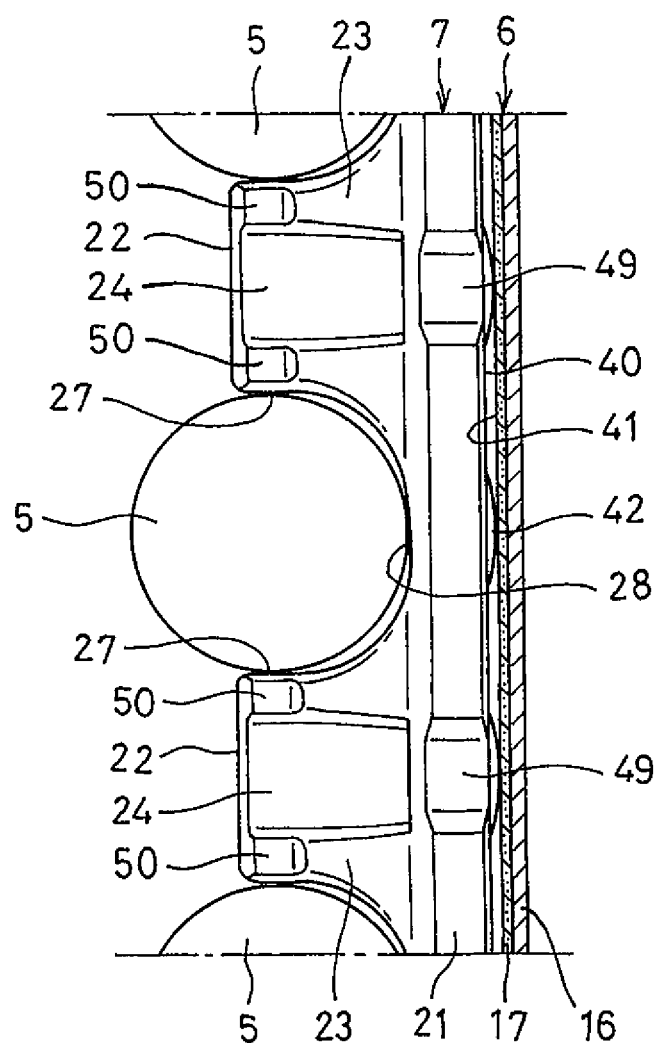
FIG. 11 is a view of the ball bearing of FIG. 9 corresponding to FIG. 3.
Figure 14:
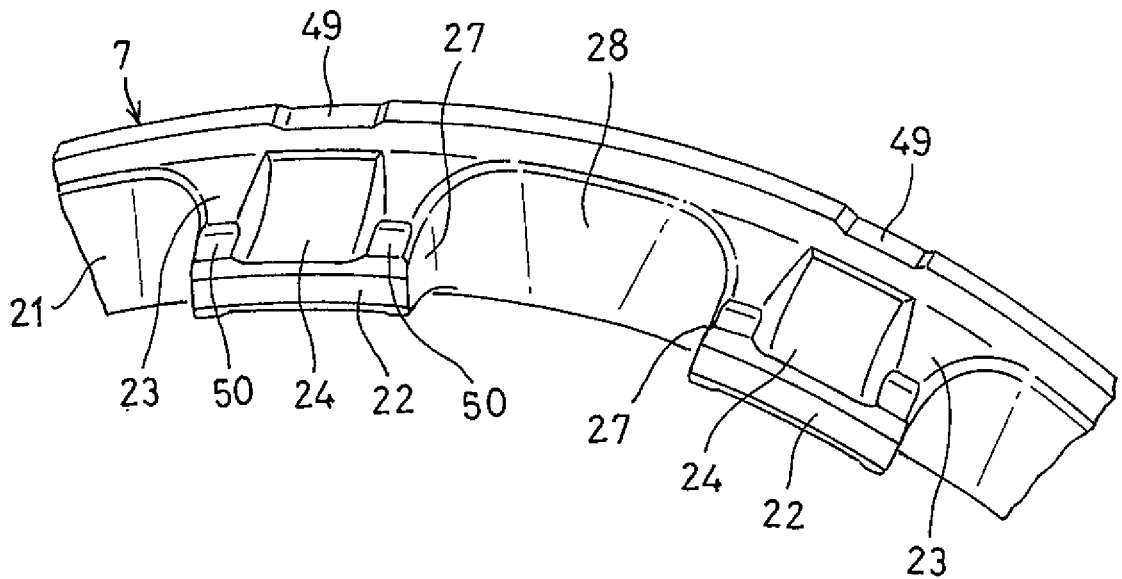
FIG. 14 is a perspective view of the cage of FIG. 9 when seen from the side of its cage claw portions.

The outer-diameter-side axial groove 24 of the radially outer surface 23 of each cage claw portion 22 is shaped such that, from the distal end of the cage claw portion 22 toward the cage circular annular portion 21, the position of the groove bottom gradually changes radially outwardly. As illustrated in FIGS. 11 and 14, the outer-diameter-side axial groove 24 has a width equal to, or larger than, half of the circumferential width of the distal end of the cage claw portion 22. Also, the cage circular annular portion 21 has, in its outer periphery, axial cutouts 49 at positions corresponding to the respective outer-diameter-side axial grooves 24.

As illustrated in FIGS. 11 and 14, each cage claw portion 22 includes claw tip oil passages 50 formed on both circumferential sides of the distal end portion of the radially outer surface 23 (i.e., formed in the shoulders of the outer-diameter-side axial groove 24 on both sides thereof), and circumferentially extending through the respective shoulders of the outer-diameter-side axial groove 24. The claw tip oil passages 50 are stepped cutouts rising from the side remoter from the cage circular annular portion 21 toward the side closer to the cage circular annular portion 21. By forming the claw tip oil passages 50, it is possible to improve lubricating performance for the balls 5.

In this ball bearing 1, since, as illustrated in FIG. 13, a plurality of axial protrusions 42 whose cross sections along the circumferential direction have an axially convex circular arc shape are formed on the cage-side sliding contact surface 40 at constant pitches in the circumferential direction, oil films due to the wedge film effect are formed between the seal-side sliding contact surface 41 and the respective axial protrusions 42. Due to the oil films, the lubrication condition between the seal-side sliding contact surface 41 and the axial protrusions 42 becomes fluid lubrication condition, thus making it possible to markedly reduce the contact resistance between the cage 7 and the seal member 6. Therefore, it is possible to prevent abnormal heat generation due to the sliding resistance of the contact portions of the cage 7 and the seal member 6.

There are two types of lubrication conditions between sliding contact surfaces, i.e., boundary lubrication condition and fluid lubrication condition. The boundary lubrication condition is the condition in which sliding contact surfaces are lubricated by an oil film comprising several molecular layers (about $10^{-5}$ to $10^{-6}$ mm) of lubricating oil adsorbed on the sliding contact surfaces, and minute protrusions and recesses of the sliding contact surfaces are in direct contact with each other. The fluid lubrication condition is the condition in which an oil film (e.g., about $10^{-3}$ to $10^{-1}$ mm) due to the wedge film effect is formed between sliding contact surfaces, and, due to the oil film, the sliding contact surfaces are not in direct contact with each other (i.e., they are in indirect contact with each other via the oil film). Since, when the fluid lubricating condition is generated due to the generation of the wedge film effect, the sliding resistance of the seal member becomes substantially zero, the bearing can be used at a high peripheral speed, which was impossible with conventional seals.

Also, in this ball bearing 1, since, as illustrated in FIG. 12, the cage circular annular portion 21 is disposed to come into sliding contact with the seal member 6, it is possible to increase the axial thickness of the cage circular annular portion 21, and thus increase the rigidity of the cage circular annular portion 21. Therefore, even during high-speed rotation, it is possible to reduce torsional deformation of the cage circular annular portion 21 due to the centrifugal forces that the cage claw portions 22 receive, and reduce radially outward inclination of the cage claw portions 22.

Also, this ball bearing 1 requires only a small space for installation, and thus can be installed at a place where the width dimension of a bearing needs to be reduced for installation (i.e., at a place where a bearing with a seal cannot be used, and an open-type ball bearing provided with no seal member 6, and having open ends on both axial sides has to be used instead), too.

Also, in this bearing 1, since, as illustrated in FIG. 11, the portion of each circumferentially opposed surface 27 of each cage claw portion 22 that circumferentially supports the ball 5 is a straight portion having no circumferential inclination, and extending straight in the axial direction, when the ball 5 is supported by the cage claw portion 22, no axial component force is generated at the cage claw portion 22. Therefore, it is possible to prevent the cage 7 from being axially pressed hard against the seal member 6, and effectively reduce the sliding resistance of the contact portions of the cage 7 and the seal member 6.

Also, in this ball bearing 1, since, as illustrated in FIG. 12, the axial protrusions 42, each including the parallel apex portion 43 and the first inclined apex portion 44, are used, while the bearing is rotating at a low speed and the centrifugal forces which the cage claw portions 22 receive are relatively small, oil films due to the wedge film effect can be formed between the seal-side sliding contact surface 41 and the parallel apex portions 43 of the respective axial protrusions 42. Also, while the bearing is rotating at a high speed and the centrifugal forces which the cage claw portions 22 receive are relatively large, an oil film due to the wedge film effect can be formed between the seal-side sliding contact surface 41, and the parallel apex portion 43 and the first inclined apex portion 44 of each axial protrusion 42 with torsional deformation of the cage circular annular portion 21 relatively large. As described above, regardless of the rotation speed of the bearing, oil films due to the wedge film effect can be stably formed between the cage 7 and the seal member 6.

Also, in this ball bearing 1, since, as illustrated in FIG. 12, the cross section of each first inclined apex portion 44 perpendicular to the circumferential direction has a rounded shape, and the first inclined apex portion 44 and the parallel apex portion 43 are smoothly connected to each other, when, with torsional deformation of the cage circular annular portion 21 relatively large, an oil film due to the wedge film effect is formed between the seal-side sliding contact surface 41, and the parallel apex portion 43 and the first inclined apex portion 44, the oil film can be formed stably.

Also, in this ball bearing 1, since, as illustrated in FIG. 12, the inner-diameter-side axial grooves 26 (radially inner oil grooves) are disposed in the inner periphery of the cage 7, lubricating oil supplied into the space radially inside of the cage claw portions 22 is introduced, through the inner-diameter-side axial grooves 26, into the space between the cage circular annular portion 21 and the seal member 6. Therefore, it is possible to sufficiently lubricate the portions of the bearing between the seal-side sliding contact surface 41 and the axial protrusions 42, and effectively form oil films due to wedge films.

Also, in this ball bearing 1, since, as illustrated in FIG. 12, a cage circular annular portion 21 is used which has a chamfer 47 obliquely extending, in a cross section perpendicular to the circumferential direction, to connect the cage-side sliding contact surface 40 and the cage guided surface 29 to each other, lubricating oil introduced into the space between the cage circular annular portion 21 and the seal member 6 through the inner-diameter-side axial grooves 26 from the radially inner areas of the cage claw portions 22 can be smoothly fed along the chamfer 47 and led onto the cage-side sliding contact surface 40, by a centrifugal force.

Also, in this ball bearing 1, since, as illustrated in FIG. 12, the axial protrusions 42 are disposed at positions where the axial protrusions 42 overlap with the pitch circle of the balls 5, or disposed radially outwardly of the pitch circle of the balls 5, when the centrifugal forces applied to the cage claw portions 22 cause torsional deformation of the cage circular annular portion 21 in the direction in which the cage claw portions 22 are inclined radially outward, it is possible to prevent, due to the torsional deformation, the cage-side sliding contact surface 40 and the seal-side sliding contact surface 41 from coming into contact with each other at a position displaced radially outwardly of the axial protrusions 42.

Also, in this ball bearing 1, since, as illustrated in FIG. 12, the position of the bottom of the outer-diameter-side axial groove 24 (radially outer oil groove) of each cage claw portion 22 gradually changes radially outwardly from the distal end of the cage claw portion 22 toward the cage circular annular portion 21, lubricating oil supplied into the outer-diameter-side axial groove 24 is moved from the distal end of the cage claw portion 22 toward the cage circular annular portion 21 by the pumping action, and is introduced into the space between the cage circular annular portion 21 and the seal member 6. Therefore, it is possible to sufficiently lubricate the portions of the bearing between the seal-side sliding contact surface 41 and the axial protrusions 42, and effectively form oil films due to wedge films.

Also, in this ball bearing 1, since the axial end of the annular space 4 opposite from the axial end thereof closed by the seal member 6 is open, it is possible to sufficiently lubricate the portions of the bearing between the seal-side sliding contact surface 41 and the axial protrusions 42, and reliably form oil films due to wedge films.

Figure 18:
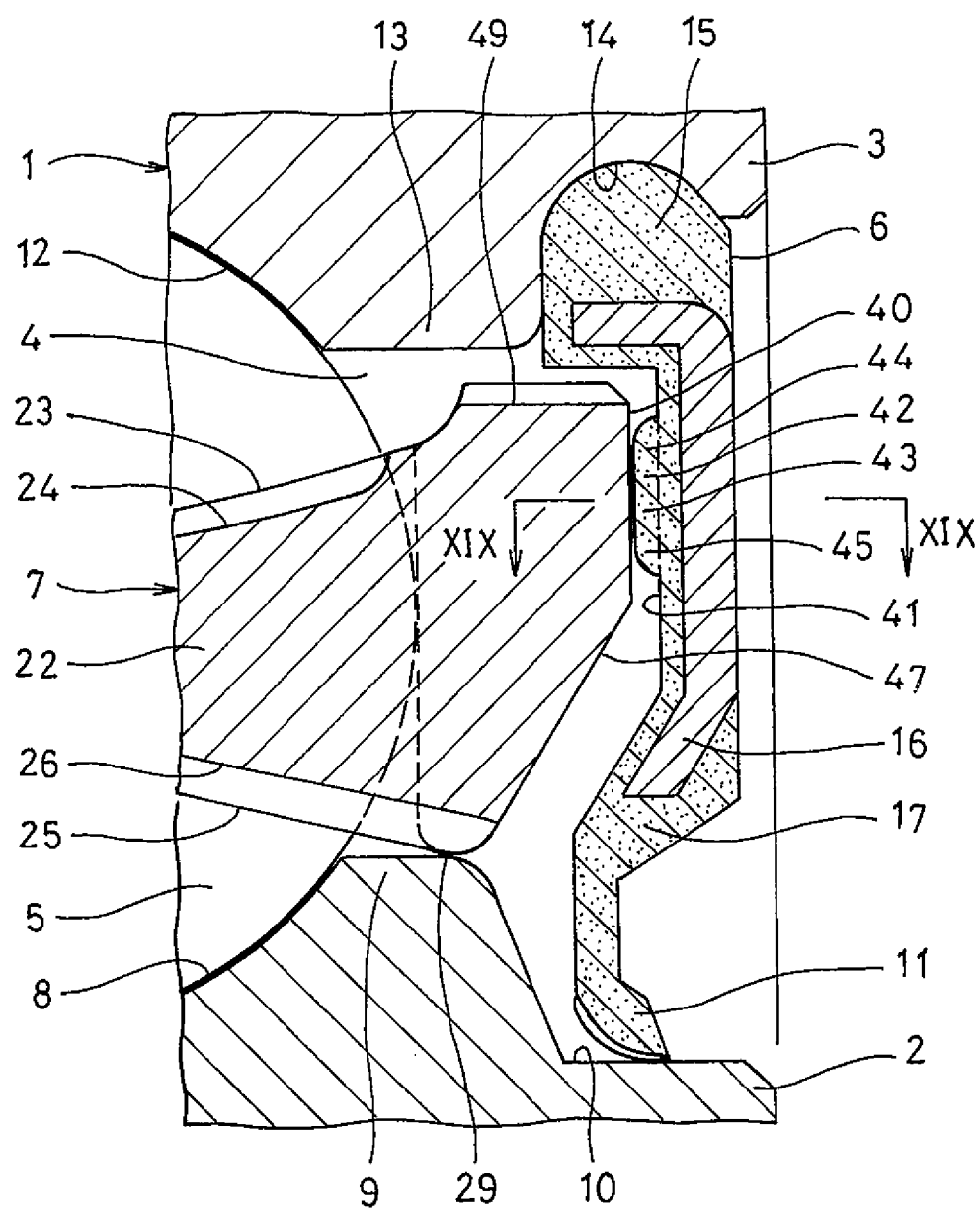
FIG. 18 is a view of a ball bearing according to a third embodiment of the present invention corresponding to FIG. 12.

FIG. 18 illustrates a ball bearing 1 according to the third embodiment of the present invention. The third embodiment is different from the second embodiment in that the axial protrusions 42 are disposed on, of the cage-side sliding contact surface 40 and the seal-side sliding contact surface 41, the cage-side sliding contact surface 40 in the second embodiment, and the seal-side sliding contact surface 41 in the third embodiment. Otherwise, this embodiment is structurally the same as the second embodiment, and therefore, the elements of the third embodiment corresponding to those of the second embodiment are denoted by the same reference numerals, and their description is omitted.

Figure 19:
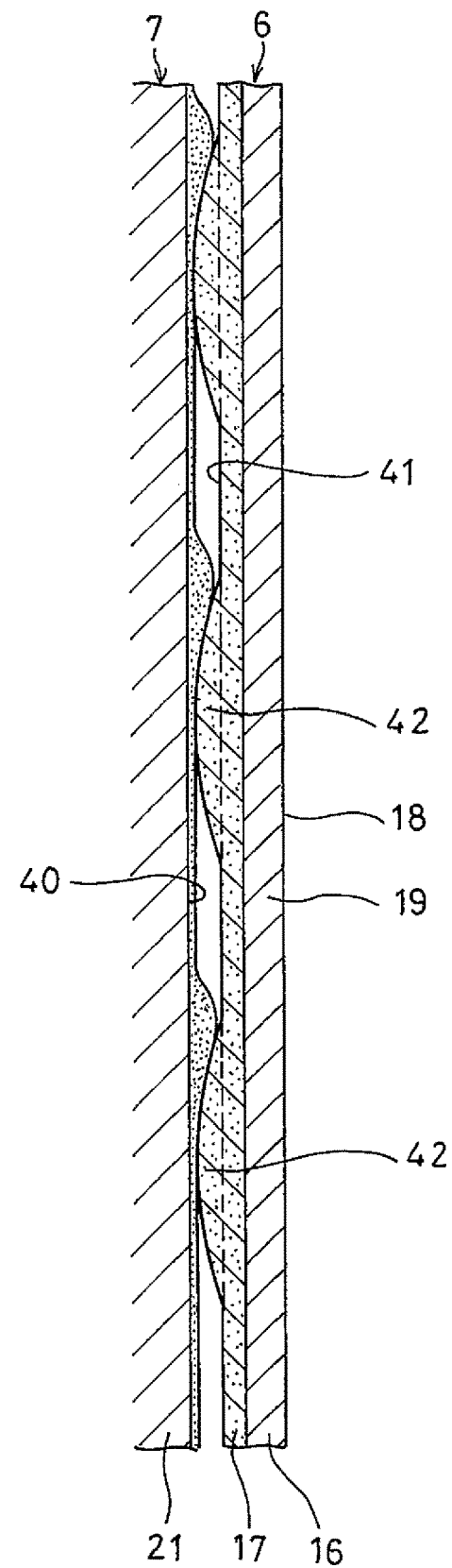
FIG. 19 is a sectional view taken along line XIX-XIX of FIG. 18.

As illustrated in FIG. 19, a plurality of axial protrusions 42 are formed on the seal-side sliding contact surface 41 at constant pitches in the circumferential direction. The axial protrusions 42 are formed, with a mold, on the rubber part 17 of the seal member 6. The cross section of each axial protrusion 42 along the circumferential direction has an axially convex circular arc shape. The axial protrusion 42 has an axial height set to 5% or less of the circumferential width dimension of the axial protrusion 42. In FIG. 19, the axial height of the axial protrusion 42 is exaggeratedly shown so that the axial protrusion 42 can be seen clearly. On the other hand, the cage-side sliding contact surface 40 is a circular annular flat surface extending in the direction perpendicular to the axial direction, and is formed with no axial protrusions 42.

As illustrated in FIG. 18, the axial protrusions 42 are disposed at positions where the axial protrusions 42 overlap with the pitch circle of the balls 5 (imaginary circle connecting the centers of the balls 5), or disposed radially outwardly of the pitch circle of the balls 5.

Figure 20:
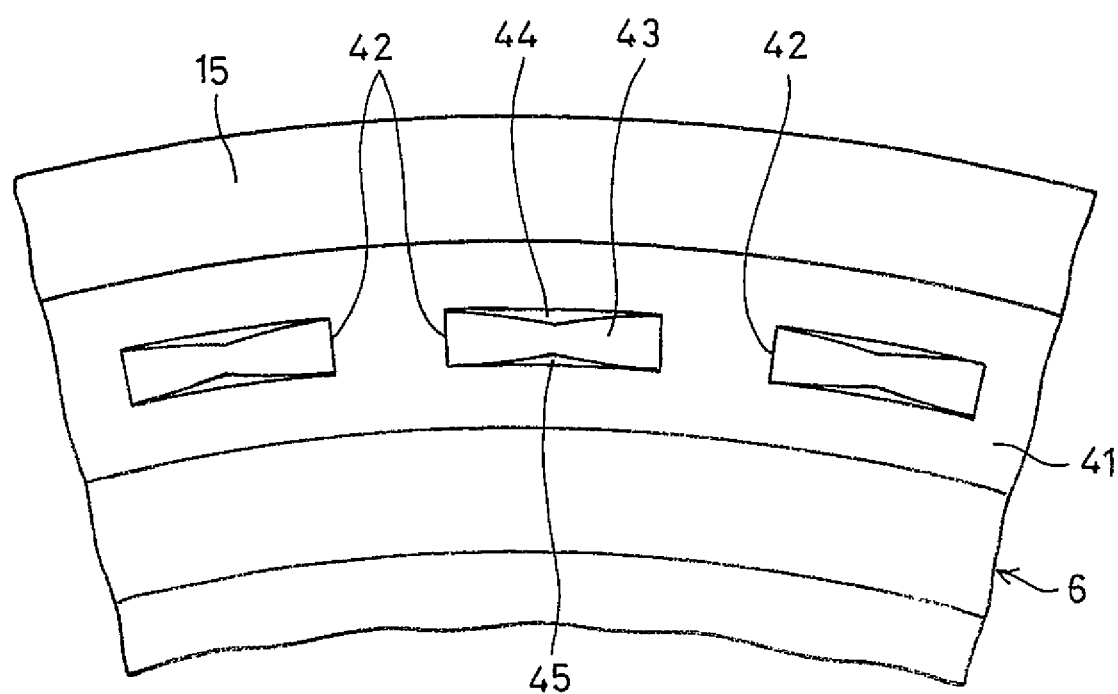
FIG. 20 is a view illustrating the axial protrusions of FIG. 19 when seen from the side of a seal-side sliding contact surface.

As illustrated in FIGS. 18 and 20, the axial protrusions 42 each have a parallel apex portion 43, a first inclined apex portion 44 and a second inclined apex portion 45. The parallel apex portion 43 is a portion of the axial protrusion 42 having an axially circular arc convex shape in cross-sections along the circumferential direction whose apex height is radially uniform. The first inclined apex portion 44 is a portion of the axial protrusion 42 having an axially convex circular arc shape in cross sections along the circumferential direction whose apex height gradually decreases radially outward from the radially outer end of the parallel apex portion 43. The second inclined apex portion 45 is a portion of the axial protrusion 42 having an axially convex circular arc shape in cross sections along the circumferential direction whose apex height gradually decreases radially inwardly from the radially inner end of the parallel apex portion 43. As illustrated in FIG. 12, the cross sections of the first and second inclined apex portions 44 and 45 perpendicular to the circumferential direction have a rounded shape smoothly connected to the parallel apex portion 43.

In this ball bearing 1, since, as illustrated in FIG. 19, a plurality of axial protrusions 42 whose cross sections along the circumferential direction have an axially convex circular arc shape are formed on the seal-side sliding contact surface 41 at constant pitches in the circumferential direction, oil films due to the wedge film effect are formed between the cage-side sliding contact surface 40 and the respective axial protrusions 42. Due to the oil films, the lubrication condition between the cage-side sliding contact surface 40 and the axial protrusions 42 becomes the fluid lubrication condition, thus making it possible to markedly reduce the contact resistance between the cage 7 and the seal member 6. Therefore, it is possible to prevent abnormal heat generation due to the sliding resistance of the contact portions of the cage 7 and the seal member 6.

Also, in this ball bearing 1, since, as illustrated in FIG. 18, axial protrusions 42 each including the parallel apex portion 43 and the first inclined apex portion 44, are used, while the bearing is rotating at a low speed, and the centrifugal forces which the cage claw portions 22 receive are relatively small, oil films due to the wedge film effect can be formed between the cage-side sliding contact surface 40 and the parallel apex portions 43 of the respective axial protrusions 42. Also, while the bearing is rotating at a high speed, and the centrifugal forces which the cage claw portions 22 receive are relatively large, an oil film due to the wedge film effect can be formed between the cage-side sliding contact surface 40, and the parallel apex portion 43 and the first inclined apex portion 44 of each axial protrusion 42 with torsional deformation of the cage circular annular portion 21 relatively large. In other words, regardless of the rotation speed of the bearing, oil films due to the wedge film effect can be stably formed between the cage 7 and the seal member 6.

Also, in this ball bearing 1, since, as illustrated in FIG. 18, the cross section of each first inclined apex portion 44 perpendicular to the circumferential direction has a rounded shape, and thus the first inclined apex portion 44 and the parallel apex portion 43 are smoothly connected to each other, when, with torsional deformation of the cage circular annular portion 21 relatively large, an oil film due to the wedge film effect is formed between the cage-side sliding contact surface 40, and the parallel apex portion 43 and the first inclined apex portion 44, the oil film can be formed stably.

Also, in this ball bearing 1, since, as illustrated in FIG. 18, the inner-diameter-side axial grooves 26 are disposed in the inner periphery of the cage 7, lubricating oil supplied to the space of the bearing radially inside the cage claw portions 22 is introduced, through the inner-diameter-side axial grooves 26, into the space between the cage circular annular portion 21 and the seal member 6. Therefore, it is possible to sufficiently lubricate the portions of the bearing between the cage-side sliding contact surface 40 and the axial protrusions 42, and effectively form oil films due to wedge films.

The other operations and effects are also the same as in the first and second embodiments.

FIGS. 21 to 26 illustrate a ball bearing 1 according to the fourth embodiment of the present invention. The fourth embodiment is different from the third embodiment in that a seal member 61 is added and also the cage 7 has a partially different shape, but otherwise the fourth embodiment is structurally the same as the third embodiment. Therefore, the elements of the fourth embodiment corresponding to those of the third embodiment are denoted by the same reference numerals, and their description is omitted.

Figure 21:
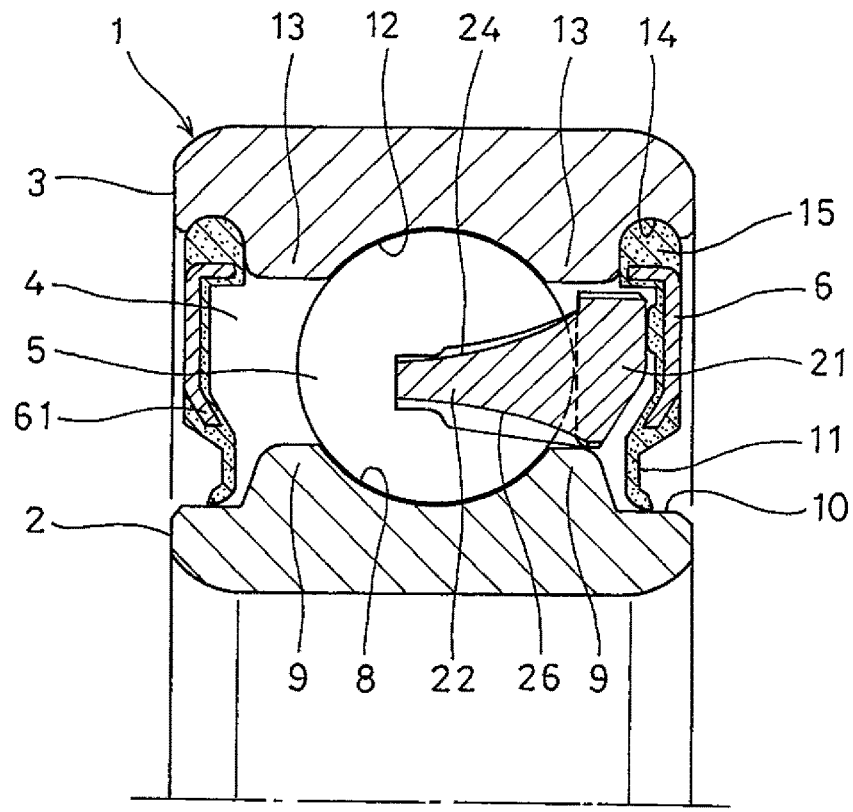
FIG. 21 is a view of a ball bearing according to a fourth embodiment of the present invention corresponding to FIG. 1.
Figure 21:
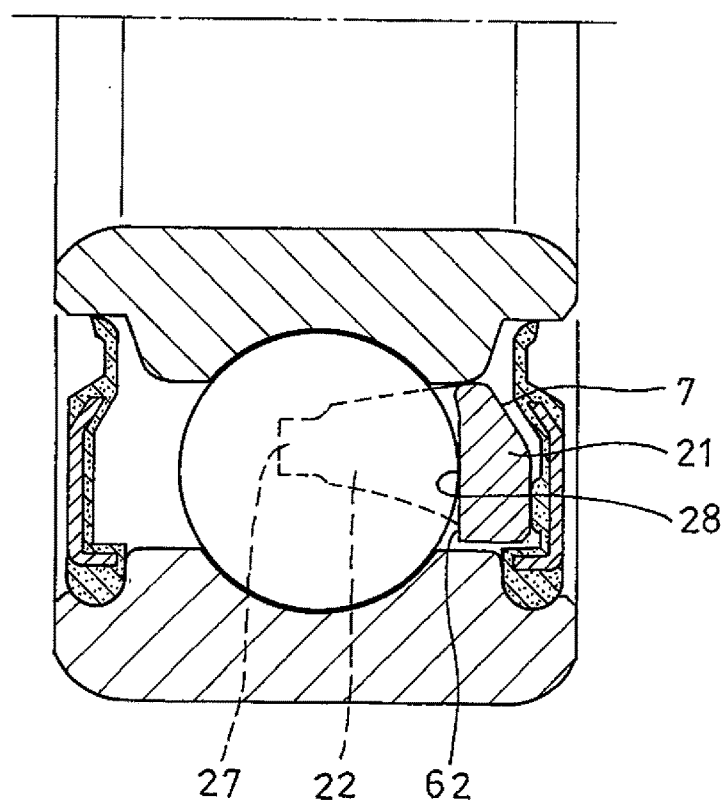

As illustrated in FIG. 21, a seal member 6 is disposed at one of the end openings of the annular space 4 on both axial sides thereof, and a seal member 61 is disposed on the other end opening, too. Lubricant is sealed in the portion of the annular space 4 between the seal members 6 and 61.

Figure 22:
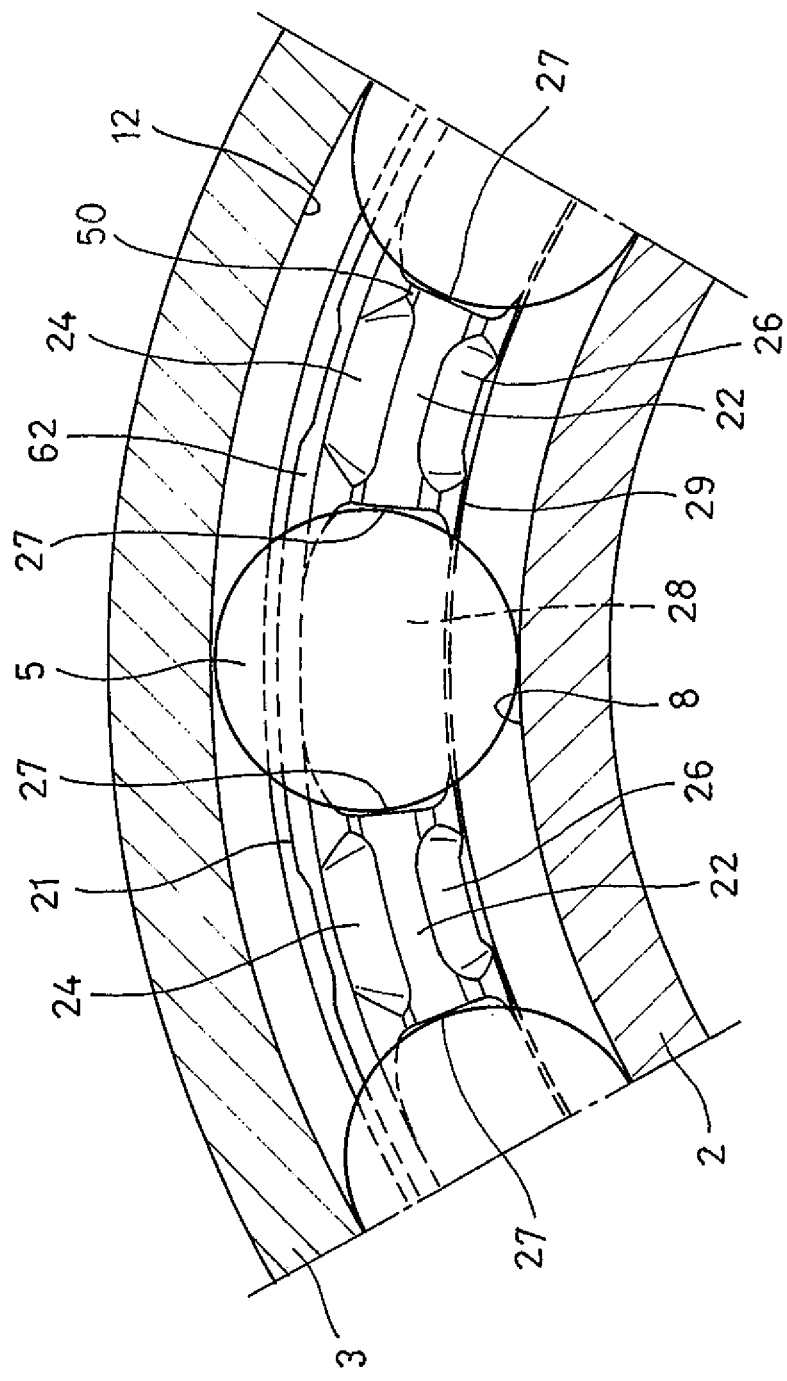
FIG. 22 is a view of the ball bearing of FIG. 21 corresponding to FIG. 2.
Figure 23:
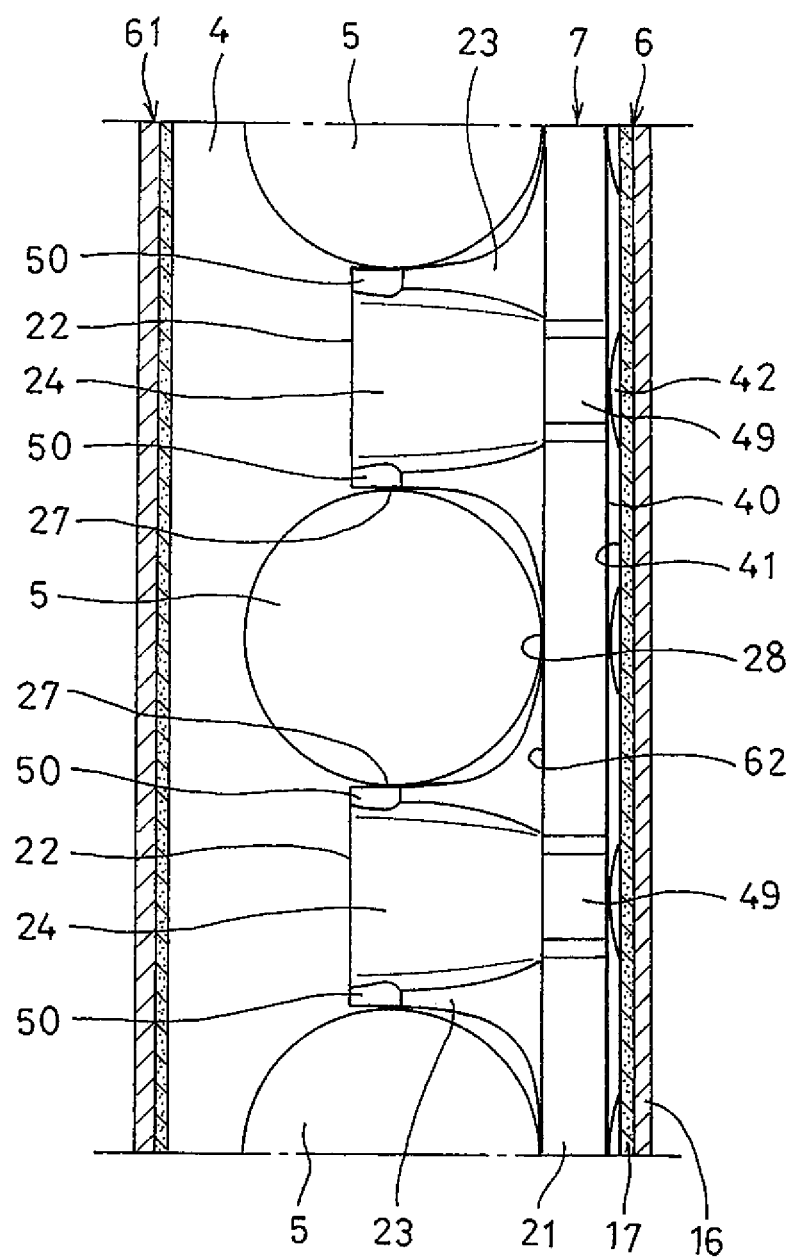
FIG. 23 is a view of the ball bearing of FIG. 21 corresponding to FIG. 3.

As illustrated in FIGS. 22 and 23, each cage claw portion 22 has circumferentially opposed surfaces 27 circumferentially opposed to the corresponding balls 5, respectively. The portions of the circumferentially opposed surfaces 27 which circumferentially support the balls 5 are flat surfaces extending such that when the cage claw portion 22 is moved radially outwardly by a centrifugal force, the circumferentially opposed surfaces 27 do not interfere with the balls 5. As illustrated in FIG. 22, the circumferentially opposed surfaces 27 are flat surfaces inclined to gradually approach, in the radially inward direction, the imaginary straight line connecting the center of the cage circular annular portion 21 and the center of the cage claw portion 22 to each other (flat surfaces extending such that the circumferential width of the cage claw portion 22 gradually decreases in the radially inward direction), when seen in the axial direction.

Figure 24:
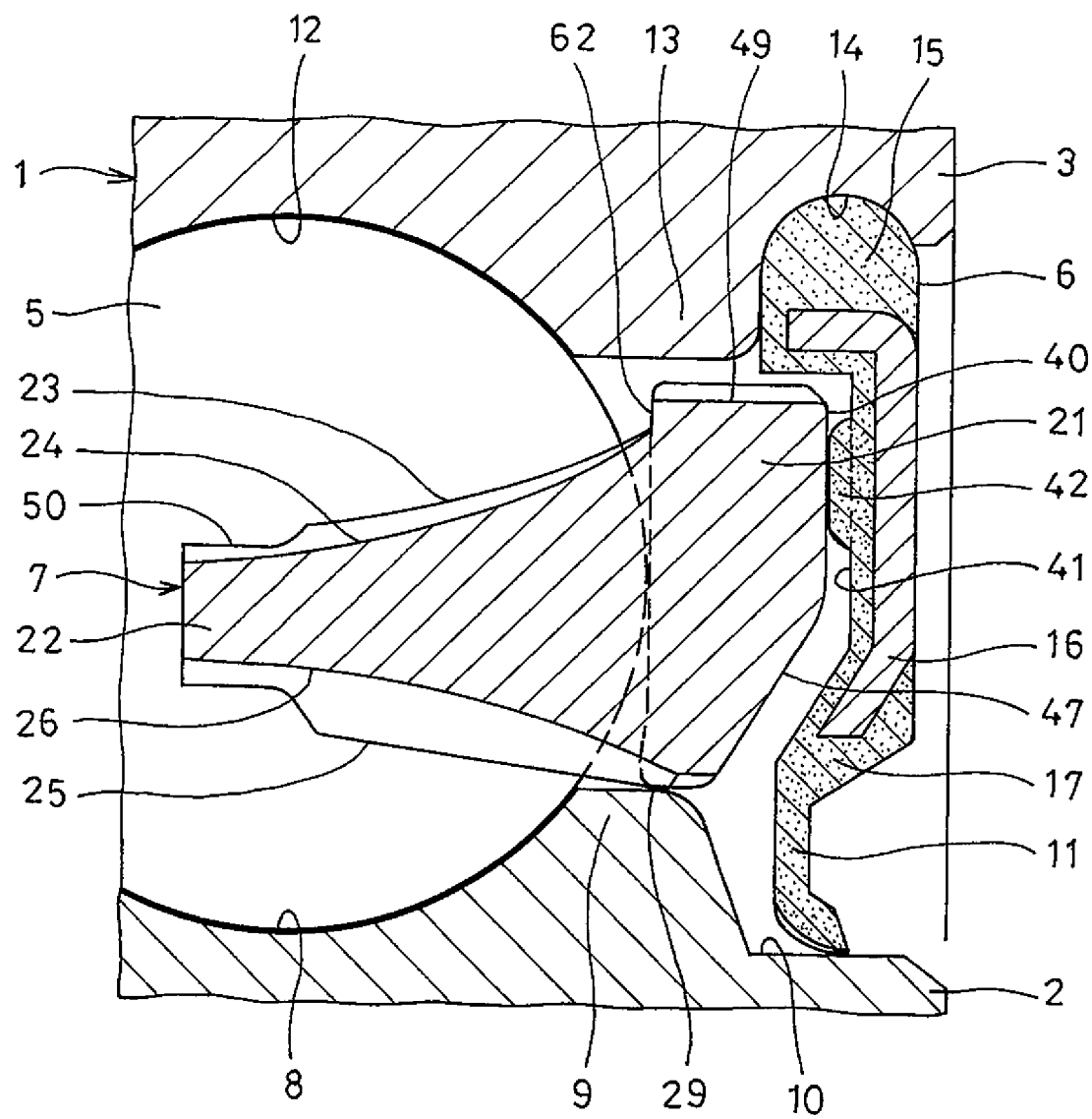
FIG. 24 is an enlarged sectional view illustrating a resin cage of the ball bearing of FIG. 21 and the vicinity of the cage.

As illustrated in FIG. 24, the cage circular annular portion 21 includes a step 62 radially outwardly rising from the level of the radially outer surface portions of the cage claw portions 22 at their roots. Due to the formation of the step 62, when lubricant sealed in the annular space 4 is moved toward the cage circular annular portion 21 along the outer-diameter-side axial grooves 24, the lubricant can be partially stopped by the step 62, and returned to the balls 5.

Figure 25:
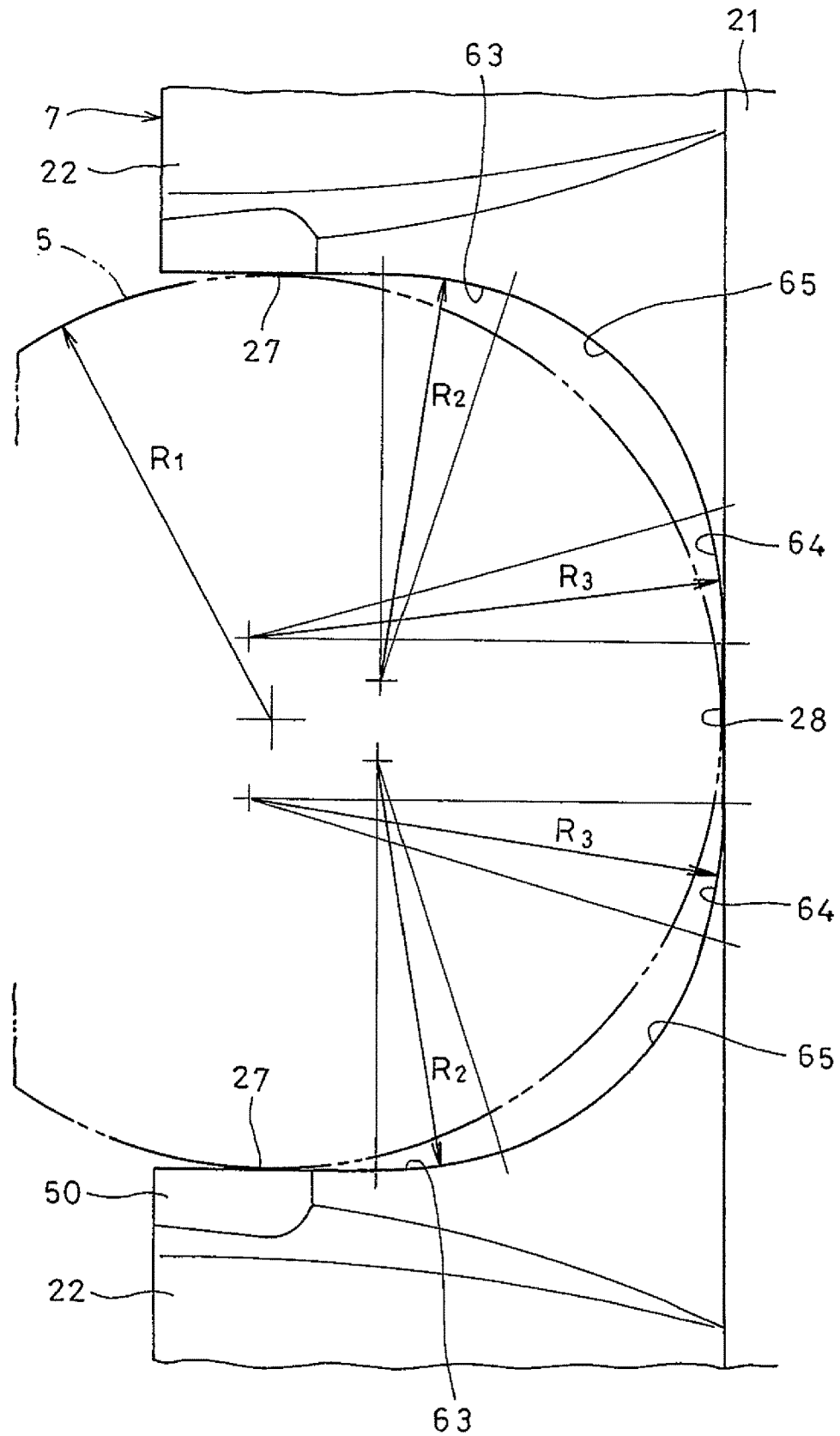
FIG. 25 is a partial enlarged view of the cage of FIG. 23.
Figure 26:
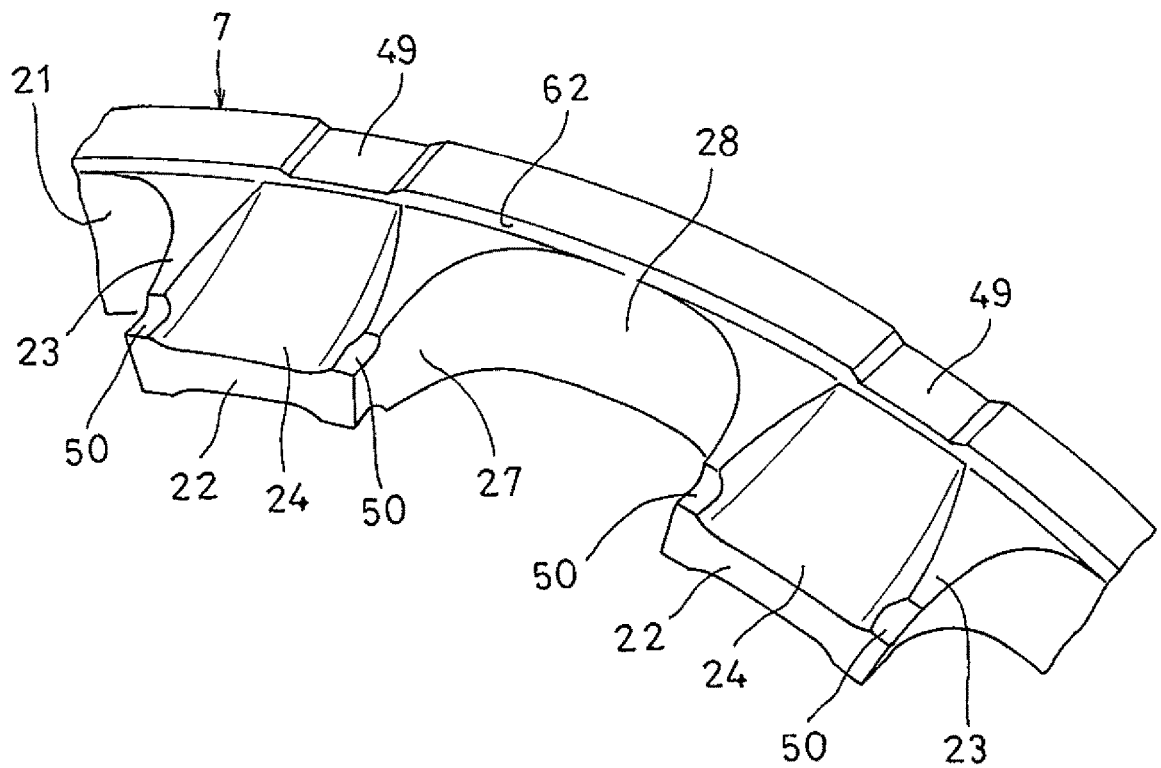
FIG. 26 is a perspective view of the cage of FIG. 21 when seen from the side of its cage claw portions.
Figure 27:
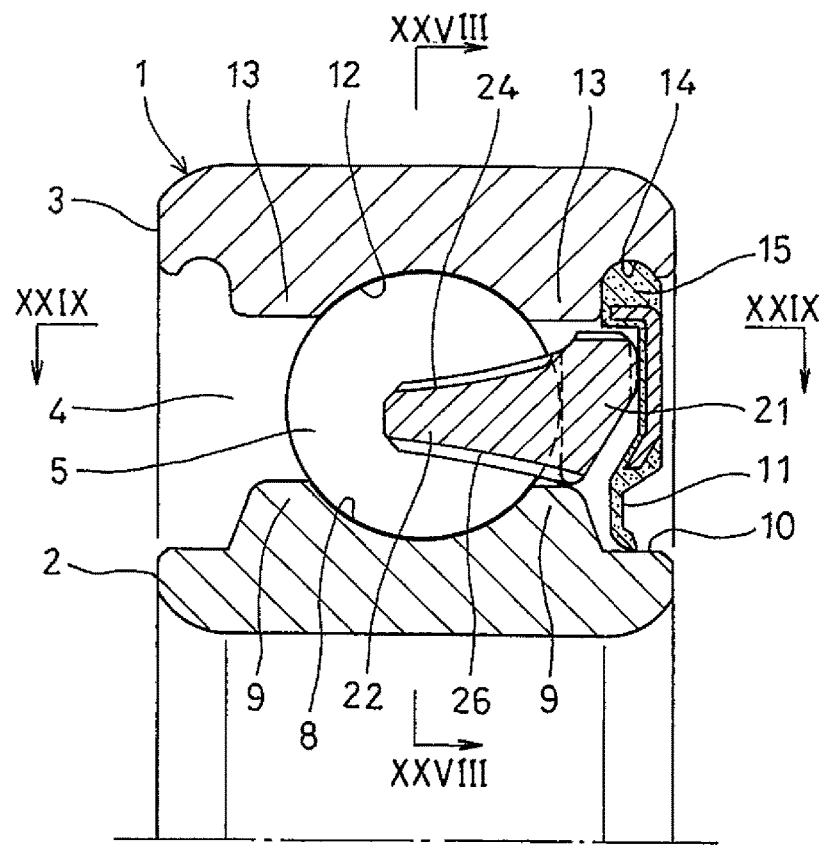
FIG. 27 is a sectional view of a ball bearing according to a fifth embodiment of the present invention.
Figure 27:
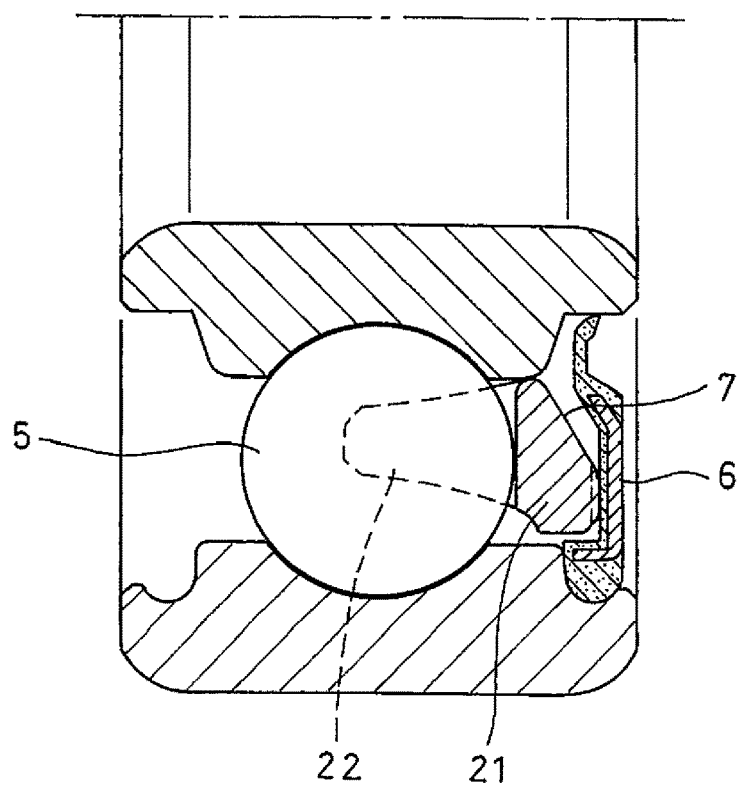
Figure 28:
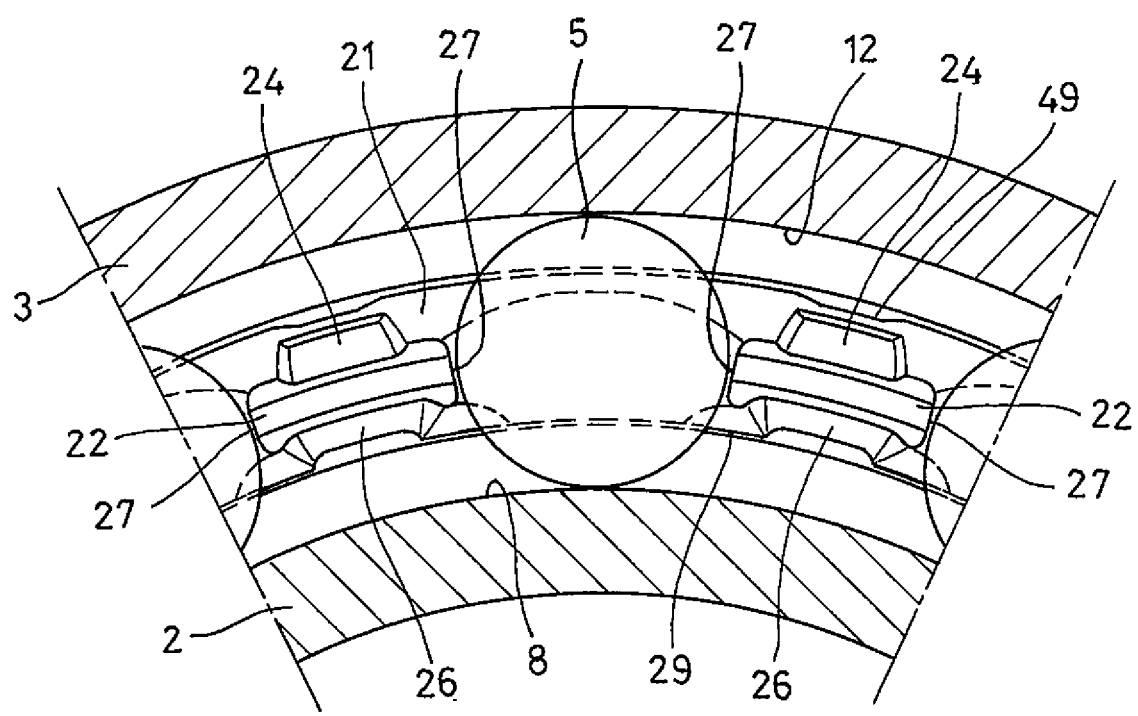
FIG. 28 is a sectional view taken along line XXVIII-XXVIII of FIG. 27.
Figure 29:
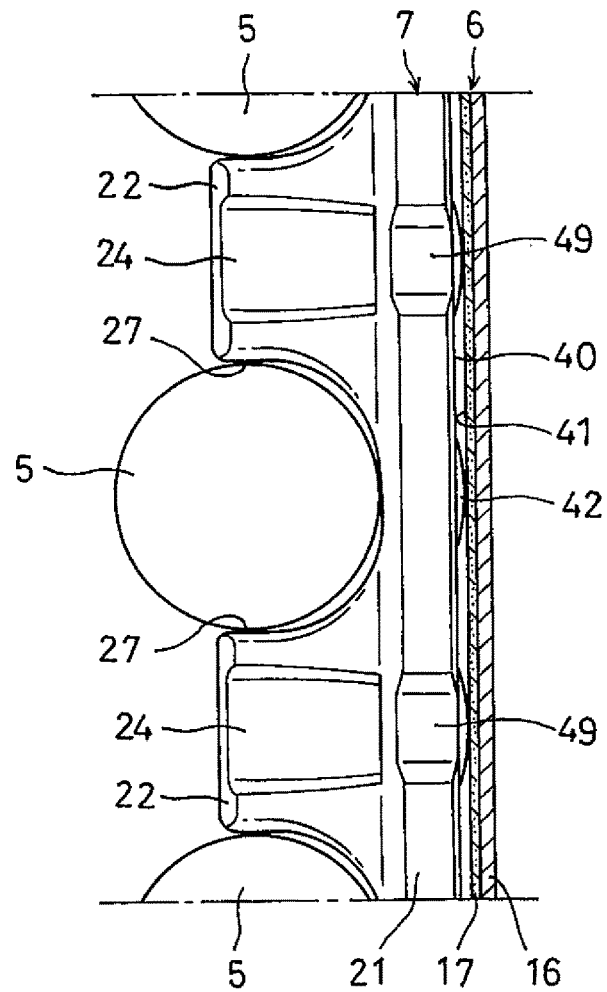
FIG. 29 is a sectional view taken along line XXIX-XXIX of FIG. 27.
Figure 30:
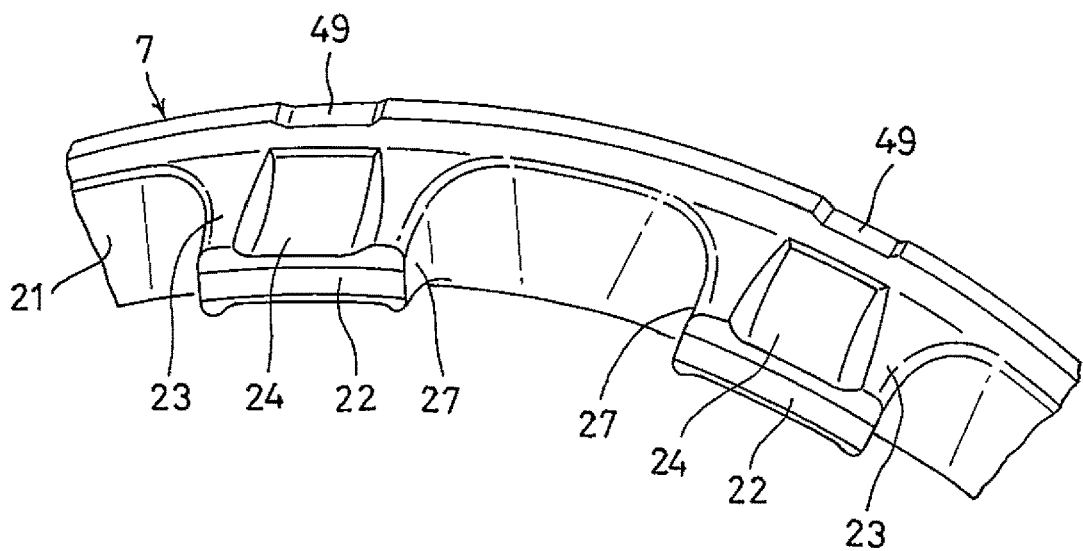
FIG. 30 is a perspective view of the cage of FIG. 27 when seen from the side of its cage claw portions.
Figure 31:
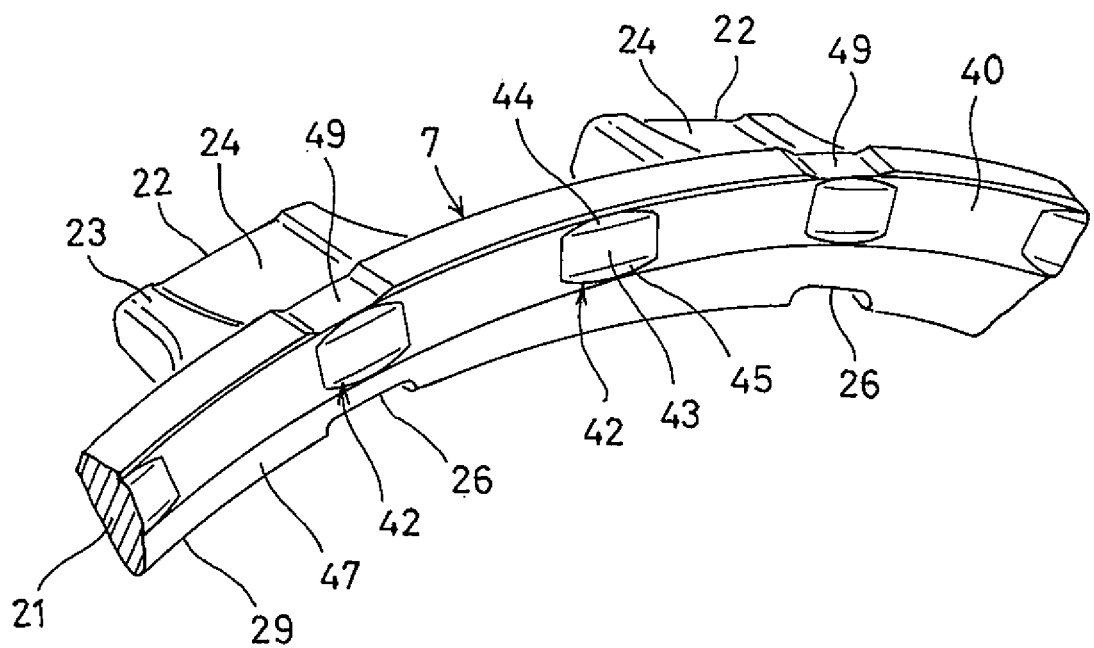
FIG. 31 is a perspective view of the cage of FIG. 27 when seen from the side of its cage circular annular portion.

As illustrated in FIG. 25, each circumferentially opposed surface 27 and the corresponding axially opposed surface 28 are connected together via a composite rounded curved surface. In the shown example, the curved surface connecting the circumferentially opposed surface 27 and the axially opposed surface 28 to each other is constituted by a distal-end-side rounded surface portion 63 connected to the circumferentially opposed surface 27, and having a part-cylindrical shape with a radius of curvature R2 smaller than the radius R1 of the ball 5; a root-side rounded surface portion 64 connected to the axially opposed surface 28, and having a part-cylindrical shape with a radius of curvature R3 larger than the radius R1 of the ball 5; and an intermediate rounded surface portion 65 smoothly connecting the distal-end-side rounded surface portion 63 and the root-side rounded surface portion 64 to each other.

This ball bearing 1 is the same in operation and effects as the third embodiment.

FIGS. 27 to 31 illustrate a ball bearing 1 according to the fifth embodiment of the present invention. The fifth embodiment is the same as the second embodiment (shown in FIGS. 9 to 17) except that the claw tip oil passages 50 are omitted. Therefore, the elements of the fifth embodiment corresponding to those of the second embodiment are denoted by the same reference numerals, and their description is omitted.

FIGS. 32 to 37 illustrate a ball bearing 1 according to the sixth embodiment of the present invention. The elements of the sixth embodiment corresponding to those of the above embodiments are denoted by the same reference numerals, and their description is omitted.

Each cage claw portion 22 has a cantilevered structure of which one axial end is a fixed end fixed to the cage circular annular portion 21, and the other axial end is a free end. The cage claw portion 22 has an axial length larger than the axial width of the outer ring raceway groove 12. The cage claw portion 22 has a radial thickness which is uniform, i.e., does not change, in the axial direction.

Figure 32:
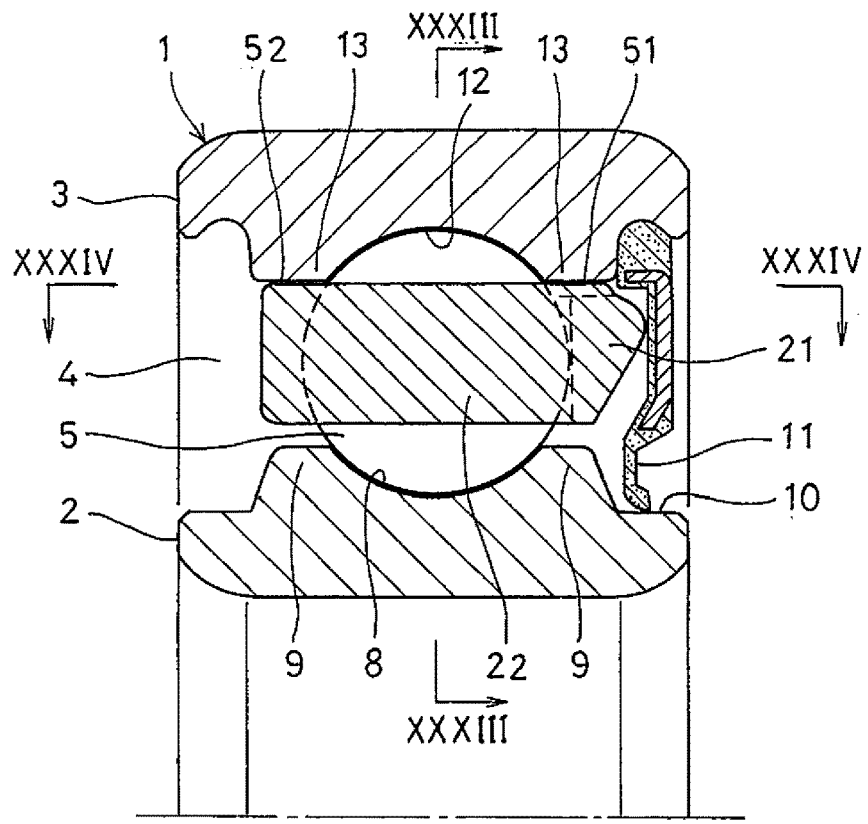
FIG. 32 is a sectional view of a ball bearing according to a sixth embodiment of the present invention.
Figure 32:
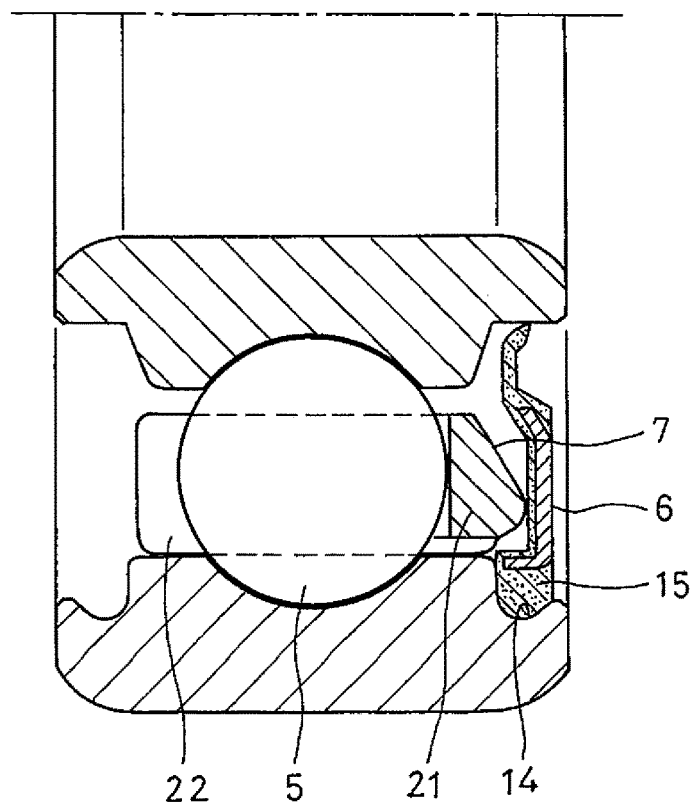
Figure 37:
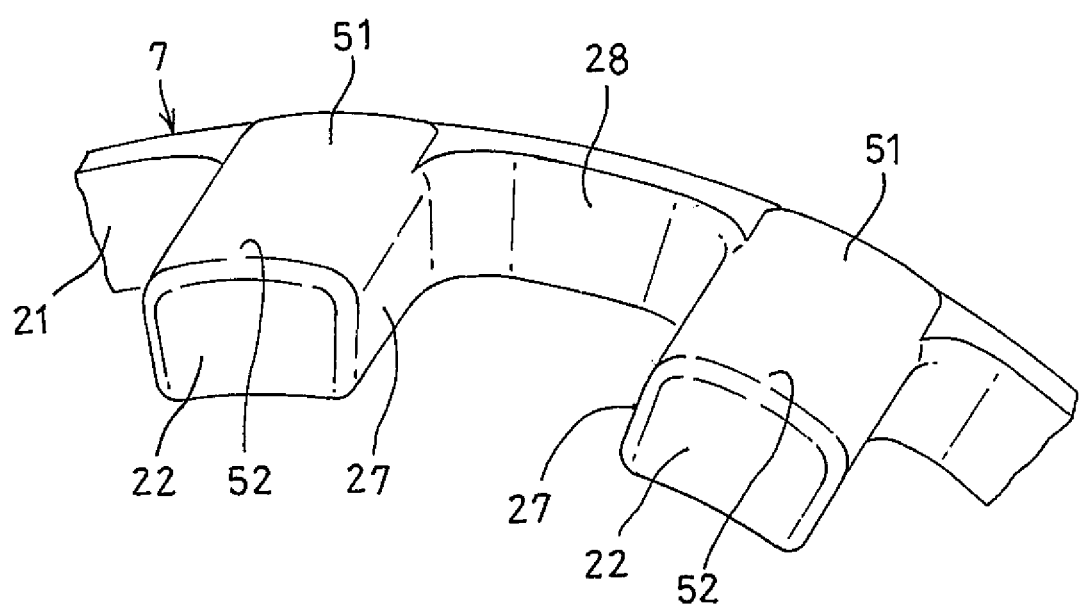
FIG. 37 is a perspective view of the cage of FIG. 32 when seen from the side of its cage claw portions.

As illustrated in FIGS. 32 and 37, a root-side guided surface 51 that comes into sliding contact with the one outer ring groove shoulder 13 is formed at the portion of the radially outer surface of the cage circular annular portion 21 corresponding to the root of each cage claw portion 22. Also, a distal-end-side guided surface 52 that comes into sliding contact with the other outer ring groove shoulder 13 is formed on the radially outer surface of the axial end portion of the cage claw portion 22 on its distal end side.

Figure 36:
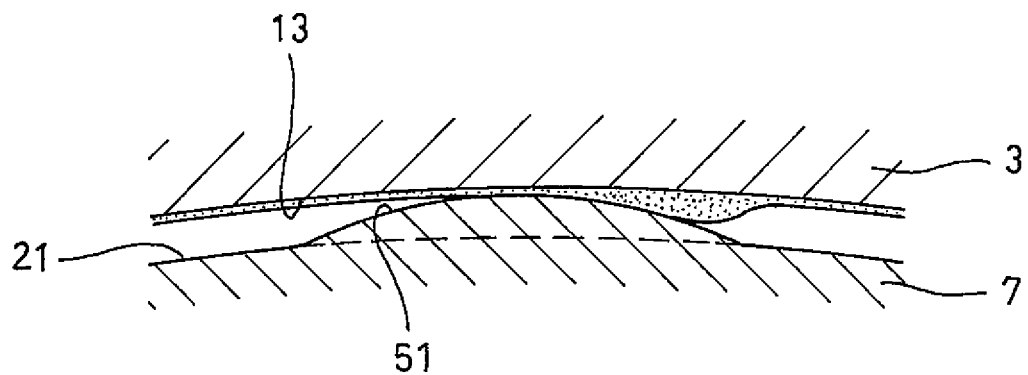
FIG. 36 is a sectional view taken along line XXXVI-XXXVI of FIG. 35.

As illustrated in FIG. 36, the root-side guided surface 51 has, in cross sections along the circumferential direction, a radially outwardly protruding circular arc shape. The "radially outwardly protruding" means protruding radially outwardly relative to an imaginary circle concentric with the cage circular annular portion 21. The distal-end-side guided surface 52 also has, in cross sections along the circumferential direction, a radially outwardly protruding circular arc shape (see FIG. 37). The root-side guided surface 51 and the distal-end-side guided surface 52 have the same shape in cross sections along the circumferential direction. The radii of curvature of each of the root-side guided surface 51 and the distal-end-side guided surface 52 in cross sections along the circumferential direction can be set to smaller than ½ of the radius of the inner diameter of the outer ring groove shoulder 13, and larger than 1/10 of the radius of the inner diameter of the outer ring groove shoulder 13.

As illustrated in FIG. 37, in this embodiment, the root-side guided surface 51 and the distal-end-side guided surface 52 are continuous surfaces continuously connected together straight in the axial direction in order that no recess is formed between the root-side guided surface 51 and the distal-end-side guided surface 52.

Figure 34:
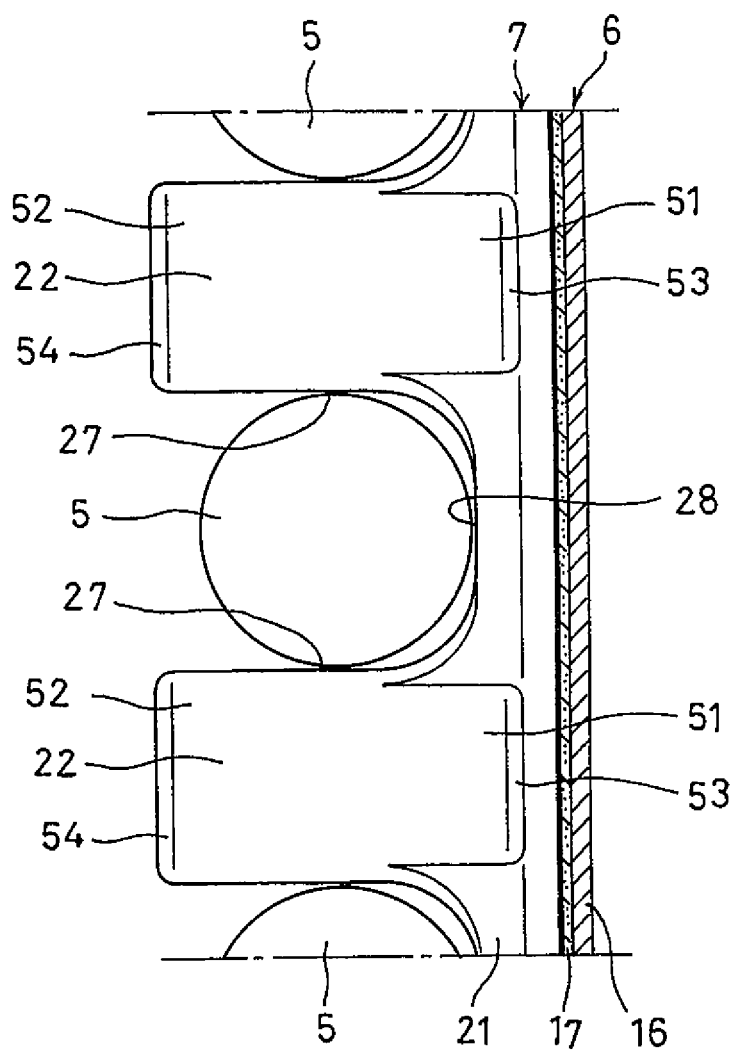
FIG. 34 is a sectional view taken along line XXXIV-XXXIV of FIG. 32.
Figure 35:
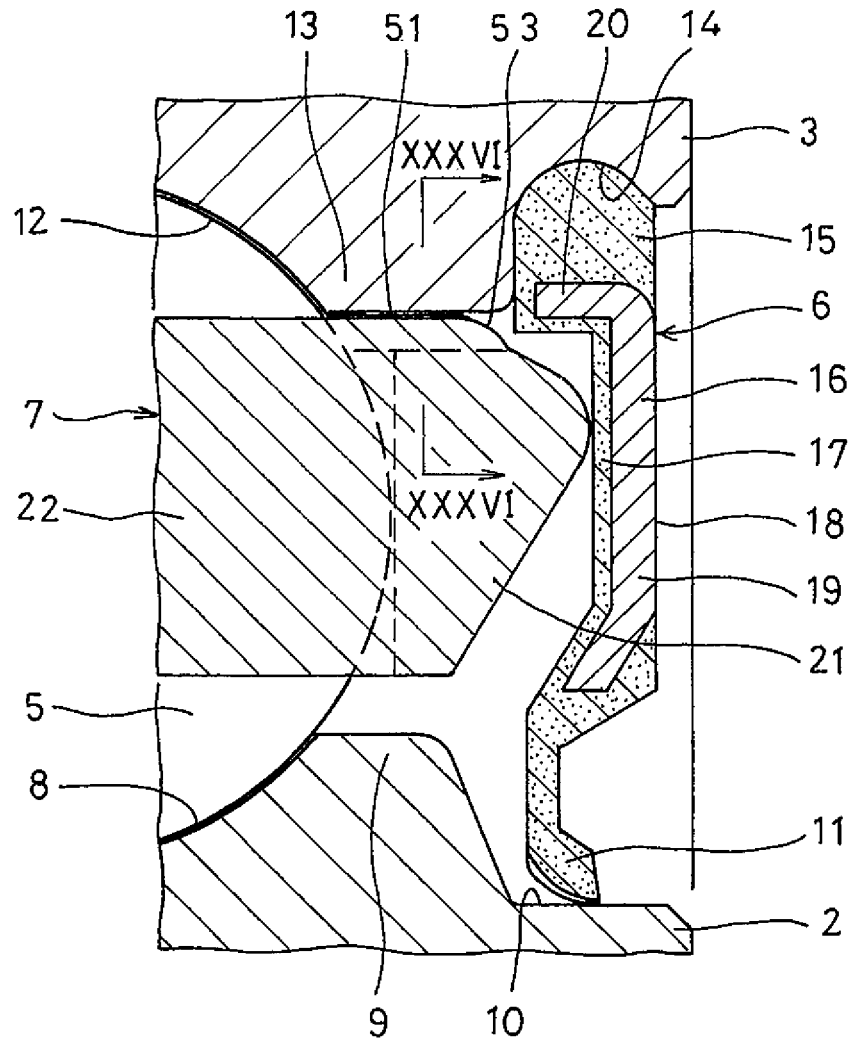
FIG. 35 is an enlarged sectional view illustrating a cage circular annular portion of the ball bearing of FIG. 32 and the vicinity of the cage circular annular portion.

As illustrated in FIG. 34, the root-side guided surface 51 has, on its side remoter from the cage claw portion 22, an axial end edge 53 chamfered into a rounded shape. The language "chamfered into a rounded shape" means, as illustrated in FIG. 35, forming a corner having a convex circular arc-shaped cross section perpendicular to the circumferential direction. As illustrated in FIG. 34, the distal-end-side guided surface 52 also has, on its side remote from the cage circular annular portion 21, an axial end edge 54 chamfered into the same rounded shape.

In this ball bearing 1, since, as illustrated in FIG. 36, each of the root-side guided surfaces 51 has, in cross sections along the circumferential direction, a radially outwardly protruding circular arc shape, oil films due to the wedge film effect are formed between the one outer ring groove shoulder 13 and the root-side guided surfaces 51. Due to the oil films, the lubrication condition between the one outer ring groove shoulder 13 and the root-side guided surfaces 51 becomes the fluid lubrication condition, thus making it possible to markedly reduce the contact resistance between the cage 7 and the outer ring 3. Since, as with the root-side guided surfaces 51, each of the distal-end-side guided surfaces 52, shown in FIG. 32, also has a radially outwardly protruding circular arc shape in cross sections along the circumferential direction, oil films due to the wedge film effect are formed between the other outer ring groove shoulder 13 (outer ring groove shoulder 13 on the left side) and the distal-end-side guided surfaces 52. Due to the oil films, the lubrication condition between the other outer ring groove shoulder 13 and the distal-end-side guided surfaces 52 becomes the fluid lubrication condition, thus making it possible to markedly reduce the contact resistance between the cage 7 and the outer ring 3. Therefore, it is possible to prevent abnormal heat generation due to the sliding resistance of the contact portions of the cage 7 and the outer ring 3.

Also, in this ball bearing 1, since, as illustrated in FIG. 32, the one outer ring groove shoulder 13 (outer ring groove shoulder 13 on the right side) supports the cage circular annular portion 21 from the radially outer side, and the other outer ring groove shoulder 13 (outer ring groove shoulder 13 on the left side) supports the axial ends of the cage claw portions 22 on their distal end sides from the radially outer side, flexural deformation of the cage claw portions 22 toward the radially outer side is less likely to occur. Therefore, even during high-speed rotation, it is possible to reduce torsional deformation of the cage circular annular portion 21, and flexural deformation of the cage claw portions 22 per se toward the radially outer side, due to the centrifugal forces which the cage claw portions 22 receive.

Also, in this ball bearing 1, since, as illustrated in FIG. 34, the axial end edges 53 of the root-side guided surfaces 51 on their sides remoter from the cage claw portions 22, and the axial end edges 54 of the distal-end-side guided surfaces 52 on their sides remoter from the cage circular annular portion 21 are chamfered into the above-defined rounded shape, oil films due to the wedge film effect can be effectively formed between the one outer ring groove shoulder 13 (outer ring groove shoulder 13 on the right side) and the root-side guided surfaces 51 shown in FIG. 32, and oil films due to the wedge film effect can be effectively formed between the other outer ring groove shoulder 13 (outer ring groove shoulder 13 on the left side) and the distal-end-side guided surfaces 52, too.

Figure 33:
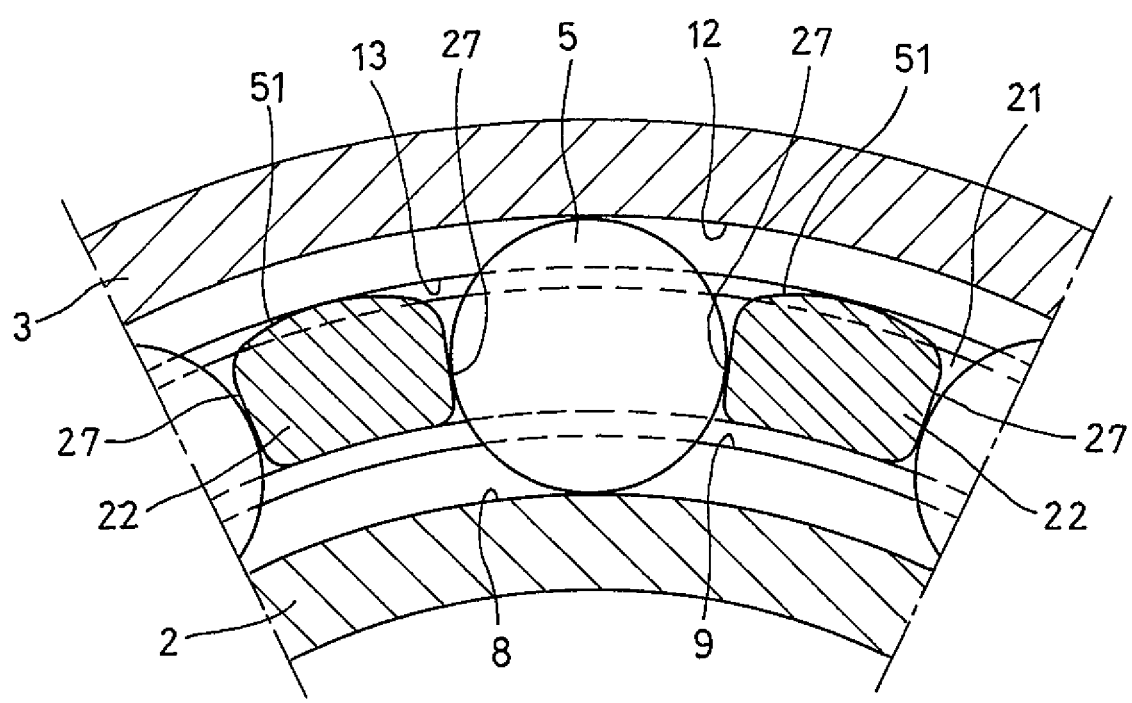
FIG. 33 is a sectional view taken along line XXXIII-XXXIII of FIG. 32.

Also, in this ball bearing 1, since, as illustrated in FIG. 33, the portions of the circumferentially opposed surfaces 27 of each cage claw portion 22 which circumferentially support the balls 5 are flat surfaces extending parallel to the imaginary straight line connecting the center of the cage circular annular portion 21 and the center of the cage claw portion 22 to each other, when the cage claw portion 22 is moved radially outwardly by the centrifugal force applied to the cage claw portion 22, it is possible to prevent the circumferentially opposed surfaces 27 of the cage claw portion 22 from interfering with the balls 5. Also, since the shear resistance of lubricating oil generated between the circumferentially opposed surfaces 27 of the cage claw portion 22 and the balls 5 is reduced, it is also possible to reduce the heat generation in the ball bearing 1.

Also, in this ball bearing 1, since the axial end of the annular space 4 opposite from the axial end thereof closed by the seal member 6 is open, it is possible to sufficiently lubricate the root-side guided surfaces 51 and the distal-end-side guided surfaces 52, and reliably form oil films due to wedge films.

FIGS. 38 to 41 illustrate a ball bearing 1 according to the seventh embodiment of the present invention. The seventh embodiment is different from the sixth embodiment only in that oil reservoir grooves 55 are added. Otherwise, the seventh embodiment is structurally the same as the sixth embodiment. Therefore, the elements of the seventh embodiment corresponding to those of the sixth embodiment are denoted by the same reference numerals, and their description is omitted.

Figure 38:
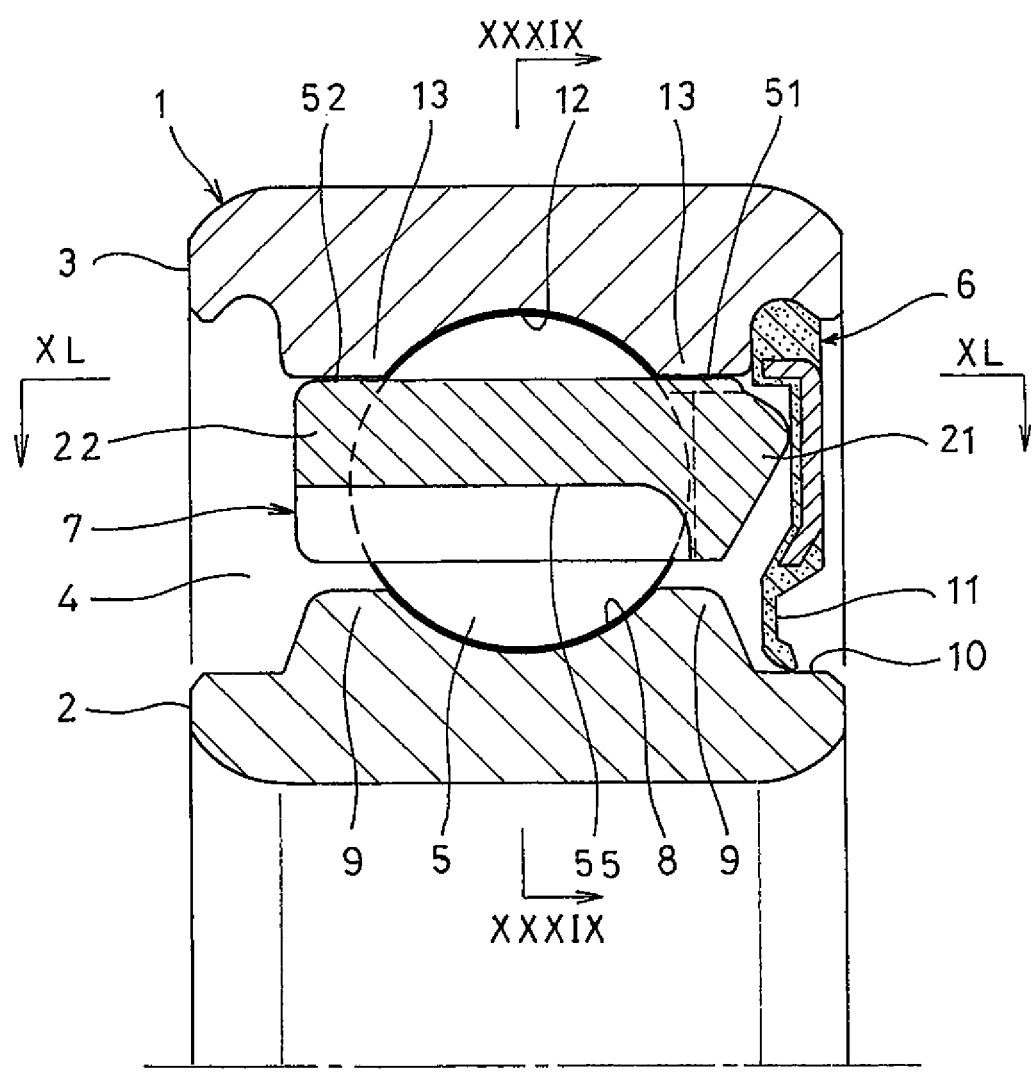
FIG. 38 is a sectional view of a ball bearing according to a seventh embodiment of the present invention.
Figure 40:
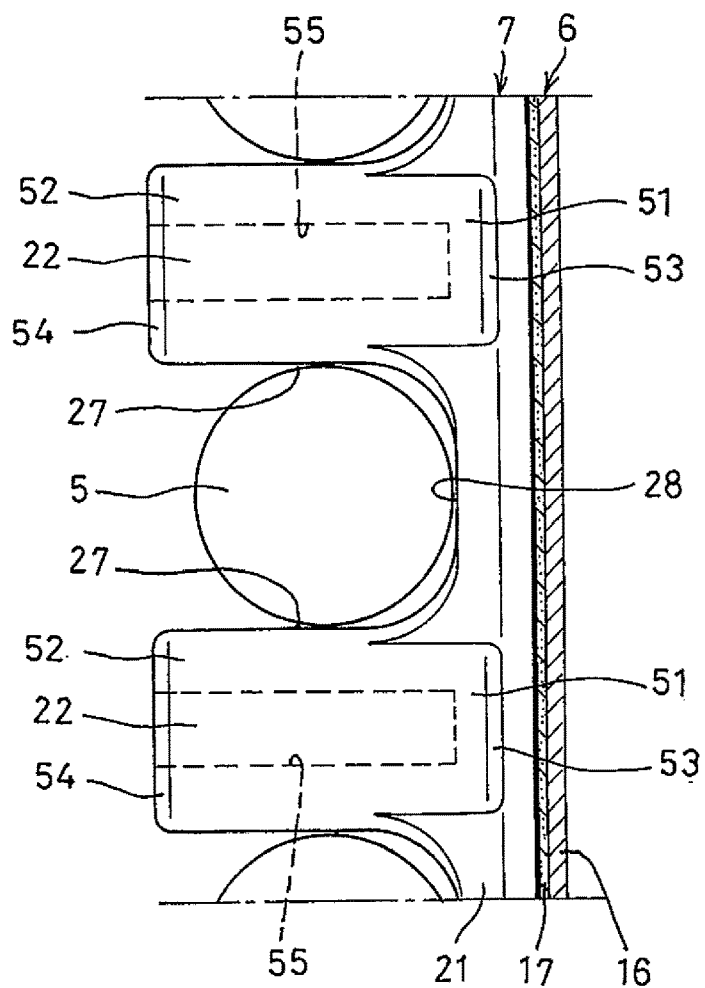
FIG. 40 is a sectional view taken along line XL-XL of FIG. 38.

As illustrated in FIGS. 38 and 40, each cage claw portion 22 has, in its radially inner surface, an oil reservoir groove 55 axially extending from the distal end of the cage claw portion 22 toward the cage circular annular portion 21. As illustrated in FIG. 38, the oil reservoir groove 55 rises to the radially inner surface of the cage 7 at the position radially opposed to the inner ring groove shoulder 9 closer to the cage circular annular portion 21. In other words, the oil reservoir groove 55 does not axially extend through the cage 7. The oil reservoir groove 55 may, however, axially extend through the radially inner surface of the cage 7.

Figure 39:
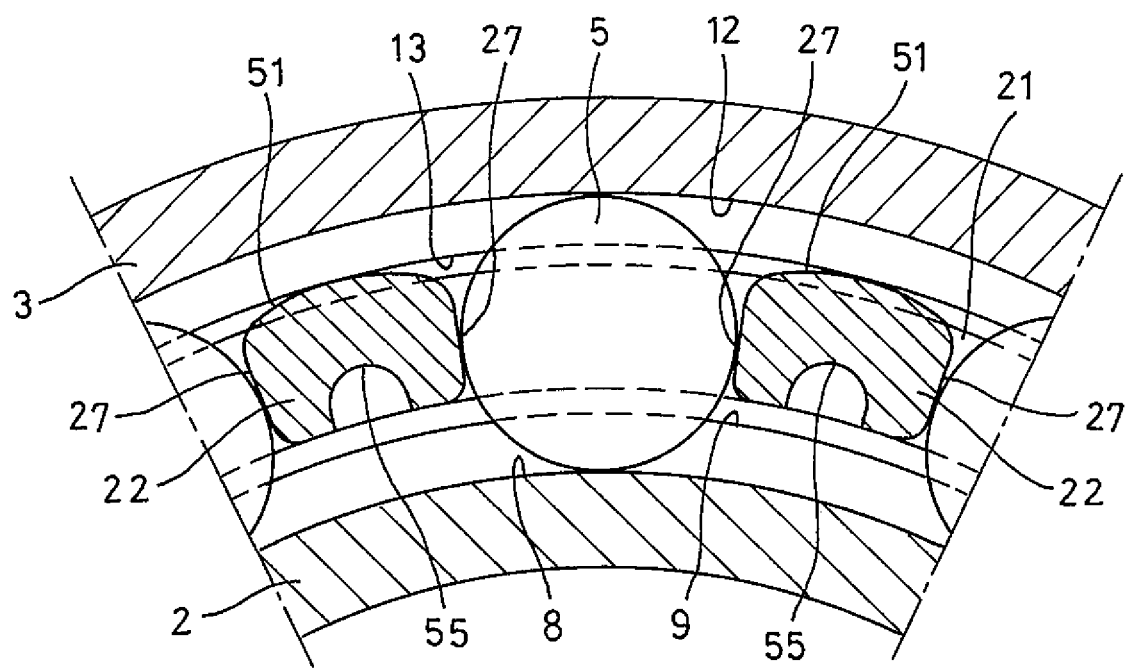
FIG. 39 is a sectional view taken along line XXXIX-XXXIX of FIG. 38.
Figure 41:
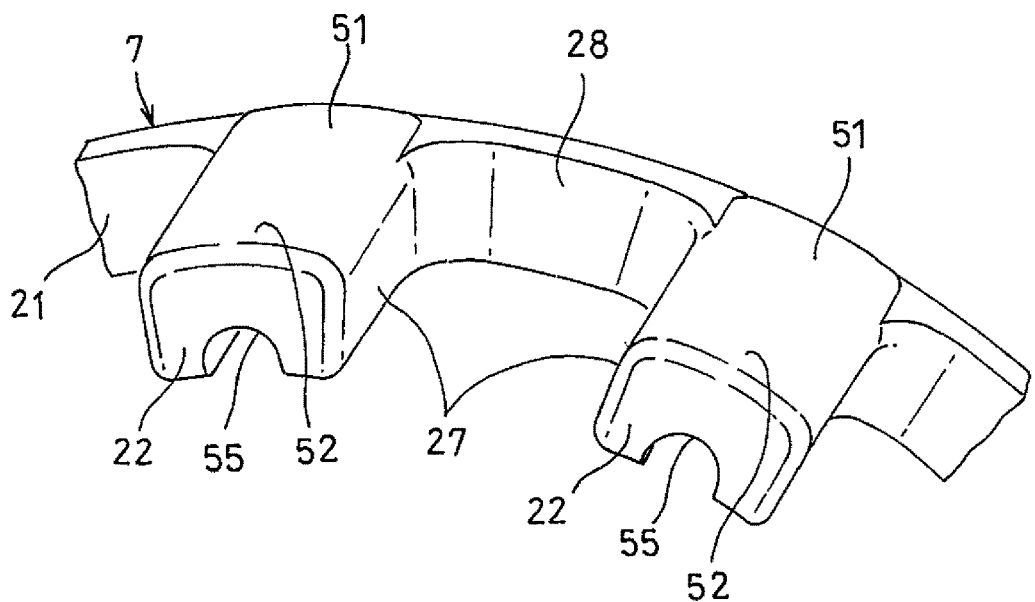
FIG. 41 is a perspective view of the cage of FIG. 38 when seen from the side of its cage claw portions.

As illustrated in FIGS. 39 and 41, the oil reservoir groove 55 is formed in the circumferential center of the radially inner surface of the cage claw portion 22. The oil reservoir groove 55 has a semicircular sectional shape. The oil reservoir groove 55 may instead have a triangular sectional shape or a quadrangular sectional shape.

In the ball bearing 1 of this embodiment, lubricating oil radially outwardly scattered by a centrifugal force can be stored in the oil reservoir grooves 55, and supplied to the inner ring 2.

The ball bearing 1 of this embodiment is the same in operation and effects as the bearing of the sixth embodiment.

FIGS. 42 to 45 illustrate a ball bearing 1 according to the eighth embodiment of the present invention. The eighth embodiment is different from the seventh embodiment (shown in FIGS. 38 to 41) only in that relief recesses 56 are added. Otherwise, the eighth embodiment is structurally the same as the seventh embodiment. Therefore, the elements of the eighth embodiment corresponding to those of the seventh embodiment are denoted by the same reference numerals, and their description is omitted.

Figure 45:
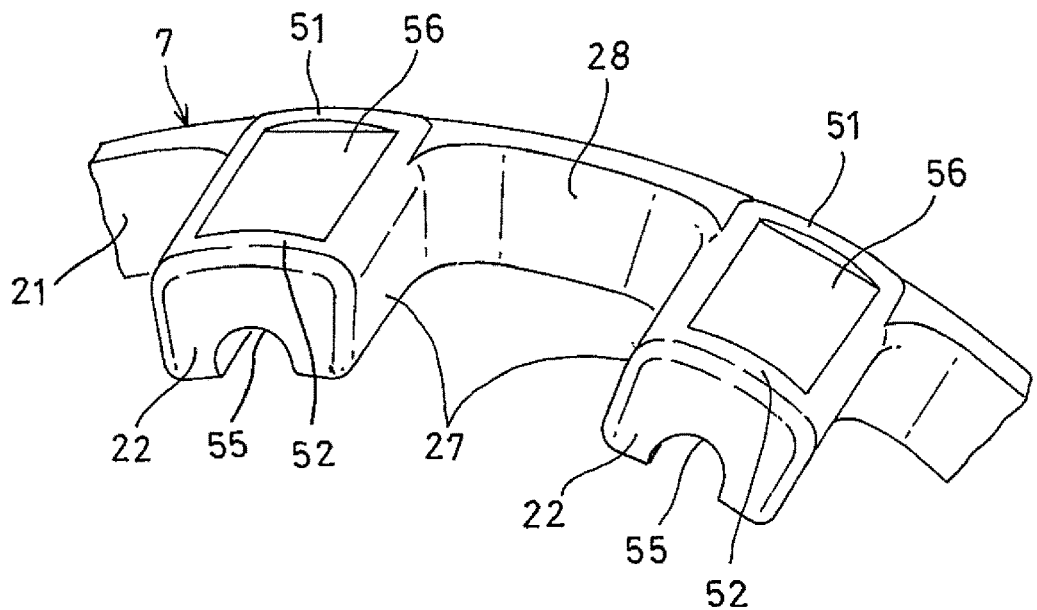
FIG. 45 is a perspective view of the cage of FIG. 42 when seen from the side of its cage claw portions.

As illustrated in FIG. 45, The relief recesses 56 are each formed in the portion of the radially outer surface of a respective one of the cage claw portion 22 between the root-side guided surface 51 and the distal-end-side guided surface 52. That is, the radially outer surface of the cage claw portion 22 is a stepped surface in which first the root-side guided surface 51, then the relief recess 56 and then the distal-end-side guided surface 52 are arranged in the axial direction.

Figure 42:
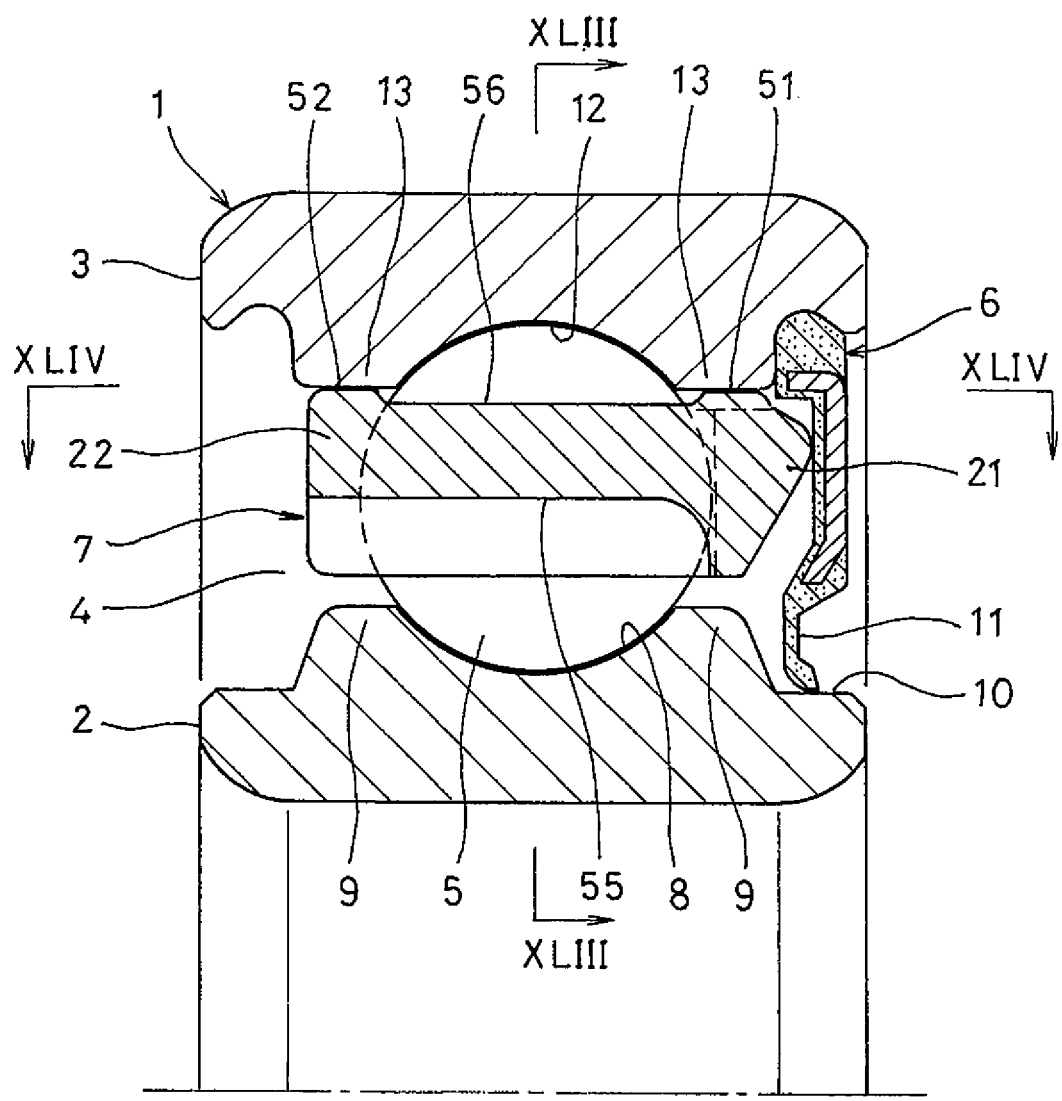
FIG. 42 is a sectional view of a ball bearing according to an eighth embodiment of the present invention.
Figure 43:
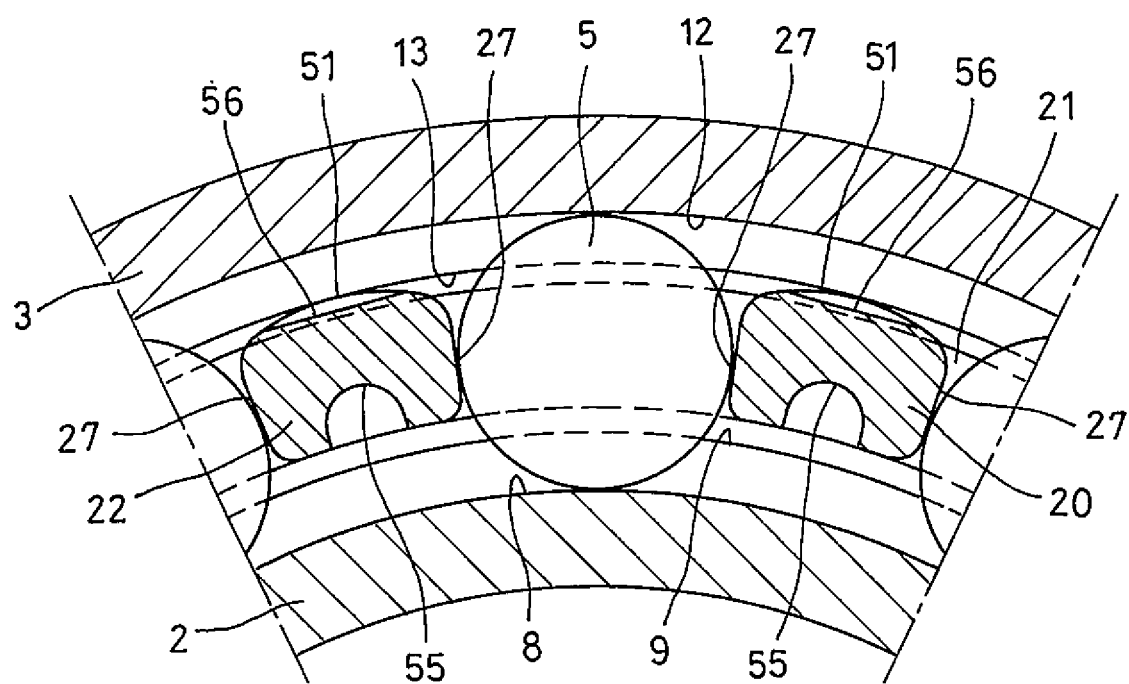
FIG. 43 is a sectional view taken along line XLIII-XLIII of FIG. 42.
Figure 44:
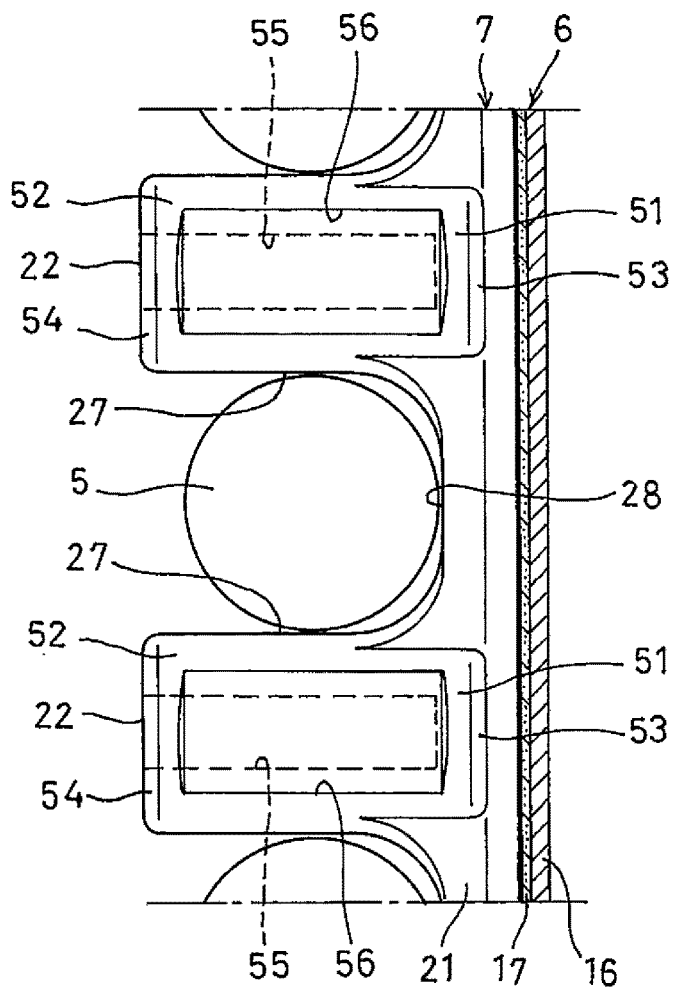
FIG. 44 is a sectional view taken along line XLIV-XLIV of FIG. 42.

As illustrated in FIGS. 42 and 43, the relief recess 56 has an axial width wider than the axial width of the outer ring raceway groove 12, and extends in the circumferential direction. As illustrated in FIG. 42, the relief recess 56 is arranged to cover the entire axial width of the outer ring raceway groove 12. That is, the end of the relief recess 56 closer to the root-side guided surface 51 is located at a position displaced toward the one outer ring groove shoulder 13 (outer ring groove shoulder 13 closer to the cage circular annular portion 21) from the boundary between the one outer ring groove shoulder 13 and the outer ring raceway groove 12. Also, the end of the relief recess 56 closer to the distal-end-side guided surface 52 is located at a position displaced toward the other outer ring groove shoulder 13 (outer ring groove shoulder 13 remoter from the cage circular annular portion 21) from the boundary between the other outer ring groove shoulder 13 and the outer ring raceway groove 12. Both axial ends of the relief recess 56 rise while being inclined to the root-side guided surface 51 and the distal-end-side guided surface 52, respectively.

As illustrated in FIG. 43, the relief recess 56 is a portion recessed relative to the root-side guided surface 51 (or the distal-end-side guided surface 52) so as to have an inner surface at a position retracted radially inwardly relative to the root-side guided surface 51 (or the distal-end-side guided surface 52). In the shown example, the inner surface of the relief groove 56 is a flat surface extending in the direction perpendicular to the radial direction.

In this ball bearing 1, since, as illustrated in FIG. 42, the relief recesses 56 are formed between the root-side guided surfaces 51 and the respective distal-end-side guided surfaces 52, it is possible to prevent each of the boundaries between the outer ring raceway groove 12 and the respective outer ring groove shoulders 13 from coming into sliding contact with the radially outer surface of the cage circular annular portion 21 or the radially outer surfaces of the cage claw portions 22. Therefore, it is possible to prevent the radially outer surface of the cage circular annular portion 21 and the radially outer surfaces of the cage claw portions 22 from becoming worn locally at the positions corresponding to the boundaries between the outer ring raceway groove 12 and the outer ring groove shoulders 13.

The ball bearing 1 of this embodiment is the same in operation and effects as the sixth and seventh embodiments.

Figure 46:
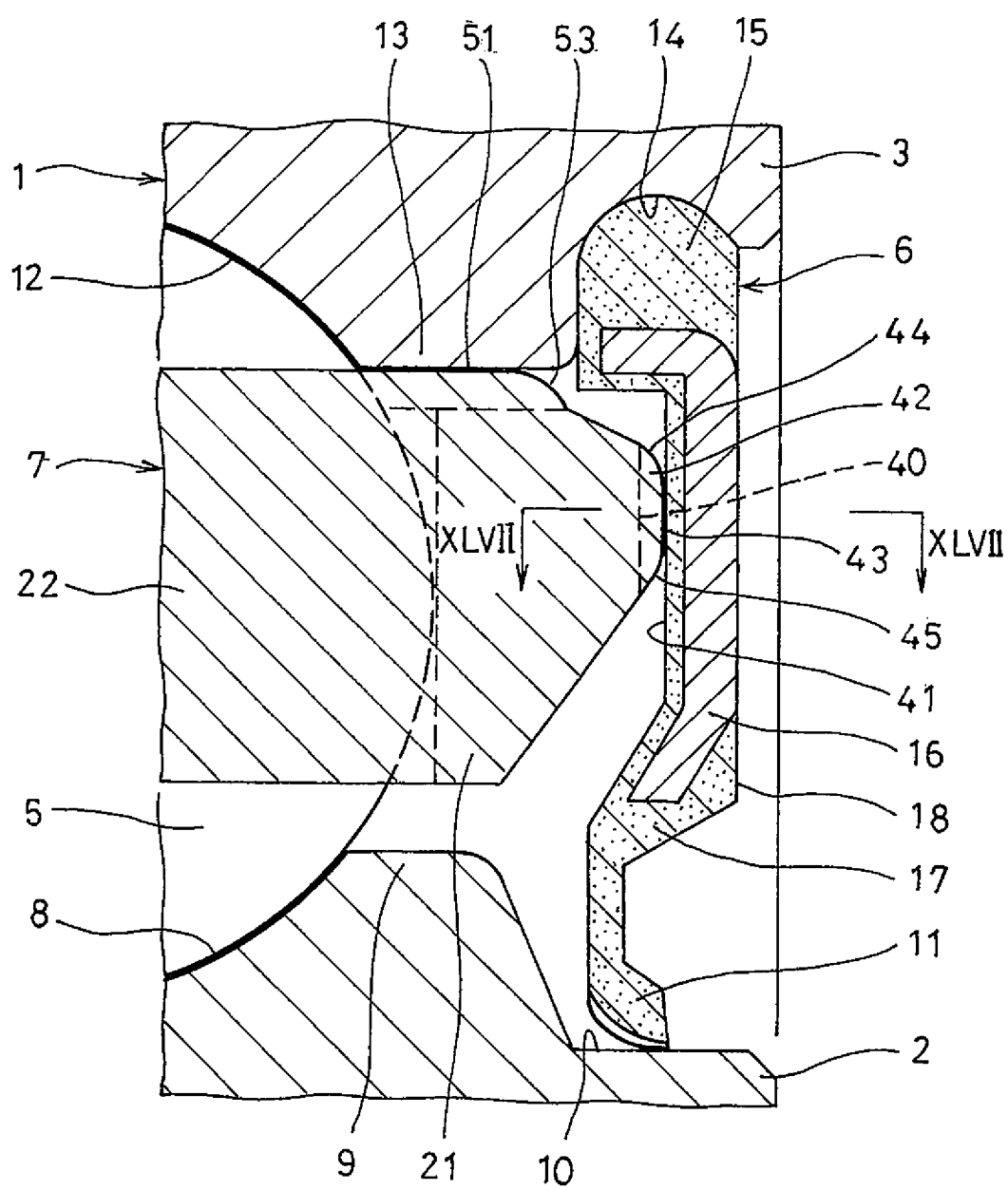
FIG. 46 is an enlarged sectional view illustrating a cage circular annular portion of a ball bearing according to a ninth embodiment of the present invention and the vicinity of the cage circular annular portion.
Figure 47:
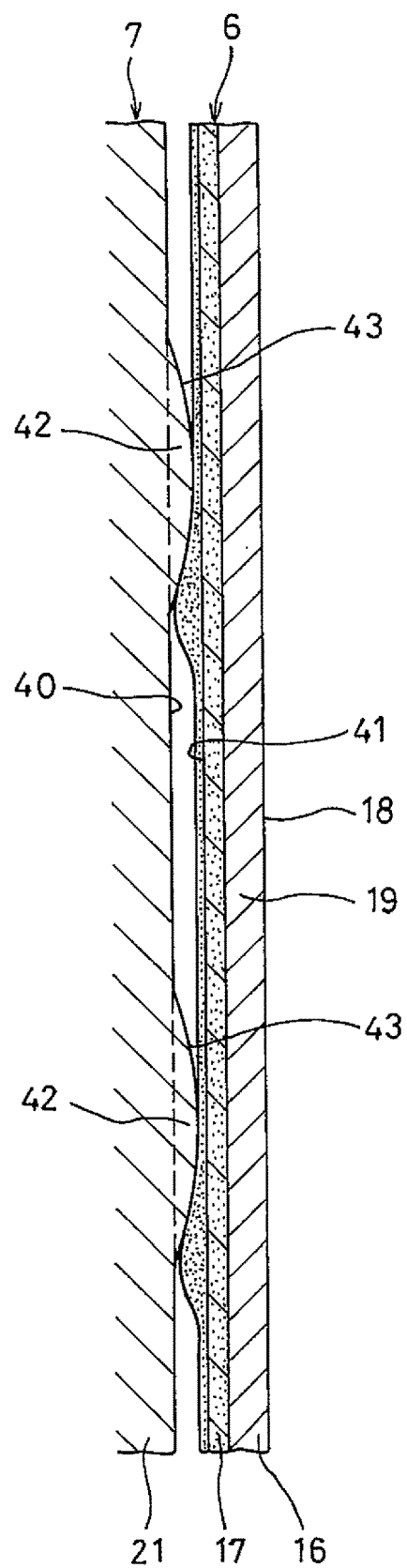
FIG. 47 is a sectional view taken along line XLVII-XLVII of FIG. 46.

FIGS. 46 and 47 illustrate a ball bearing 1 according to the ninth embodiment of the present invention. The ninth embodiment corresponds to the combination of the sixth embodiment (of FIGS. 32 to 37) and the sliding contact structure of the cage 7 and the seal member 6 in the second embodiment (sliding contact structure of the cage-side sliding contact surface 40 and the seal-side sliding contact surface 41 in FIG. 12). Therefore, the elements of the ninth embodiment corresponding to those of the above relevant embodiments are denoted by the same reference numerals, and their description is omitted.

Figure 48:
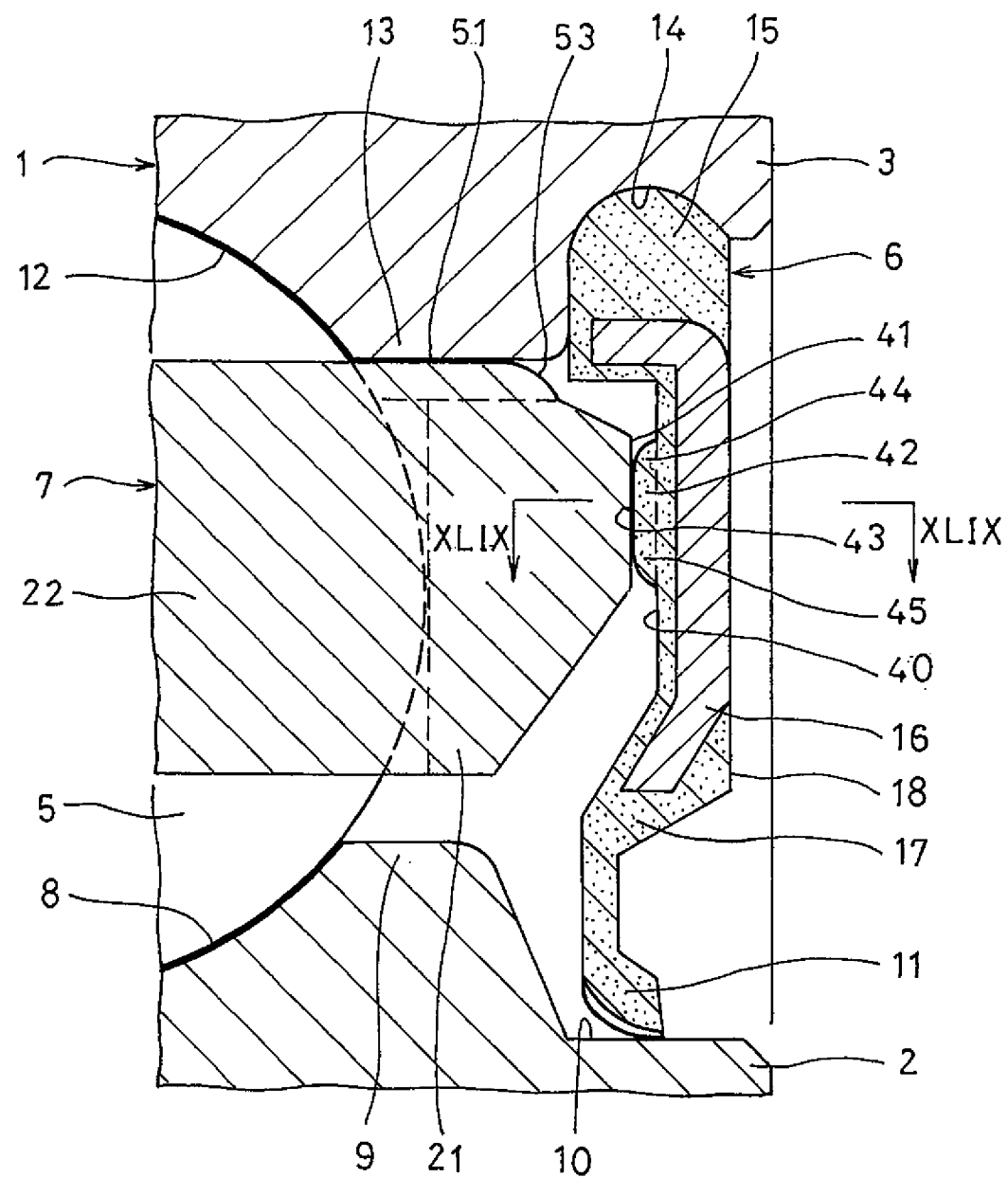
FIG. 48 is an enlarged sectional view illustrating a cage circular annular portion of a ball bearing according to a tenth embodiment of the present invention and the vicinity of the cage circular annular portion.
Figure 49:
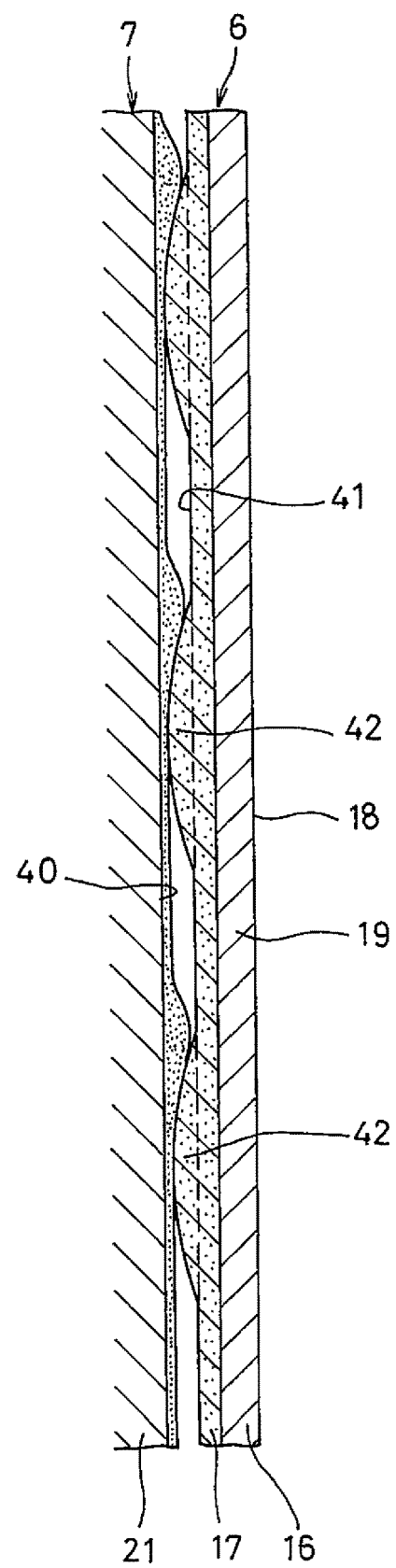
FIG. 49 is a sectional view taken along line XLIX-XLIX of FIG. 48.

FIGS. 48 and 49 illustrate a ball bearing 1 according to the tenth embodiment of the present invention. The tenth embodiment corresponds to the combination of the sixth embodiment (of FIGS. 32 to 37) and the sliding contact structure of the cage 7 and the seal member 6 in the third embodiment (sliding contact structure of the cage-side sliding contact surface 40 and the seal-side sliding contact surface 41 in FIG. 18). Therefore, the elements of the tenth embodiment corresponding to those of the above relevant embodiments are denoted by the same reference numerals, and their description is omitted.

While, each of the above embodiments exemplifies an oil-lubricated ball bearing 1, in which lubricating oil is used as the lubricant for lubricating the interior of the bearing, the present invention is also applicable to a ball bearing 1 lubricated by grease, i.e., a ball bearing 1 in which grease is used as the lubricant for lubricating the interior of the bearing. Grease is a semisolid lubricant containing lubricating oil and a thickener dispersed in the lubricating oil.

The above-described embodiments are mere examples in every respect, and the present invention is not limited thereto. The scope of the present invention is indicated not by the above description but by the claims, and should be understood to include all modifications within the scope and meaning equivalent to the scope of the claims.

DESCRIPTION OF REFERENCE NUMERALS

1: Ball bearing
2: Inner ring
3: Outer ring
4: Annular space

5: Ball
6: Seal member
7: Cage made of resin
12: Outer ring raceway groove
13: Outer ring groove shoulder
16: Metal core
17: Rubber part
21: Cage circular annular portion
22: Cage claw portion
23: Radially outer surface
24: Outer-diameter-side axial groove
25: Radially inner surface
26: Inner-diameter-side annular groove
27: Circumferentially opposed surface
28: Axially opposed surface
29: Cage guided surface
31: Electric motor
32: Electric vehicle transmission
40: Cage-side sliding contact surface
41: Seal-side sliding contact surface
42: Axial protrusion
43: Parallel apex portion
44: First inclined apex portion
47: Chamfer
51: Root-side guided surface
52: Distal-end-side guided surface
53: Axial end edge
54: Axial end edge
55: Oil reservoir groove
56: Relief recess

The invention claimed is:

1. A ball bearing comprising:
an inner ring;
an outer ring arranged radially outwardly of, and coaxially with, the inner ring;
a plurality of balls disposed in an annular space between the inner ring and the outer ring;
an annular seal member closing one axial end opening of the annular space; and
a cage made of resin and retaining the balls, the cage comprising:
a cage circular annular portion extending circumferentially through a space axially sandwiched between the seal member and the space through which the balls pass; and
cage claw portions having a cantilevered structure extending from the cage circular annular portion, and each cage claw portion located between a corresponding pair of the balls circumferentially adjacent to each other,
wherein the cage circular annular portion has a cage-side sliding contact surface axially opposed to the seal member and configured to come into sliding contact with the seal member,
wherein the seal member has a seal-side sliding contact surface configured to come into sliding contact with the cage-side sliding contact surface, and
wherein a plurality of axial protrusions each having an axially convex circular arc shape in cross section along a circumferential direction are formed on one of the cage-side sliding contact surface and the seal-side sliding contact surface at constant pitches in the circumferential direction.

2. The ball bearing according to claim 1, wherein each of the cage claw portions has an axial length larger than a radius of each of the balls, and wherein each of the cage claw portions has circumferentially opposed surfaces which are circumferentially opposed to the corresponding pair of the balls, respectively, and of which portions configured to circumferentially support the corresponding pair of the balls are straight portions having no circumferential inclination, and extending straight in an axial direction in order that when supporting the corresponding pair of the balls, no axial component forces are generated.

3. The ball bearing according to claim 2, wherein, of the circumferentially opposed surfaces of each of the cage claw portions, the portions configured to circumferentially support the corresponding pair of the balls, extend parallel to an imaginary straight line connecting a center of the cage circular annular portion and a center of the cage claw portion to each other in order that when the cage claw portion is moved radially outwardly by a centrifugal force, the circumferentially opposed surfaces do not interfere with the corresponding pair of the balls.

4. The ball bearing according to claim 3, wherein each of the axial protrusions includes:
a parallel apex portion having an axially convex circular arc convex shape in cross section along the circumferential direction whose apex height is radially uniform; and
an inclined apex portion having an axially circular arc convex shape in cross section along the circumferential direction whose apex height gradually decreases radially outward from a radially outer end of the parallel apex portion.

5. The ball bearing according to claim 4, wherein a cross section of the inclined apex portion of each of the axial protrusions perpendicular to the circumferential direction has a rounded shape smoothly connected to the parallel apex portion.

6. The ball bearing according to claim 3, wherein each of the cage claw portions has, in a radially outer surface of the cage claw portion, an outer-diameter-side axial groove axially extending from a distal end of the cage claw portion toward the cage circular annular portion, and shaped such that, from the distal end of the cage claw portion toward the cage circular annular portion, a position of a bottom of the outer-diameter-side axial groove gradually changes radially outwardly.

7. The ball bearing according to claim 2, wherein each of the axial protrusions includes:
a parallel apex portion having an axially convex circular arc convex shape in cross section along the circumferential direction whose apex height is radially uniform; and
an inclined apex portion having an axially circular arc convex shape in cross section along the circumferential direction whose apex height gradually decreases radially outward from a radially outer end of the parallel apex portion.

8. The ball bearing according to claim 7, wherein a cross section of the inclined apex portion of each of the axial protrusions perpendicular to the circumferential direction has a rounded shape smoothly connected to the parallel apex portion.

9. The ball bearing according to claim 2, wherein each of the cage claw portions has, in a radially outer surface of the cage claw portion, an outer-diameter-side axial groove axially extending from a distal end of the cage claw portion toward the cage circular annular portion, and shaped such that, from the distal end of the cage claw portion toward the cage circular annular portion, a position of a bottom of the outer-diameter-side axial groove gradually changes radially outwardly.

10. The ball bearing according to claim 1, wherein each of the axial protrusions includes:
   a parallel apex portion having an axially convex circular arc convex shape in cross section along the circumferential direction whose apex height is radially uniform; and
   an inclined apex portion having an axially circular arc convex shape in cross section along the circumferential direction whose apex height gradually decreases radially outward from a radially outer end of the parallel apex portion.

11. The ball bearing according to claim 10, wherein a cross section of the inclined apex portion of each of the axial protrusions perpendicular to the circumferential direction has a rounded shape smoothly connected to the parallel apex portion.

12. The ball bearing according to claim 10, wherein each of the cage claw portions has, in a radially outer surface of the cage claw portion, an outer-diameter-side axial groove axially extending from a distal end of the cage claw portion toward the cage circular annular portion, and shaped such that, from the distal end of the cage claw portion toward the cage circular annular portion, a position of a bottom of the outer-diameter-side axial groove gradually changes radially outwardly.

13. The ball bearing according to claim 1, wherein the axial protrusions are disposed at positions where the axial protrusions overlap with a pitch circle of the balls, or are disposed radially outwardly of the pitch circle.

14. The ball bearing according to claim 1, wherein the axial protrusions are formed on the seal-side sliding contact surface,
   wherein the seal member comprises an annular metal core, and a rubber part bonded to a surface of the metal core by vulcanization, and
   wherein the axial protrusions are formed of the same material as the rubber part.

15. The ball bearing according to claim 1, wherein the cage circular annular portion has, on an inner periphery of the cage circular annular portion, a cage guided surface configured to be guided while coming into sliding contact with an outer periphery of the inner ring.

16. The ball bearing according to claim 15, wherein the cage, which is made of resin, has, in an inner periphery of the cage, inner-diameter-side axial grooves axially extending through radially inner surfaces of the respective cage claw portions and the cage guided surface.

17. The ball bearing according to claim 15, wherein the cage circular annular portion has a chamfer obliquely extending in a cross section perpendicular to the circumferential direction, to connect the cage-side sliding contact surface and the cage guided surface to each other.

18. The ball bearing according to claim 1, wherein each of the cage claw portions has, in a radially outer surface of the cage claw portion, an outer-diameter-side axial groove axially extending from a distal end of the cage claw portion toward the cage circular annular portion, and shaped such that, from the distal end of the cage claw portion toward the cage circular annular portion, a position of a bottom of the outer-diameter-side axial groove gradually changes radially outwardly.

19. The ball bearing according to claim 1, wherein an axial end of the annular space opposite from an axial end of the annular space closed by the seal member is not provided with an additional seal member, and is open so that lubricating oil supplied from outside enters the annular space through this opening.

20. The ball bearing according to claim 1, wherein the ball bearing is used as a bearing of an electric motor of an electric vehicle, or a bearing of an electric vehicle transmission for reducing rotation of the electric motor.

* * * * *